United States Patent [19]

Kennard et al.

[11] Patent Number: 4,492,820
[45] Date of Patent: Jan. 8, 1985

[54] TELEPHONE ALARM SYSTEM

[75] Inventors: Lon H. Kennard, Heber; Duane O. Hall, Sandy; Richard M. Bangerter, South Jordan, all of Utah

[73] Assignee: Salt Lake Communications, Inc., Salt Lake City, Utah

[21] Appl. No.: 200,368

[22] Filed: Oct. 24, 1980

[51] Int. Cl.³ .......................................... H04M 11/00
[52] U.S. Cl. .................................. 179/5 P; 179/6.02; 179/2 A; 179/90 B
[58] Field of Search .......... 179/5 R, 5 P, 2 A, 2 AM, 179/90 B, 90 BB, 90 BD, 6.02, 6.07, 6.11, 6.13–6.16

[56] References Cited

U.S. PATENT DOCUMENTS

| | | | |
|---|---|---|---|
| 3,482,045 | 12/1969 | Chase | 179/5 P |
| 3,544,722 | 12/1970 | Hartfield et al. | 179/5 P |
| 3,662,111 | 5/1972 | Rubinstein | 179/5 P |
| 3,761,632 | 9/1973 | Colman | 179/5 P |
| 3,843,841 | 10/1974 | Rubinstein . | |
| 3,885,108 | 5/1975 | Zock | 179/5 P X |
| 3,899,645 | 8/1975 | Brafman | 179/5 R X |
| 3,925,622 | 12/1975 | Robinson | 179/5 P X |
| 3,989,900 | 11/1976 | Dibner . | |
| 4,219,698 | 8/1980 | Birilli et al. | 179/5 P |
| 4,284,849 | 8/1981 | Anderson et al. | 179/5 R |
| 4,371,751 | 2/1983 | Hilligoss, Jr. et al. . | |

FOREIGN PATENT DOCUMENTS

| | | |
|---|---|---|
| 37573 | 10/1981 | European Pat. Off. . |
| 7305888 | 9/1974 | France . |
| 2005964 | 4/1979 | United Kingdom . |

Primary Examiner—Stafford D. Schreyer
Assistant Examiner—W. J. Brady
Attorney, Agent, or Firm—Workman, Nydegger & Jensen

[57] ABSTRACT

An automatic telephone message device for transmitting recorded messages to predetermined telephone numbers. The device is connected to the telephone jack and AC power source of the user's telephone, and is also connected to a standard tape recording system. One or more messages are recorded by the user on the tape recorder. The microprocessor controlled circuitry of this device provides memory space for convenient storage and modification of several telephone numbers. This device is responsive to manual, timed automatic or remotely generated activation signals for transmitting the recorded message to parties answering at the specified telephone numbers. An additional audible alarm may be set to sound at predetermined times, and if a manual switch is not closed within a specified time thereafter, the device calls the selected telephone numbers and transmits the recorded message. In response to remote transmitter activation or lack of response to the audible alarm, a tone is transmitted in addition to the message indicating that the user is probably in the vicinity of the device. All specified numbers are redialed until the device senses that they have been answered, or until a specified maximum number of dialing attempts have been made. The recorded message may be reviewed and the alarm activation time may be modified or deactivated by a party accessing the device from a remote telephone.

51 Claims, 6 Drawing Figures

TELEPHONE ALARM SYSTEM

BACKGROUND

1. Field of the Invention

The present invention relates to automatic telephone message devices, and more particularly to a telephone message device for automatically delivering a pre-recorded message to each of several preselected telephone numbers

2. The Prior Art

Devices for automatically delivering a recorded message to an incoming telephone caller are well known and have been in use for many years. Further, devices for automatically dialing preselected telephone numbers are also well known and generally available to telephone users. These devices are useful in taking and delivering messages in response to a telephone call and for quickly dialing a desired telephone number. However, these devices are not intended nor designed to automatically contact and deliver recorded messages to specified telephone numbers.

Due to the high cost of in-patient health care for the physically incapacitated, and the increasing expense of convalescent homes and nursing care for the aged, as well as the desire of many such persons to be independent, the numbers of aged persons or those with fragile health who electr to live alone are becoming very large. These persons could, at any time, become incapacitated from disease or accident, so as to be physically unable to contact someone for help. These occurrences too often result in the death of the person because his condition is not discovered at an early stage.

There is, therefore, a great unfilled need to have a reliable system for notifying and communicating the whereabouts of such aged or incapacitated persons in emergency situations.

One system directed to this need provides the aged or incapacitated person with a small remote transmitter similar to a conventional garage door opener. A telephone device, responsive to this remote transmitter signal, is attached to the user's telephone system. If the user suffers illness or if he is in need of police or fire assistance, he presses the appropriate button on the transmitter. The transmitter produces a signal which causes the telephone device to transmit signals over the telephone lines to a dispatch center which is equipped with a computer. The telephone device causes the computer at the dispatch center to produce the user's file on a display screen where it is viewed by an operator. Upon reviewing the user's file and determining what is needed, the operator will call up to three different telephone numbers to get help.

Clearly, the above-described system is cumbersome at best since it requires constant monitoring by a remote operator, who must himself perform the functions of calling the specified numbers, and communicating the desired message. Further, the user becomes very restricted in his ability to leave the local area since the transmitter range for activation of such a telephone device is inherently short (generally much less than one mile). Also, there is no provision for an alarm or other check-in device to monitor the presence and health status of the user. Still further, the costs of such a system are necessarily high due to required periodic fees to provide for the continuing service and maintenance of the centralized computer and operators.

An improvement to this sytem has been proposed wherein a device, having a message pre-recorded on an endless tape, is connected to the home telephone. This device may be activated by a timer at a specified time, or by a remote activation device such as a conventional garage door opener. The activated device begins calling a series of predetermined telephone numbers, and at the same time the endless tape begins playing, its signal output being transmitted through the telephone lines.

Although this device can, in fact, notify parties that help is needed, it has several limitations which reduce its effectiveness. First, the pre-recorded message is permanent, and may not be modified to suit peculiar needs of the incapacitated party. Secondly, the proposed device does not recognize when a previously called telephone number has been answered, and thus it continues dialing all specified numbers ad infinitum until the device operation is manually terminated. Further, the proposed device does not permit postponement or termination of the alarm activation by a remote user. The above-described device provides only limited freedom to the user since prior to leaving home the incapacitated party must either turn off the automatic alarm activation capability of the device, or be sure that he returns prior to the time specified.

Thus, what is needed is an automatic telephone message device which may be activated manually, automatically or remotely for communicating a desired message to parties answering at one of the several specified telephone numbers. The messge of the device should be easily modified in order to inform the called party of the whereabouts of the incapacitated person, and any special needs of that person. The device should permit remote modification of the alarm activation time, and the system operation should further allow initiation or termination of operation from a remote telephone. The device should also detect when the called number has been answered, and should refrain from repeated callings of an answered telephone number. A device such as this would truly offer adequate protection for an aged or incapacitated person while still permitting a great amount of freedom to that person, with minimum risk of annoyance or nuisance to the called party.

BRIEF SUMMARY AND OBJECTS OF THE INVENTION

The present invention provides a unique device responsive to manual, timed automatic or remote activation signals for communicating a desired message to parties answering at specified telephone numbers. The device may be interconnected with any standard tape recording system which has interface capabilities, and may be additionally interconnected to any common home telephone system. Through use of the tape recording system, the device permits the recording and modification of all messages by the user himself, and in the user's own voice. The device additionally provides memory space for the storage of several selected telephone numbers for future reference.

In actual operation, a specific time for device operation is selected and set in a device clock system. If the system has not been deactivated or otherwise modified prior to the occurrence of this set time, the device is activated and proceeds to systematically call the selected telephone numbers. The device provides the novel step of detecting when a party has answered the called telephone number, after which the recorded message is transmitted over the telephone system to the answering party. The device will not redial an answered telephone number, but will continue to try the other specified telephone numbers until they too are answered, or until a specified maximum number of tries to contact each number has been reached.

The preset device activation time may be modified by a remote user by his simply calling the number of the telephone to which the device is connected and utilizing a preset identification and control code to accomplish such changes. The device may also be deactivated by the same method.

A "check-in" option permits the user to preset an alarm time into the device, producing an audible alarm upon occurrence of that time. If the alarm is not manually deactivated within a specified time, the calling sequence is activated.

Device operation may also be initiated by the depression of a button on a remote control transmitter. Both this and the "check-in" initiation methods cause an additional signal to be transmitted with each message so as to notify the answering party that the device was activated by the remote control transmitter, thus providing an additional indication as to the general location of the party depressing the remote control transmitter button.

It is therefore a primary object of the present invention to provide an improved automatic telephone message device for obtaining aid at an early time in emergency situations.

It is another object of the present invention to provide an automatic telephone message device for use in emergency situations which provides increased freedom of travel and scheduling to the party using the system.

Another important object of the present invention is to provide a device for obtaining help in emergency situations wherein the communicated message may be modified by the user to meet his needs, and may be in his own voice.

Still a further object of the present invention is to provide a device for communicating messages in emergency situations wherein the device operation may also be controlled from a remote location.

Yet another object of the present invention is to provide an emergency message communication device which may be activated by a signal from a remote transmitter, and which transmits an additional tone with the message after activation by remote transmitter.

A further important object of the present invention is to provide an automatic telephone message device which detects when a called number is answered prior to transmitting the message, and which does not redial such answered number.

These and other objects and features of the present invention will become more fully apparent from the following description and appended claims taken in conjunction with the accompanying drawings.

DETAILED DESCRIPTION OF THE PREFERRED EMBODIMENT

Reference is now made to the figures wherein like parts are designated with like numerals throughout.

1. General

Figure 1:
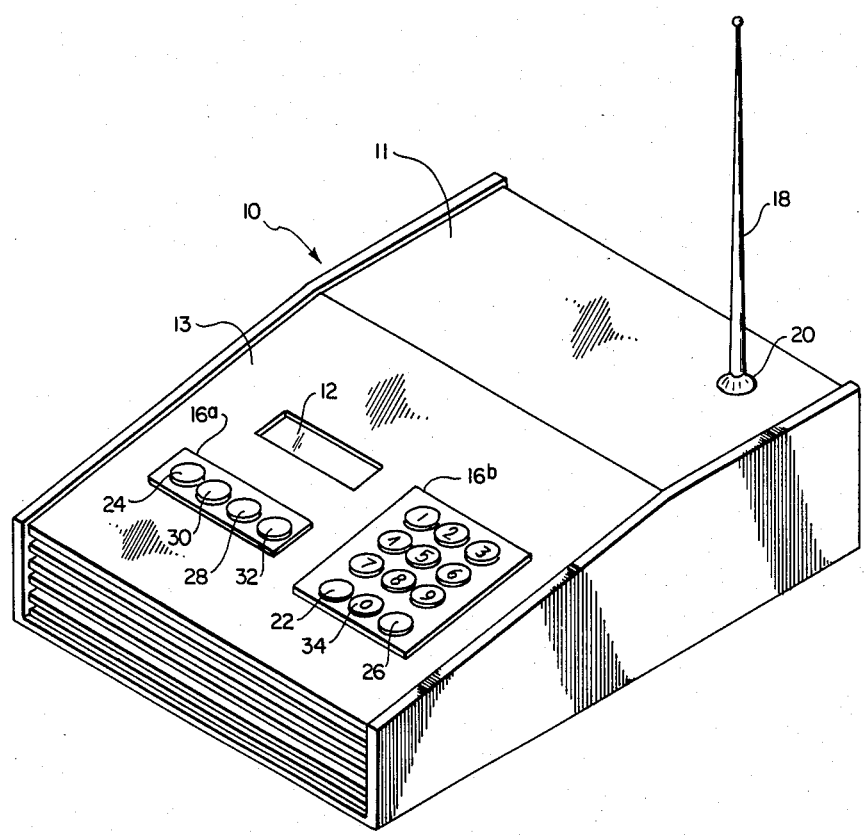
FIG. 1 is a perspective view of the telephone alarm device of the present invention.

Referring initially to FIG. 1, the telephone alarm control device of the present invention is generally designated at 10. Alarm control device 10 includes a housing 11 having a downwardly sloping front panel 13. Upon front panel 13 is positioned a seven segment visual display 12 capable of displaying up to 14 separate alphanumeric characters. Panel 13 additionally includes a series of control switches mounted on keyboard 16a, with further cntrol and numeric switches positioned on keyboard 16b. It is noted that keyboards 16a and 16b may be configured in numerous different arrangements, and electrically they may comprise a single keyboard. Therefore, both keyboards are referred to hereafter as "keyboard 16".

The switches (or keys) on keyboard 16 include a "SET" key 24 which also comprises a "NUMBER" key. Various information may be programmed into device 10 by first depressing the "SET " key 24 and then depressing the key which accesses the desired function.

Particular telephone numbers may be accessed for viewing or replacement by depressing the "NUMBER" key 24. "DELAY" key 30 accesses the particular time value which may be added to the alarm time of this device, and depression of key 30 prior to pressing "SET" key 24 does cause such addition. "CLEAR" key 28 may be utilized to remove specified data from the display 12 and from the memory of device 10. Key 28 additionally permits access to and modification of the current time value as calculated by device 10. "ALARM" key 32 causes the presentation on display 12 of the time at which the device, if enabled, will begin calling designated telephone numbers as well as permitting the modification of that time. Key 32 may also be used to enable or disenable the operation of the "ALARM" function.

Keyboard 16 includes one key each for the numeric digits 0 through 9 as well as control keys 22 and 26. Key 22 comprises an "ENTER" command wherein its depression causes information being placed in the memory of device 10 to be entered therein. Button 26 comprises a "SHIFT RIGHT" key which causes data being entered into display 12 to shift right after each depression of key 26, with the right-most character being totally erased. "0" key 34 also comprises a "CHECKIN" control, such that depression of this key in the proper operation mode will access, display and may permit change of the check in times stored in device 10. A more detailed description of the device operation will be presented hereafter.

An antenna 18 extends outward through an aperture 20 in the upper surface of housing 11, so as to receive incoming control signals from a remote system actuation device (not shown). The remote system actuation device may constitute any commonly known transmitting device for automatically activating such things as electric garage doors.

1. The System Components

Figure 2:
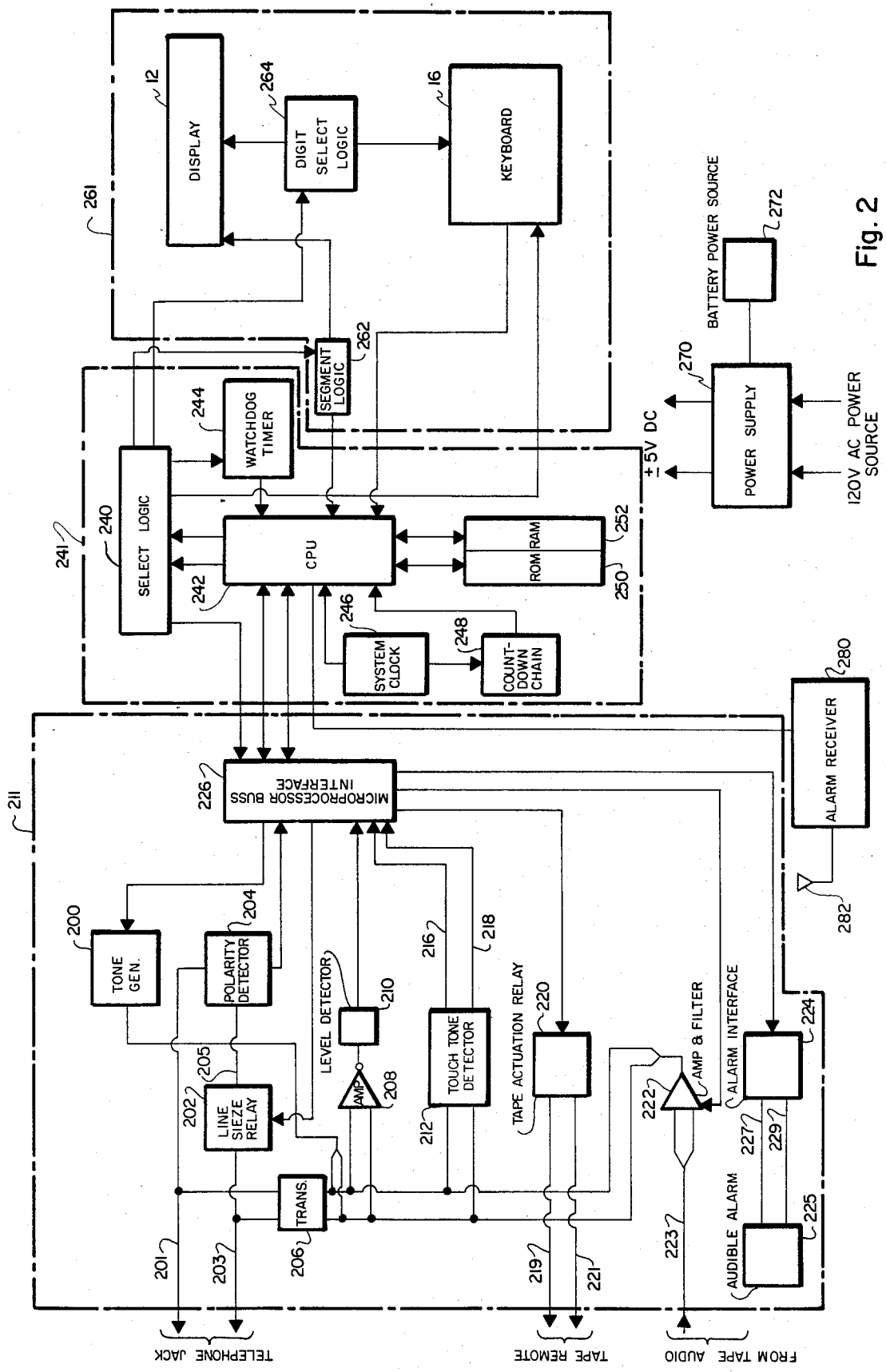
FIG. 2 is a functional block diagram illustrating the components of the telephone alarm device.

By reference to FIG. 2, the electrical components of the automatic telephone alarm device may be generally described.

Figure 3:
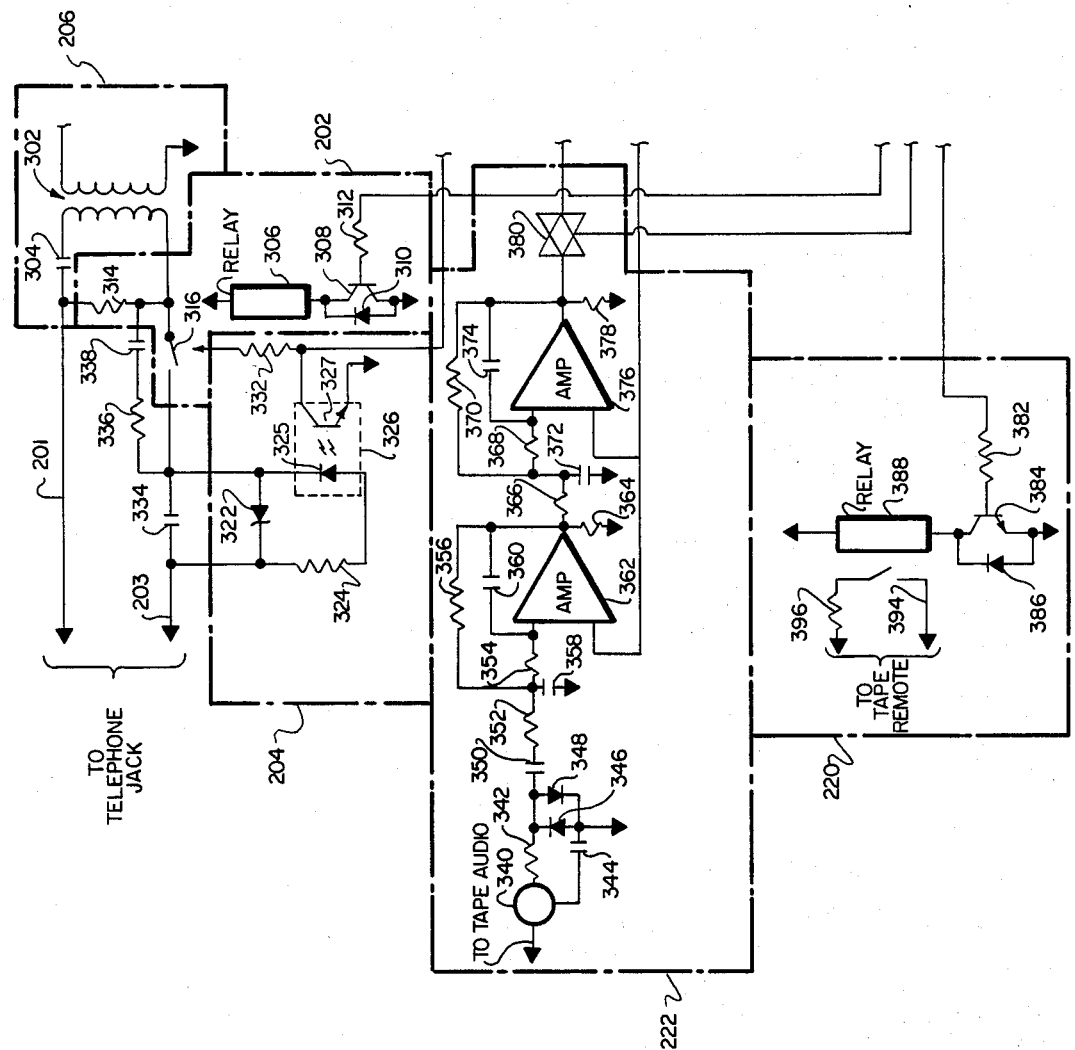
FIG. 3 is a schematic diagram of the electrical circuits utilized to detect polarity changes in the telephone line, to seize the telephone line, to detect and filter incoming audio signals from the telephone line and to activate the interconnected tape recording system.
Figure 4:
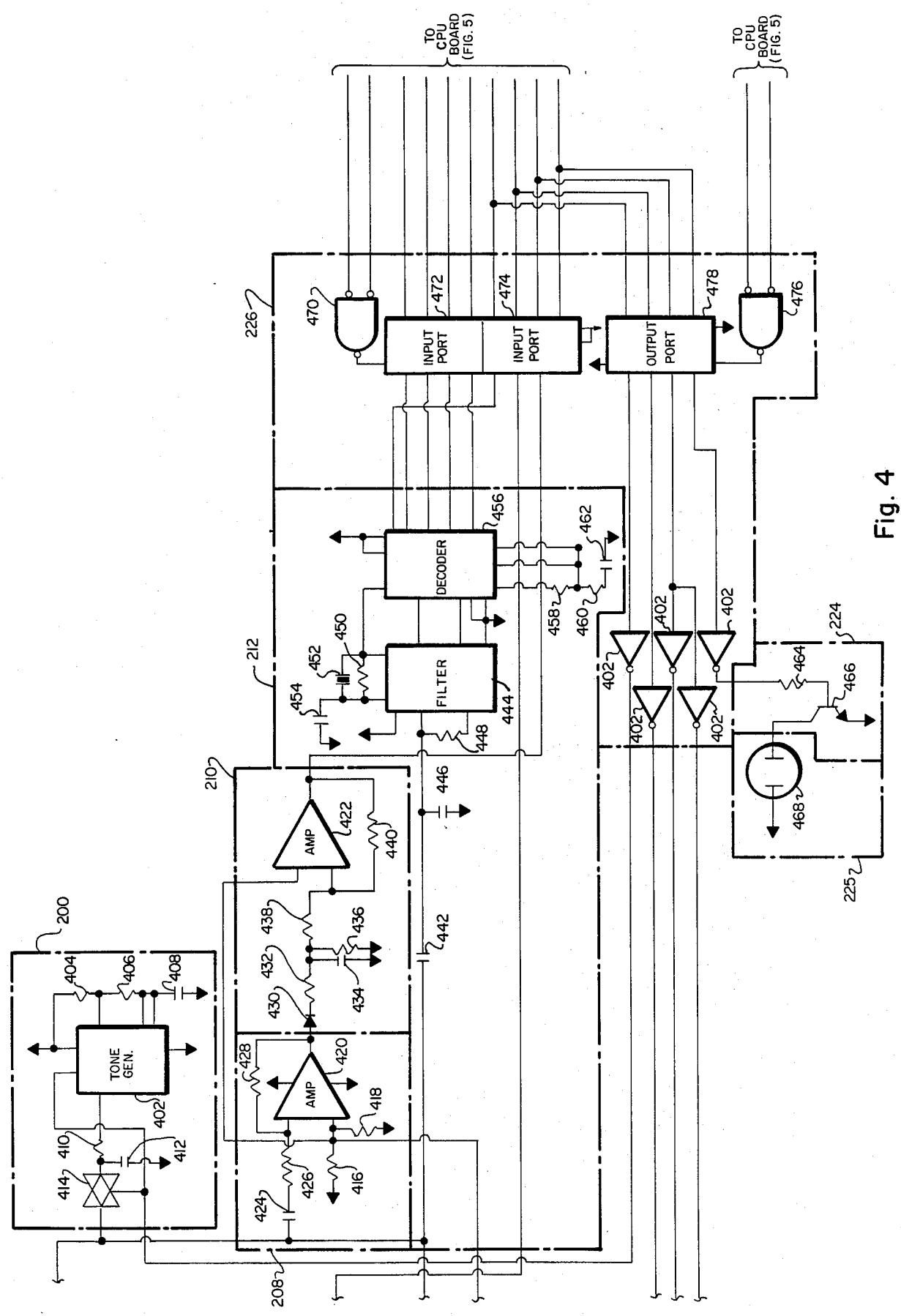
FIG. 4 is a schematic diagram illustrating the electrical circuits comprising the tone generator, the audio level detector, the circuit for detecting tones produced at a remote telephone, the check-in alarm system, and the input port portion of the microprocessor of the present invention.

The system components which are functionally described within block 211 of FIG. 2 depict that portion of the system which comprises the "SOS interface" and corresponds to the detailed circuit elements depicted in FIGS. 3 and 4, as described more fully hereafter. Referring more particularly to the elements of block 211, line seize relay 202 and polarity detector 204 comprise a telephone loop circuit. When the microprocessor of block 241 relays a signal to seize the line, the line seize relay 202 closes and polarity detector 204 transmits a signal through the microprocessor bus interface 226 to CPU 242 identifying the polarity of the interconnected telephone line. Device 10 utilizes a change in polarity to determine when the remote telephone number has been answered, and thus the absolute polarity of the line is not critical. In addition to its use in seizing the telephone line, the line seize relay 202 may be used to access remote telephone numbers by sequentially pulsing dial signals onto lines 201 and 203. These signals are identical to those created by dialing on common dial telephones.

Polarity detector 204 is connected to one pole of a conventional telephone jack by interconnection through line 201. Line seize relay 202 is connected to the other pole of the telephone jack through line 203. Additionally, line seize relay 202 and polarity detector 204 are interconnected with each other by line 205.

Signals entering from the telephone jack on lines 201 and 203 are additionally connected to transformer 206. Transformer 206 distributes the transformed audio signals from lines 201 and 203 to all other circuit elements requiring these signals, with the exception of line seize relay 202 and polarity detector 204.

The output of transformer 206 is interconnected with a detector system comprising amplifier 208 and level detector 210. This detector combination is utilized to determine the presence or absence of audio signals on telephone lines 201 and 203 by determining whether the signal magnitude is above a specified threshold value. If the magnitude of a signal is above the threshold value, then level detector 210 produces a signal so indicating, which is transferred to the input ports of microprocessor bus interface 226.

The output of transformer 206 is additionally connected to a tone detector 212. Detector 212 is comprised of a switched capacitor filter which is implemented on a CMOS chip, connected to a tone decoder. Tone detector 212 produces an output comprised of two sets of signals. The first signal from detector 212 is a four bit binary code which comprises the binary value associated with the pressed tone producing telephone button and is transferred on line 216 to the input port of the microprocessor bus interface 226. The second signal from detector 212 is a strobe signal which is transmitted on line 218 to the input port of microprocessor bus interface 226, indicating that the data on line 216 is valid.

A tape actuation relay 220 is connected by lines 219 and 221 to the on/off controls of a remote tape recorder (not shown) which is used to record and transmit one or more desired messages. Relay 220 is additionally connected to microprocessor interface 226, thus enabling a signal to be transmitted through microprocessor interface 226 to the tape actuation relay 220 causing the remote tape recorder to be turned on or off in controlling the transmission of recorded messages.

A tape audio filter and amplifier 222 is connected through tranformer 206 to the telephone jack lines 201 and 203. Filter and amplifier 222 is additionally connected through bus 223 to the audio output of the remote tape recorder (not shown). Filter and amplifier 222 filters the audio output of the remote tape recorder so that no out of band signals from line 223 will be transmitted to telephone jack lines 201 and 203.

An audible alarm device 225 is interconnected to an audible alarm interface 224 by lines 227 and 229. Audible alarm 225 has a built in pulser which generates audible signals and thus produces the audible alarm signals of this invention. Audible alarm interface 224 is used to activate transmission of audible warning signals from alarm 225, and functions in a similar manner to tape actuation relay 220, except that interface 224 utilizes no relay but rather includes a transistor which produces the necessary control signals. The audible alarm interface 224 is additionally connected to the microprocessor interface 226, through which interface 224 is controlled.

A tone generator 200 is connected through transformer 206 to telephone jack lines 201 and 203. Additionally, tone generator 200 is connected with microprocessor interface 226. In response to control signals transmitted through interface 226, tone generator 200 produces tones used to identify the transmitted message as one being activated by the remote actuating transmitter or on the premises of the device. As explained more fully hereinafter, tone generator 200 is also used to communicate the status of various device functions to a user accessing the device 10 by telephone.

The microprocessor interface 226 is comprised of an eight bit input port, and a four bit output port. In addition to interconnection with the devices in block 211, interface 226 is interconnected to the microprocessor CPU (central processing unit) 242 of block 241, and select logic 240 of that block. The microprocessor and associated devices of this invention are generally described in block 241 of FIG. 2. Select logic 240 is connected to the CPU 242, and is utilized to decode the address bus of the CPU 242 and to generate eight distinct address blocks within the memory space available to CPU 242. The output signals from this device are connected to and utilized to selectively enable the input and output ports of interface 226, display 12, scanner control 264, and keyboard 16.

CPU 242 is comprised of a conventional microprocessor such as the well-known Z80 model. A watchdog timer 244 is connected between select logic 240 and CPU 242. Watchdog timer 244 is accessed through select logic 240 and determines whether continued access by select logic 240 to a specific memory address is being made. In normal system operation, access to this memory location by select logic 240 must be made within a specified maximum time in order to indicate correct system performance. Select logic 240 may satisfy this maximum time restriction by repeated accessing of that location. Watchdog timer 244 monitors the repeated accesses of select logic 240 with respect to the particular memory location, and if no access is made within the specified maximum time, then watchdog timer 244 causes the CPU 242 to re-initialize itself, and return to a specified initialization position in the execution of its program.

The purpose for reinitializing CPU 242 is to prevent erroneous operation of the device 10 due to such things as static electricity discharge, power line fluctuations, and the like which can cause the operation of the microprocessor of block 241 to fail. In response to the reset signal from watchdog timer, the microprocessor logic 241 can determine whether a complete reinitialization of the system is necessary, or whether the CPU 242 must simply return to the main body of the program.

A system clock 246 is interconnected with CPU 242, and provides the timing signals for maintaining correct system operation therethrough. System clock 246 is additionally connected to countdown chain 248, which is a countdown device used to generate software interrupts which are used in CPU 242, to which countdown chain 248 is additionally connected. The software interrupts from countdown chain 248 are additionally divided in the system software to create a real time clock pulse, which is used in several of the alarm features of this device, as well as providing a real time clock whose current time may be presented to the user through display 12.

ROM 250 and RAM 252 comprise the system memory, and are individually interconnected with CPU 242, so that they may be accessed for program execution and data storage during the operation of this device 10. More specifically, ROM 250 contains the software program operating instructions, while RAM 252 is utilized as a "scratch pad memory" for storing data which may be changed by the user, such as telephone numbers, the status of certain devices, the current time, the alarm time, the check-in time, and etc. Additionally, RAM 252 is utilized by CPU 242 in performing any calculations which require temporary data storage or other manipulations involving the storing or calculating of information.

The display and keyboard portions of the telephone alarm device are generally described by reference to block 261 of FIG. 2. In one preferred embodiment display 12 is a conventional seven segment 14 character display, capable of all digits and a limited number of alpha characters. Display 12 is interconnected with select logic 240, which determines the particular characters to be displayed by display 12.

Segment logic 262 is interconnected with CPU 242 and additionally with display 12. Segment logic 262 is utilized in conjunction with digit select logic 264 to cause certain segments of the various seven segment display characters to be "turned on" for the visual presentation of data thereon. Digit select logic 264 is utilized to identify the individual digits within display 12 which are to be "turned on" in the presentation of data. Digit select logic 264 is interconnected with select logic 240, with display 12, and with keyboard 16.

In the operation of display 12, when data is to be visually presented, display 12 is first cleared and then each character of display 12 is sequentially addressed and illuminated in the presentation of the desired data. Specifically, segment logic 262 identifies those particular segments of the specified character to be illuminated, while digit select logic 264 has identified the particular character to be displayed. Thus, the combination of the segment logic 262 and digit select logic 264 sequentially step through each character of display 12 causing the necessary characters to be "turned on" in the proper configuration so as to display the desired data.

Digit select logic 264 is also utilized to scan the keyboard 16 in determining which key or keys have been depressed. Specifically, digit select logic scans each of the four columns of keyboard 16, by sequentially placing a signal upon those lines. If a key has been depressed on keyboard 16, the signal will be transmitted to the interconnected CPU 242, which will store this information for use during the operation of the system program.

Keyboards 16 are themselves conventional contact keyboards, having pressure sensitive keys organized in a matrix fashion.

The remaining elements of FIG. 2 are somewhat segregated from the previously described components, but are necessary for proper system operation.

Power supply 270 comprises a typical logic circuit power supply which initially receives power from a 120 volt AC power source, such as a typical home wall power outlet (not shown), and converts this into +16 volts DC which is then regulated to +5 volts DC, and is distributed throughout the circuitry of this device in order to provide the energy for its operation. The +16 volts DC is utilized to power the alarm receiver 280 to be discussed hereafter, and audible alarm 225, both of which require this higher voltage power for proper operation.

Battery power source 272 comprises a back up system such that if AC power is suddenly not available to the system, power source 272 provides the necessary power for operating the system for a limited period of time (generally in the range of two to three hours). Power source 272 is automatically charged when the system is connected to a 120 volt AC power source.

Alarm receiver 280 is connected to CPU 242 through a non-maskable interrupt. When alarm receiver 280 is activated by receiving a sinal from a remote transmitter (not shown) through antenna 282, a signal is immediately transferred to CPU 242 causing the initiation of the calling phase of operation. Thus, when alarm receiver 280 is activated, the telephone alarm device immediately begins calling those telephone numbers which have been previously specified by the user, and stored in RAM 252.

3. System Operation

The general method of system operation will now be described by reference to FIGS. 1 and 2, with a description of the detailed circuitry being provided subsequently.

The telephone alarm system is installed by connecting the control device 10 to a 110 volt power source by commonly known electrical cord means. Device 10 is connected to the telephone system by conventional interconnection into a telephone jack (not shown). A conventional tape recorder (not shown) may be interconnected with device 10 by means of conventional tape jacks (not shown) which are connected between the tape-in and tape-out connection points of the tape recorder, and those of the device 10 as explained more fully hereafter.

Upon interconnection of device 10 with a power source, as above described, CPU 242 receives a reset signal from watchdog timer 244. CPU 242 then references address location 0 in ROM 250 and executes sequentially the instructions stored in that and subsequent locations. These instructions cause the pointers and values in RAM 252 to go to their default, initialization values. For example, the alarm time is set to 0, the check-in times are set to 0 (blanks), the delay value is set 60 minutes, and all stored telephone numbers are scanned to identify invalid characters. If any invalid characters are discovered, the telephone numbers are purged from the system.

Following initialization, the device enters a time setting mode, requiring the user to input the current time into device 10. The device 10 next enters scanning mode wherein CPU 242 transmits a signal through segment logic 262 and select logic 240 to clear display 12. The updated time is then calculated by CPU in response to signals from system clock 246 and countdown chain 248, with the current time being placed upon display 12 and stored in RAM 252.

CPU 242 then checks a memory location in RAM 252 to determine if the alarm is set on. If the alarm is on, CPU 242 causes the current alarm time stored in RAM 252 to be presented on the right hand portion of display 12. CPU 242 additionally determines whether or not the check-in function is on, and if so whether it is time to activate an alarm in response to passing a set check-in time. As explained more fully hereafter, the alarm and the check-in functions are mutually exclusive in operation; they may never both be on at the same time.

If the alarm is set on, CPU 242 checks interface 226 to determine whether there is a currently incoming call, and if not then CPU 242 checks the inputs from keyboards 16 to determine whether any keys have been depressed. The device will remain in this mode, functioning in this manner until the occurrence of an event such as the pressing of a key, or the determination that it is time to sound an audible alarm at a check-in time, or that it is time to begin the sequence of calling specified telephone numbers in response to the passage of an alarm time.

The system response to these and other occurrences can best be described by a discussion of the various individual functions available to the user, and the results of their use on the device.

After initialization, with no further changes to the system, the initialized CPU 242 will cause the time of 12:00 o'clock midnight to be displayed on display 12. Further, CPU 242 will cause a series of dashes to appear across the remainder of display 12, indicating that the system is in the time setting mode. In response to this prompt, the user may enter the correct time into the device 10 by sequentially depressing numerals on keyboard 16 which correspond to the desired time. Upon sensing that keys have been depressed on keyboards 16, CPU 242 causes segment logic 262, select logic 240, and digit select logic 264 to shift the digits as they are entered from the right, onto the display 12.

After entering the current time, the user presses "ENTER" key 22 of keyboard 16, which indicates to CPU 242 that the current time has been entered. The entered time is checked to insure that all characters entered were valid digits, comprising a valid time. If an error is detected, CPU 242 causes the prompt "ERROR" to appear on display 12, and rejects the entered digits. The "ERROR" prompt is cleared by pressing any key on keyboard 16. After pressing a key to remove this prompt, the user may again repeat the process as above described to enter the correct time into device 10.

If the entered time is found to be correct, CPU 242 causes display 12 to present the prompt "A=1 OR P=0". In response to this prompt, the user depresses a 1 on keyboard 16 if the entered time is a.m. or a 0 on keyboard 16 if the entered time is p.m. As soon as the 1 or 0 of keyboard 16 is depressed, CPU 242 causes the entered time to be stored in a proper location in RAM 252, and causes select logic 240, segment logic 262 and digit select logic 264 to present this time left justified on display 12 in hours and minutes followed by an A for a.m. or a P for p.m.

With a time value entered in device 10, the user may program into device 10 any of the various functions which will be described hereafter by use of the control and numeric keys of keyboard 16. For example purposes, the operation of the various functions will be described by reference to the control keys from left to right.

By depressing the set key 24 of keyboard 16, CPU 242 causes the prompt "NBR or ALA?" to be presented on display 12. Any of the function control keys of keyboard 16 may next be depressed, indicating to CPU 242 the desired function to be accessed. Again, referring to the control keys from left to right, key 24 now becomes the "NUMBER" key and thus depressing key 24 indicates to CPU 242 that a particular telephone number stored in RAM 252 is to be accessed.

In response to depression of "NUMBER" key 24, CPU 242 causes the prompt "NBR?" to be presented on display 12. Up to ten individual telephone numbers may be programmed and stored within RAM 252, and thus the above prompt is asking the user which of the ten telephone numbers contained within device 10 is to be accessed. In response to this prompt a one digit number from 0 to 9 is entered on keyboard 16, indicating the particular telephone number which is to be accessed.

In response to this key entry, CPU 242 addresses the corresponding location in RAM 252 and causes the telephone number stored therein to be presented on display 12. If RAM 252 contains no telephone number in the addressed location, then CPU 242 simply causes display 12 to present the number of the depressed key followed by blanks.

If the user does not wish to modify the telephone number presented by display 12, he may again press "NUMBER" key 24 followed by another digit (from 0 to 9) on keyboard 16. In response to these actions CPU 242 will access the new telephone number corresponding to the entered key from keyboard 16, and will present this telephone number on display 12. If the user does not wish to modify the telphone number of display 12, and he does not wish to view additional numbers, he may depress "ENTER" key 22 which will cause CPU 242 to leave the "set number" mode of operation, and go to the normal mode of operation, presenting the current time on display 12.

If the user wishes to modify the telephone number presented at display 12, he sequentially depresses number keys on keyboard 16 corresponding to the new telephone number. As CPU 242 senses the depressed number key from keyboard 16, it causes that digit to be shifted into display 12 from the right side thereof. Entry of the first digit causes the displayed number to be erased from the display, but not from RAM 252. If an error on the input of a telephone number is made, correction may be made with the use of the "RIGHT SHIFT" key 26. For each depression of key 26, CPU 242 will cause select logic 240, segment logic 262 and digit select logic 264 to shift all entered characters to the right, removing the most recently entered character from the system. Successive depressions of right shift key 26 permits removal of a portion, or of the whole number from display 12. After removing the erroneous characters, the correct numbers may be placed within the device 10 by sequentially depressing the desired buttons on keyboard 16, in the manner described above. It is noted that this process of reviewing present data, and of editing or changing that data is common to all functions which permit user entry of data into the system.

After placing the desired telephone number on the display, the user depresses "ENTER" button 22 on keyboard 16, after which CPU 242 checks for any erroneous characters. If an erroneous character is identified, or if less than four characters were entered, CPU 242 discards the values and causes the prompt "ERROR" to appear on display 12. Otherwise, CPU 242 causes this new number to be stored in RAM 252 for later reference, erases the previous number from RAM 252, and returns to the normal, time display mode.

Still a further option available to the user is to completely remove an undesired telephone number, without replacement thereof. When the original telephone number has been initially presented at display 12, by accessing the location of that number as described above, a depression of "CLEAR" key 28 will cause CPU 242 to remove that number from display 12, and also from RAM 252. This action must be performed after the original number is presented in display 12, and prior to the depression of any other control or number key.

Still another option available when programming telephone numbers into device 10 is the use of a "guard tone pause". When it is desired to access remote telephone devices such as car telephones, or telephone activated paging devices, it is necessary to first dial a central exchange telephone number and wait for a response therefrom. After receiving a response, the calling user must enter additional digits identifying the particular device to be contacted. This action may be accomplished within device 10 by first programming the number of the desired exchange, as above desired, and then depressing the "DELAY" key 30, of keyboard 14. In response to a depression of the delay key 30, CPU 242 will cause a "G" to appear on display 12, immediately following the previously entered central exchange telephone number. At this point, numbers identifying the particular device to be contacted may be entered in the manner described above. The presence of this delay function in the telephone number will cause the device to initially access the telephone number of the central exchange, and then to wait until a response is detected. At this time, the remaining portion of the stored telephone number is communicated across the telephone lines to access the remote telephone device.

With device 10 properly interconnected to the power supply, telephone system, and tape recording system as above described, being fully initialized and programmed with desired telephones, activation resulting in attempted communication with parties at the specified telephone numbers may be caused to occur. The various functions causing activation of the "calling mode" of device 10 operation will be discussed hereafter. In each case, the activated calling procedure is identical and thus this procedure will now be described.

Upon sensing a signal requiring activation of the calling sequence, CPU 242, functioning as a dialing controller, accesses RAM 252 and obtains the first entered telephone number. CPU 242 then checks a flag in that number to see whether or not it has been previously been dialed and answered. If the current telephone number has previously been answered, RAM 252 then discards that number and accesses the next sequentially entered telephone number from RAM 252. If the number was not previously answered, CPU 242 determines whether or not the number has been dialed five times. If the number has been dialed five times, then CPU 242 discards the number and accesses the next sequentially programmed telephone number.

If the presently accessed telephone number has not been previously answered, and if it has not been tried five times, then CPU 242 utilizes select logic 240 and microprocessor bus interface 226 for transmitting signals necessary to initiate the calling of the currently accessed telephone number.

When the calling sequence is initiated, CPU 242 transmits a signal through interface 226 causing line seize relay 202 to seize the telephone lines 201-203. This action has the effect of a party lifting a telephone off the cradle prior to dialing a telephone number. After siezing the telephone line, data from polarity detector 204 is transferred through interface 226 to CPU 242 and is stored in a location in RAM 252, indicating the present telephone line polarity.

The currently accessed telephone number is "dialed" by CPU 242 sending signals through interface 226 which cause line seize relay 202 to pulse on and off at a rate of approximately ten times per second (in conformance with standard telephone company operating procedures) in a manner so as to communicate the desired telephone number. After all digits of the telephone number have been dialed, CPU 242 monitors the polarity of telephone lines 201 and 203 as obtained from polarity detector 204 and transmitted through interface 226. The polarity value thus obtained is compared by CPU 242 with the previously stored original polarity value contained in RAM 252.

If a change is detected between the current polarity value as compared with the original value then it is assumed that the called telephone has been answered and the recorded message is then transmitted over the telephone lines 201 and 203 to the accessed telephone. This is accomplished by a signal from CPU 242 (functioning as a message controller) to interface 226 which directs tape actuation relay 220 to turn the tape recorder on. Relay 220 transmits a signal on lines 219 and 221 which activates the remote tape recorder (not shown). The activated tape recorder then plays its recorded message, which is transmitted on line 223 to audio amplifier and filter 222, which further transmits the message through transformer 206 and onto lines 201 and 203, communicating the message to the party answering the accessed telephone number.

After playing the recorded message line seize relay 202 is caused to release the telephone lines 201-203 by a command from CPU 242 through interface 226. CPU 242 then flags this telephone number in RAM 252 as having been answered, accesses the next entered telephone number in RAM 252, and initiates calling of that number.

In addition to monitoring the output of polarity detector 204, CPU 242 (functioning as a line status controller) monitors the presence or absence of incoming audio signals on telephone lines 201 and 203 through amplifier 208 and level detector 210. If a change in polarity is not detected, CPU 242 continues to monitor the audio level of the device to determine whether the telephone is ringing, whether there is a busy signal, or whether there is some other status on the telephone system. It is noted that in some instances, line polarity of the telephone lines 201 and 203 will not change when a person answers the accessed telephone number. Therefore, the audio level detection system is utilized as a backup to the polarity detector 204 for determining whether the number has in fact been answered.

In response to indications from level detector 210 that audio signals are present, CPU 242 stores the length of each audio signal in RAM 252. CPU 242 additionally compares the length of time of these audio signals with time standards stored in ROM 250, and by such comparisons CPU 242 can determine whether the audio signal received is a busy signal, a telephone ring signal, or some other signal referred to hereafter as an "odd count" signal.

In one presently preferred embodiment of this system, CPU 242 will permit eight telephone ring signals, or three telephone busy signals before instructing line seize relay 202 to open, releasing the telephone line 203. CPU 242 additionally flags the current telephone number stored in RAM 252 as having beed dialed with no answer, counting this as one of the five tries permitted.

If amplifier 208 and detector 210 identify six odd count signals, then, even though no polarity change has been detected, CPU 242 will assume that the accessed telephone number has been answered, since such signals can be generated by a party repeatedly stating "hello" into his telephone. In this situation, CPU 242 causes the tape recorded message to be played to the accessed telephone, as above described.

After the desired telephone number has been "dialed", if no change in polarity is detected, and if no audio signals are detected by amplifier 208 and level detector 210 for a period of approximately fifteen seconds, then CPU 242 will cause line seize relay 202 to open, releasing telephone line 203 and disconnecting the circuit. CPU 242 will then flag the currently accessed telephone number in RAM 252 as having been dialed, with no answer, constituting one of the five permitted tries. Also, prior to dialing the desired telephone number, when line seize relay 202 seizes the telephone lines 203 and 201, if no dial tone is detected by amplifier 208 and level detector 210 after a preselected time, then CPU 242 will cause line seize relay 202 to disconnect the device from the telephone system. CPU 242 will wait an appropriate period and then will again cause line seize relay 202 to seize the telephone line in an attempt to obtain a dial tone. After each such unsuccessful attempt the currently accessed telephone number is credited with another unsuccessful try. No attempt will be made to dial the desired telephone numbers until a dial tone is detected.

During operation of the calling mode, CPU 242 continues to cause the scanning of keyboard 16. If depression of any key on keyboard 16 is detected, calling mode operation will terminate and CPU 242 will cause the device 10 to return to normal operation in the current time display mode. Thus, the user or a party at the location of device 10 can terminate its operation when it is no longer necessary.

It should be noted that in all cases where the recorded message is played over the telphone lines, CPU 242 will, prior to such playing, determine whether this telephone calling mode of operation was initiated by an alarm signal (as described hereafter), by a signal received from the remote transmitting device, or by a signal indicating that the party did not respond to an on-premise check-in alarm (as described more fully hereafter). In the last two cases, the incapacitated party will most likely be on the premises or in the nearby vicinity, and thus to indicate this fact, CPU 242 transmits a signal through interface 226 causing tone generator 200 to transmit a series of slow beeping tones which are superimposed upon the transmission of the recorded message. This beeping signal will indicate that the incapacitated party is probably located on or near the premises from which the call is originating.

The remote tape recorder utilizes a continuous tape, which, in the presently preferred embodiment, has a length of ten seconds. From the time the recorded message is activated, CPU 242 monitors the time. After the passage of approximately 12½ seconds, CPU 242 sends a signal through interface 226 causing line seize relay 202 to disconnect the device from telephone lines 203 and 201. Additionally, CPU 242 transmits a signal through interface 226 to tape actuation relay 220 causing that relay to turn the remote tape recorder off by a signal transmitted on lines 219 and 221. When all specified telephone numbers have either been called and answered, or have been tried five times, then CPU 242 returns to the normal operating state wherein it presents the current time on display 12, while scanning the system for any incoming requests from keyboard 16, or for incoming telephone calls if the alarm function has been activated.

It is important to note that the particular time periods and other numerical factors relating to the operation of this system may be varied for use in other embodiments of this device, and such variations are considered to be within the scope of this invention. The various numerical factors utilized herein are given for example purposes only and are not intended to limit or otherwise reduce the scope of the claimed invention.

Having described the method by which device 10 responds to signals requesting activation of the calling mode of operation, the various functions which are available for use in this device will now be discussed.

In addition to using "DELAY" key 30 in the programming of telephone numbers, as described above, delay key 30 additionally functions to postpone the alarm activation of the calling mode. As explained more fully hereafter, the user may preset the designated alarm actuation time of device 10. If the alarm is not deactivated prior to the occurrence of this time, the call mode of operation will be activated. However, the alarm activation of the call mode may be postponed for a predetermined period of time by simply depressing delay button 30, or by addressing device 10 through the telephone system in order to enter such delay, as explained hereafter. In response to the depression of delay key 30, CPU 242 will access the preset delay period which is stored in RAM 252, and add that value to the alarm time which is also stored in RAM 252, replacing the previous alarm time with this new delayed alarm time value.

The preset value for system delay may be entered into the system by first depressing "SET" button 24, of key activations, CPU 242 will cause the prompt "DELAY" preceded by the current delay value as stored in RAM 252 to appear on display 12. The user may modify this delay value by depressing keys on keyboard 16 corresponding to any number between 0 and 69, and then depressing enter key 22. In response to these key activations, CPU 242 will compare the newly entered values with information stored in ROM 250 to determine whether the values are within this valid range, and whether erroneous characters may have been entered. If invalid characters or range are detected, CPU 242 causes the prompt "ERROR" to appear on display 12, discarding the newly entered characters. If no error is detected, CPU 242 replaces the previous delay value in RAM 252 with the new value.

As explained previously, upon initially energizing device 10, the current time is set in device 10 by the user. The current time for use in the device time clock may be reset at any time by the user, by first depressing set button 24 and then depressing clock button 28. From this point, the previously described procedure for setting the time value into device 10 is employed.

In order to set the alarm time at which the call mode of operation is initiated, the user first depresses set key 24, after which he depresses alarm key 32. The procedure subsequent to these actions is identical to that of setting the clock time as described above. During normal system operation (not during programming or other functionally related modes of operation), the alarm of device 10 may be set or turned off by depressing key 32. When alarm key 32 is depressed to turn the alarm on, CPU 242 functions as an alarm controller and responds by causing the current alarm activation time to appear in the right-most digit of display 12, verifying that the alarm is set. Additionally, during its normal scanning functions, CPU 242 will compare the current time with the set alarm time stored in RAM 252, and will activate the calling mode of operation at the specified time. If alarm key 32 is depressed to turn the alarm off, then CPU 242 will cause the alarm time to be removed from display 12, and will not compare the current time with the set alarm time during its scanning process.

The presently preferred embodiment of the telephone alarm system additionally permits the setting of up to five separate "check-in" times, causing the sounding of an audible alarm at the occurrence of those times. Further, if the check-in button 34 of keyboard 16 is not depressed within ten minutes from the initial sounding of the alarm, then CPU 242 causes initiation of the calling mode of operation.

Operationally, the user may set the desired check-in times by first depressing set key 24, after which the check-in key 34 is depressed. In response to these actions, CPU 242 will cause the prompt "NBR?" to appear on display 12, requesting the particular number (from 1 to 5) of the check-in time to be accessed. The user responds by depressing any one of keys 1-5 on keyboard 16. After depression of a key from keyboard 16, CPU 242 will determine if the digit is in fact a valid number between 1 and 5. If CPU 242 finds that the entered character is invalid, that character will be discarded and there will be no visible response of device 10. The user may then depress another character, which should be a digit between 1 and 5 on keyboard 16.

Upon determining that a valid digit has been entered, CPU 242 will access the stored time corresponding to that digit in RAM 252 and will cause display 12 to present the entered digit along with the presently stored check-in time related to that digit. This number may be modified, or may be left the same by the user utilizing the same procedures as outlined above for programming the current time values in the system.

It is noted that in programming the check-in time or any of the telephone numbers within device 10, after depressing set button 24 and the particular function key to be accessed, if the user determines that he wishes to remove that value from the system, without replacing it at all, he may depress clear key 28. When CPU 242 detects the depression of a clear key while in the programming mode with respect to check-in times or telephone numbers, the location of that corresponding data stored in RAM 252 will be accessed, and CPU 242 will purge that data from the system placing blanks in the associated storage location of RAM 252.

It is noted that the check-in function and the alarm function of device 10 are mutually exclusive. The alarm is utilized to activate the calling mode of operation when the user is away from the premises, and thus the check-in feature would not be appropriate in that situation. Conversely, when the user is on the premises, the check-in feature is utilized since it provides an audible signal to the user which he must answer prior to the passage of a set period of time. If the user does not respond to an audible signal by depressing check-in key 34, then the calling mode of operation is initiated but additionally the audible beeping tone is superimposed over the message to indicate that the incapacitated party is likely on or near the premises. Thus, the alarm function and the check-in function perform functions which are necessarily mutually exclusive and thus when one is activated on the device 10, the other one is necessarily deactivated.

It is noted that the check-in function may be placed in operation in the system or removed from operation by depressing the check-in digit 34 on keyboard 16 while the system is in the normal time display mode of operation. Again, display 12 will indicate the prompt "CH-IN" at its far right digit, verifying that the check-in function is activated in device 10.

Having described those functions of device 10 which are utilized by manual operation of the system, it is now necessary to discuss those functions relating to remote operation of this system.

Device 10 may be remotely accessed by calling the telephone number to which device 10 is interconnected. An incoming call is identified by device 10 through detection in the amplifier 208 and level detector 210. When telephone lines 201 and 203 are not seized by line seize relay 202, the sensitivity of amplifier 208 and level detector 210 is reduced by a factor of approximately 100. Therefore, the full (approximately 100 volts) ringing signal is required on the telephone lines 201 and 203 before amplifier 208 and level detector 210 will indicate that an audio signal is present.

A signal from detector 210 indicating the presence of an incoming call is transmitted through microprocessor bus interface 226 to CPU 242 which acts as the answer controller. If the alarm function is turned off, then CPU 242 will ignore the signal from level detector 210 indicating that audio is present on the line. This prevents the device 10 from siezing the telephone line and in effect answering the telephone when the user may in fact be on the premises. However, if CPU 242 determines that the alarm function is in fact turned on, then in response to the signal from detector 210 that a call is coming in, CPU 242 causes line sieze relay 202 to close, seizing telephone lines 202 and 203, answering the incoming call.

After telephone lines 201 and 203 have been seized by relay 202, CPU 242 transmits a signal through microprocessor bus interface 226 causing tone generator 200 to emit an extended tone indicating that the alarm device 10 has in fact answered the telephone.

After indicating that the telephone has been answered, device 10 awaits instructions from the remote caller. The remote caller communicates with device 10 by means of the buttons of any conventional tone producing telephone such as, for example, telephones currently distributed by American Telephone and Telegraph Company under the trademark TOUCH-TONE. CPU 242 utilizes system clock 246 to determine whether data is still coming, or whether the time between responses of the remote user exceeds some predetermined maximum value. If the wait does exceed this, then CPU 242 causes tone generator 200 to produce and transmit over telephone lines 201 and 203 a rapidly repeating signal, after which line seize relay 202 is instructed to release the line.

Tone detector 212 receives audio signals from the telephone lines 201 and 203 through transformer 206, and upon identifying signals from a tone producing telephone, transmits a signal corresponding to the filtered and decoded tone signal on line 216 to interface 226, and additionally transmits a strobe signal on line 218 to interface 226 verifying that the data on line 216 is valid and should be accepted. Interface 226 will transmit the data to CPU 242 (functioning as the response controller), which will respond in accordance with the type of data transmitted. Particular system responses to various function related signals will now be discussed.

If the accessing party wishes to hear the recorded message, he may do so by depressing the 0 button on any conventional tone producing telephone from which he is calling. Of course, it is clear that this sytem could be modified to additionally accept instructions from dial telephones, and thus such an embodiment is considered to be within the scope of this invention. The signal, transmitted from the tone producing telephone, is transmitted across telephone lines 201 and 203, through transformer 206 and tone detector 212 to interface 226 from which it is transferred to CPU 242.

Upon sensing that a 0 has been depressed by the accessing telephone, CPU 242 transmits a signal through interface 226 to tape actuation relay 220, causing the actuation of the remote tape recorder via lines 219 and 221. Additionally, CPU 242 transmits a signal through interface 226 to amp and filter 222, enabling the audio output of said tape recorder to be transmitted on lines 223 through said amp and filter 222 and through transformer 206 onto telephone lines 201 and 203. CPU 242 causes the remote tape recorder to remain activated for a period of approximately twice the normal playback period of time as calculated through system software. The extended time period for message transmission permits the accessing party to hear two complete playings of the recorded message. At the conclusion of the extended playing period, CPU 242 causes tape actuation relay 220 to terminate the operation of the remote tape recorder through lines 219 and 221.

In order to remotely initiate the operation of any other functions in device 10, the accessing party must first enter a three digit code number via the dial keys of a convention tone producing telephone. The three digit code number is preset in device 10, and is contained either in ROM 250 or alternatively a device for manually setting this code in device 10 may be included, with this coded device being interconnected to CPU 242 so as to permit its comparison with any incoming digits.

Upon receiving three digit signals from the remote tone producing telephone, CPU 242 compares their values with the code stored either in ROM 250 or in a separate hardware device which is connected to CPU 242. If CPU 242 determines that the entered code is invalid, then tone generator 200 is caused to transmit a series of rapidly repeating beeps over lines 201 and 203. CPU 242 causes device 10 to remain on the line in awaiting further acts and attempts from the tone producing telephone. Alternatively, if the entered code is found to be valid by CPU 242, then device 10 awaits additional signals from the tone producing telephone representing further instructions. The three digit code need be entered only once during each phone call, after which all telephone accessible functions may be utilized without further restrictions.

If at any point, a predetermined maximum time period elapses with no response from the remote tone producing telephone, then CPU 242 causes tone generator 200 to transmit a rapid series of beeps over lines 201 and 203. After this, CPU 242 causes line seize relay 202 to release lines 201 and 203, terminating the connection.

Upon receiving a new signal from the tone producing telephone, CPU 242 compares it with a series of acceptable values as stored in ROM 250. If a characteris found to be valid, then CPU 242 performs in accordance therewith, as more fully explained hereafter.

The remote user may delay the alarm activation of the calling mode by depressing button 4 on the tone producing telephone. When CPU 242 determines that button 4 has been depressed on the tone producing telephone, it will access the present delay time from RAM 252 and add it to the present alarm time also stored in RAM 252, storing the sum in the alarm time location of RAM 252 as the new alarm time. To verify the new alarm time, CPU 242 causes tone generator 200 to produce a series of audible beeps over the telephone system, corresponding to the new alarm time. For example, if the new alarm time were 1:35, tone generator would be caused to transmit ten beeps to represent a 0 in the left-most time digit location, then after a brief pause device 200 would transmit a single beep indicating that a 1 is present in the digit second from the left. After another brief pause, tone generator 200 would transmit three beeps, indicating that a three exists in the third digit position, and likewise after another brief pause five beeps would be transmitted indicating that the fourth and last digit of the new alarm system is a five.

In order to program an entirely new alarm time, the accessing party depresses button 3 on the tone producing telephone. After depressing button 3, the remote party then presses buttons corresponding to the desired alarm time to be set in device 10. After the entry of new alarm time, the a.m. or p.m. indication is designated by entry of an asterisk (*) for a.m. or a pound sign (#) for p.m. Upon determining that an asterisk or a pound sign has been transmitted, CPU 242 processes the transmitted alarm time to determine whether it is indeed valid. If a valid alarm time has been entered, CPU 242 causes tone generator 200 to play back the alarm time by a series of beeps, in the manner described for verifying the delay function above. However, if an invalid alarm time has been entered, CPU 242 cause tone generator 200 to transmit a series of rapid beeps, while at the same time discarding the invalid alarm time and retaining the pre-existing time. After the series of beeps has been transmitted, CPU 242 awaits further signals from tone producing telephone.

If the accessing party wishes merely to have the alarm time played back to him, with no changes to be made thereto, then, after entering the appropriate access code, the user depresses the "7" button on his tone producing telephone. Device 10 responds by playing out the alarm time in the manner previously described.

If the accessing party wishes to turn the alarm time completely off, he may do so by pressing button 1 on the tone producing telephone. Upon determining that button 1 was depressed, CPU 242 will cause tone generator 200 to transmit a continuous tone for a short time through transmitter 206, and across telephone lines 201 and 203 to the accessing party. This signal notifies the accessing party that he has disabled the alarm function, and that if he breaks the telephone connection, he will be unable to access device 10 from a remote location until after the alarm is manually set to on again. In response to this signal, if the remote user wishes to reactivate the alarm, prior to disconnecting his remote connection, he may depress button 9 on the tone producing telephone. Upon determining that button 9 has been depressed, CPU 242 will be caused to reactivate the operation of the alarm function, and then CPU 242 will await further communication from the remote tone producing telephone in its normal operation mode.

If the accessing party depresses any buttons on the tone producing telephone other than those described above, CPU 242 will determine that these are invalid characters, will discard them, and no action will be taken by device 10 with respect to those invalid characters.

In addition to accessing device 10 manually, or by remote telephone connection, a user may also cause device 10 to function in the call mode of operation by transmitting a signal from a remote activation device. As was noted previously, when a signal from the remote activation device (not shown) is received, device 10 will immediately go into the call mode of operation, regardless of its operation state at the time the signal is received.

In activating the system in this manner, a signal is generated by the remote activation transmitter, which signal is received by antenna 282 and is transmitted into alarm receiver 280 which relays the signal to CPU 242. In response to this signal, CPU 242 causes the initiation of the call mode, and begins accessing and calling the telephone numbers stored in RAM 252 in a method identical to that described above resulting from no user response to an audible check-in alarm.

4. The Electronic Circuitry

By reference to FIGS. 3-6, in conjunction with FIG. 2, one presently preferred embodiment of an electrical circuit accomplishing the above functions is described in detail.

Referring initially to FIG. 3, it will be noted that the portion of the circuit in dashed lines corresponds to the circuit elements described previously with reference to FIG. 2. The transformer 206 of FIG. 2, is comprised of transformer 302 and line capacitor 304.

Line seize relay 202 of FIG. 2 is comprised of a seize relay 306, which is driven by drive transistor 308 with its associated protection diode 310. Drive transistor 308 is driven through resistor 312, which is a current limiting resistor being connected to the output port of the microprocessor at inverter 402. The contacts 316 of relay 306 are utilized to seize or pulse the phone line by drawing current from the telephone lines 201 and 203 through resistor 314.

Loop polarity detector 204 of FIG. 4 is comprised of a line connected in series to the contact 316 of relay 306, causing the telephone loop current to flow from telephone line 201 through resistor 314, past contacts 316 to a parallel combination made up of optoisolator 326, which includes emitter 325 and detector 327, in series with resistor 324, with this combination being in parallel with Zener diode 322. The Zener diode 322 is used to provide continuity for the current in the opposite polarity from the optoisolator emitter 325, and also to limit the amount of voltage which may be impressed across the optoisolator emitter 325, thus protecting that device. Additionally, capacitor 334, resistor 336 and capacitor 338 are used to couple the audio signal past switch contact 316 and past optoisolator 322, to impress the signal across tranformer 302 in order to provide ringing detection for incoming calls. Capacitor 304 is also used for DC isolation of transformer 302 from a telephone line and for coupling of all signals across transformer 302.

Transmission of the recorded message to the telephone lines 201 and 203 is accomplished through amplifier and filter 222 described in more detail in FIG. 3. The tape audio signal comes in on cable 340, and passes through resistor 342 and capacitor 344 to two back-to-back diodes 346 and 348 which limit the audio amplitude and cause clipping if the amplitude exceeds a specified level. The audio signal is then passed through capacitor 350, resistors 352, 354 and 356, and capacitors 358 and 360 which comprise a band pass configuration with respect to amplifier 362, having resistor 364 for output linearization. The succeeding stage is configured in exactly the same relationship, namely with the signal traveling through resistors 366, 368 and 370, and capacitors 372 and 374 in a band pass relationship with amplifier 376 which has a resistor 378 for output linearization. Thus, those two band pass filter stages form a four pole low pass filter to limit the amount of out of band signal applied to the telephone lines 201 and 203. The output from AMP 376 passes through transmission gate 380, and through transformer 206 to the telephone lines 201 and 203.

Tape actuation relay 220 of FIG. 2 is connected to the output port of interface 226. As seen in FIG. 3, that signal passes through resistor 382 to transistor 384 and its associated protection diode 386 to relay 388. The contacts 394 of relay 388 are connected in series with resistor 396, which is a current limiting resistor to limit the amount of current and to eliminate contact sticking which could be caused by excessive current through the contacts.

Referring now to FIG. 4, the circuit corresponding to block 211 of FIG. 2 is continued. The tone generator, 200 of FIG. 2, consists of a timer circuit 402 together with timing components consisting of resistor 404 and resistor 406 and timing capacitor 408. These components comprise an astable oscillator oscillating at approximately 1000 cycles per second. The output of timer 402 is applied to resistor 410 and filtering capacitor 412, and then travels through transmission gate 414 to transformer 302 of FIG. 3. The signal is then coupled through the components as previously explained with respect to FIG. 3, onto the telephone line 201 and 203.

Amplifier 208 of FIG. 2 includes resistors 416 and 418 which comprises a voltage divider which is utilized to set a reference voltage level for all inputs of amplifier 420 and also all inputs of amplifier 422 in block 210. The audio signal from telephone lines 201 and 203 is coupled through transformer 203, and then travels across capacitor 424 and through resistor 426 into the input of amplifier 420. Resistor 428 is a feedback resistor, with the combination of resistors 426 and 428 setting the gain of amplifier 420.

The output signal from amplifier 420 travels into the audio level detector, block 210 of FIG. 2. The signal from amplifier 420 is rectified in diode 430, resistor 432 and capacitor 434. Resistor 432 is utilized to set the attack time, and resistor 436 sets the decay time of this circuitry. Resistors 438 and 440 are utilized to set the gain of amplifier 422, which is an operational amplifier configured as a Schmidt trigger with resistors 440 and 438 setting the hysteresis factor of that trigger. The output from amplifier 422 is fed to the input port of interface 226 of FIG. 2.

Block 212 of FIG. 2 comprises the tone filter and decoder of the system. The incoming signal is coupled through capacitor 442 into filter 444. Capacitor 446 is utilized as a filter to eliminate any high frequency noise which may be coupled across the telephone lines 221 or 223. Resistor 448 is a bias resistor used to bias the input of filter 444 to its proper value. Filter 444 has an onboard oscillator, which is utilized for its internal clock, and also for the clock of decoder 456. Resistor 450, crystal 452 and capacitor 454 comprise the external components for the internal oscillator of filter 444. The output of filter 444 is split into two separate band pass outputs, which are passed into decoder 456. Resistors 458 and 460 and capacitor 462 form the attack filter of decoder 456. These components are used to set the amount of time a valid input must be present for the outputs of decoder 456 to be valid. The output of decoder 456 is applied to the input ports of interface 226 of FIG. 2, as is the strobe output of decoder 456 which indicates that valid data is present upon the other outputs of that decoder.

Block 224 of FIG. 2 comprises the audible alarm interface. Interface 224 is comprised of an interconnection with the output ports of interface 226 of FIG. 2, permitting signals to be transmitted through resistor 464 to drive transistor 466 in turning on the audible alarm device 468, described by block 225 of FIG. 2.

Block 226 comprises the microprocessor bus interface of FIG. 2, and is specifically comprised of logic gate 470 which obtains inverted signals from the select logic 240 of FIG. 2, for controlling the two input ports 472 and 474 of the device microprocessor referred to as CPU 242 in FIG. 2. Another logic gate 476 accepts the inverted outputs from select logic 240 of FIG. 2, and utilizes these in the control of the output port 478 associated with microprocessor CPU 242 of FIG. 2. The output lines from output port 478 are interconnected through inverters 402, which invert and buffer all signals exiting from output port 478.

Figure 5:
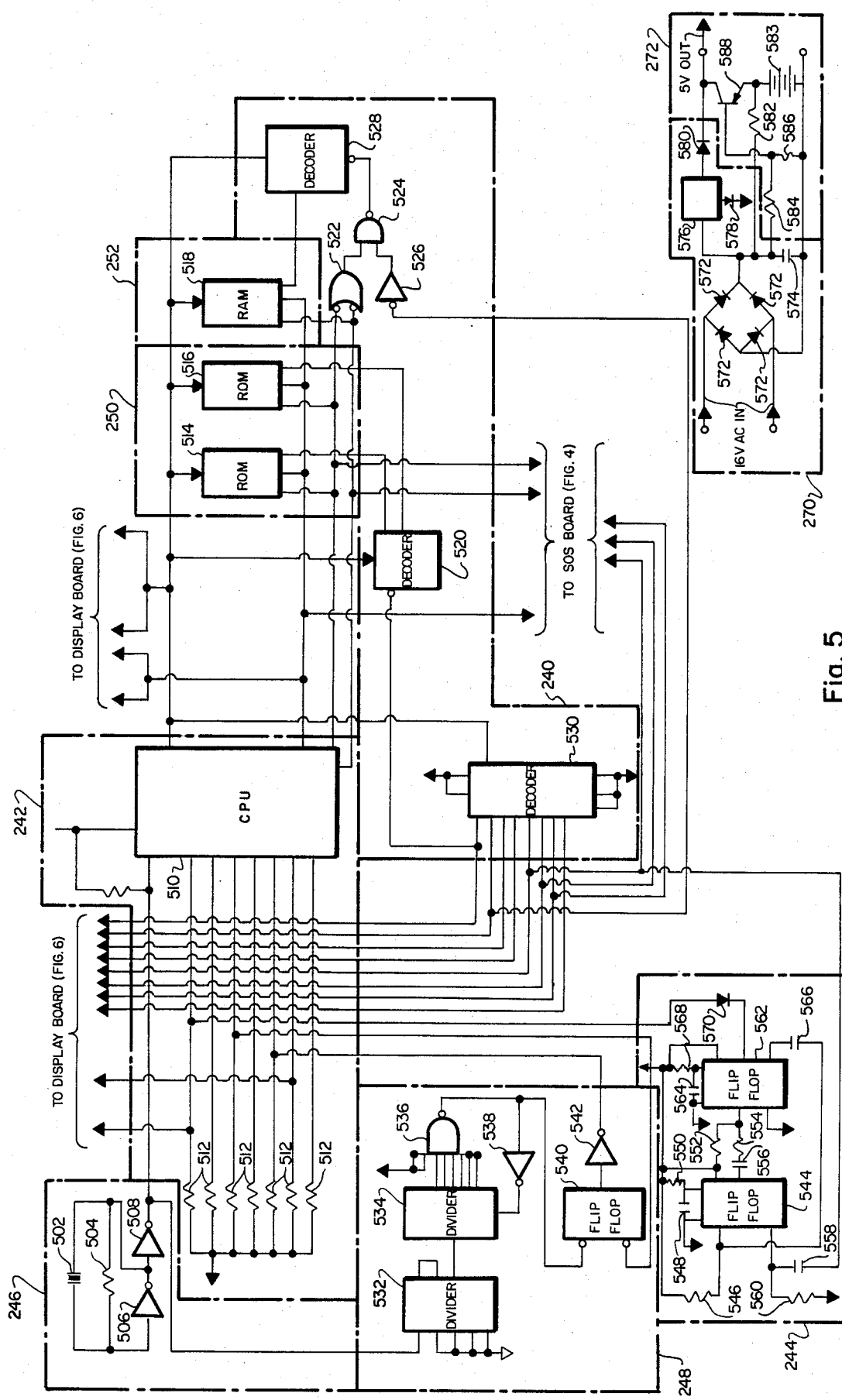
FIG. 5 is a schematic diagram illustrating the microprocessor of the present invention, as well as its associated memory and a portion of the control circuitry of the present invention.

With reference to FIG. 5, the circuitry related directly with the system microprocessor is described. Block 246 describes the system clock, which is interconnected to the central processing unit 242 and the countdown chain 248. Specifically, system clock 246 comprises a crystal 502 in parallel with resistor 504 which is in turn in parallel with a high gain inverter 506. The above series of components are in series connection with a second high gain inverter 508 used as a buffer, whose output is transferred to CPU 242 as the system clock. The output of system clock 246 is additionally utilized by countdown chain 248 in generating sequential software interrupts for use with this system.

CPU 242 of FIG. 2 is comprised of microprocessor 510, which may be one of the well known microprocessors such as a Zilog Z80. Resistors 512 comprise pull up resistors for the input lines to microprocessor 510, utilized for preventing spurious inputs into this device.

ROM 250 of FIG. 2 is comprised of two parallel connected read only memories 514 and 516, which can comprise one of the many types of read only memories which are available. RAM 252 of FIG. 2 is comprised of random accessory memory 518, which may comprise any of numerous such memories which are commonly available.

Select logic 240 of FIG. 2 segregates the addressable memory of ROM 250 and RAM 252 into partitions to enable the CPU 242 to communicate with any of the various components of the device 10.

An OR gate 522 having inverting input lines connected to the output of CPU 510 has its output entering one side of AND gate 524. Additionally, the output of inverter 526 is connected to the other input of AND gate 524, this combination of elements comprising the control logic for the decoding logic 528 for RAM 518. Select logic 530 controls the other portions of block 240, and is utilized to determine the proper logic elements to enable during the operation of the entire device. Two of the outputs from 530 go respectively to the ROM control 520 and RAM control 528, with the other outputs being directed to display board (261) as depicted on FIG. 6, and SOS interface board (211) as depicted in FIGS. 3 and 4.

Countdown chain 248 of FIG. 2 is comprised of divider 532, using the output of system clock 246 for its clock pulse, being interconnected with divider 534. The output of divider 534 goes through NAND gate 536, the signal output therefrom being inverted in inverter 538 and fed back into the reset connection of divider 534 to set the precise countdown division ratio of divider 534. The signal from NAND gate 536 is additionally utilized on the inverted input of SR FLIP FLOP 540. The output from FLIP FLOP 540 is inverted in inverter 542, from whence it is presented as an interrupt signal to microprocessor 510. In response to this interrupt signal, CPU 510 generates a signal which resets FLIP FLOP 540.

Watchdog timer 244 of FIG. 2 is comprised of FLIP FLOP 544 and associated elements including resistor 546, capacitor 548, resistor 550, resistor 552 and 554, capacitor 556, capacitor 558 and resistor 560. Additionally, FLIP FLOP 562 has additional components including capacitor 564, capacitor 566, and resistor 568. The function of watchdog timer 244 consists of two one shot multivibrators with one triggering the other and with the first one shot being reset continually through capacitor 558 by the presence of signals on a memory access output line from microprocessor 510. Capacitors 548 and 564 and resistors 550 and 568 determine the timing of the multivibrators. The other circuit devices of timer 244 are utilized for pull up of voltage and isolation. Isolation diode 570 is used to isolate timer 244 from the main reset line. Timer 244 itself functions to issue a reset signal to CPU 510 should a fault condition be detected.

Power supply 270 consists of diodes 572 which constitute a bridge rectifier, the output of which is filtered by capacitor 574 and transmitted to regulator 576. Diodes 578 and 580 mutually offset one another but allow for an offset utilization of the battery 272.

Battery 272 includes resistor 582 which is a current limiting resistor for the charging current of the battery. Resistors 584 and 586 form a hold off circuit controlling transistor 588, which prevents the battery from being connected to the circuit unitl the input voltage from the power supply drops below a preset level. Transistor 588 is the switch which couples the battery power from battery 583 to the circuit, permitting power flow in the event that the AC power source should fail.

Figure 6:
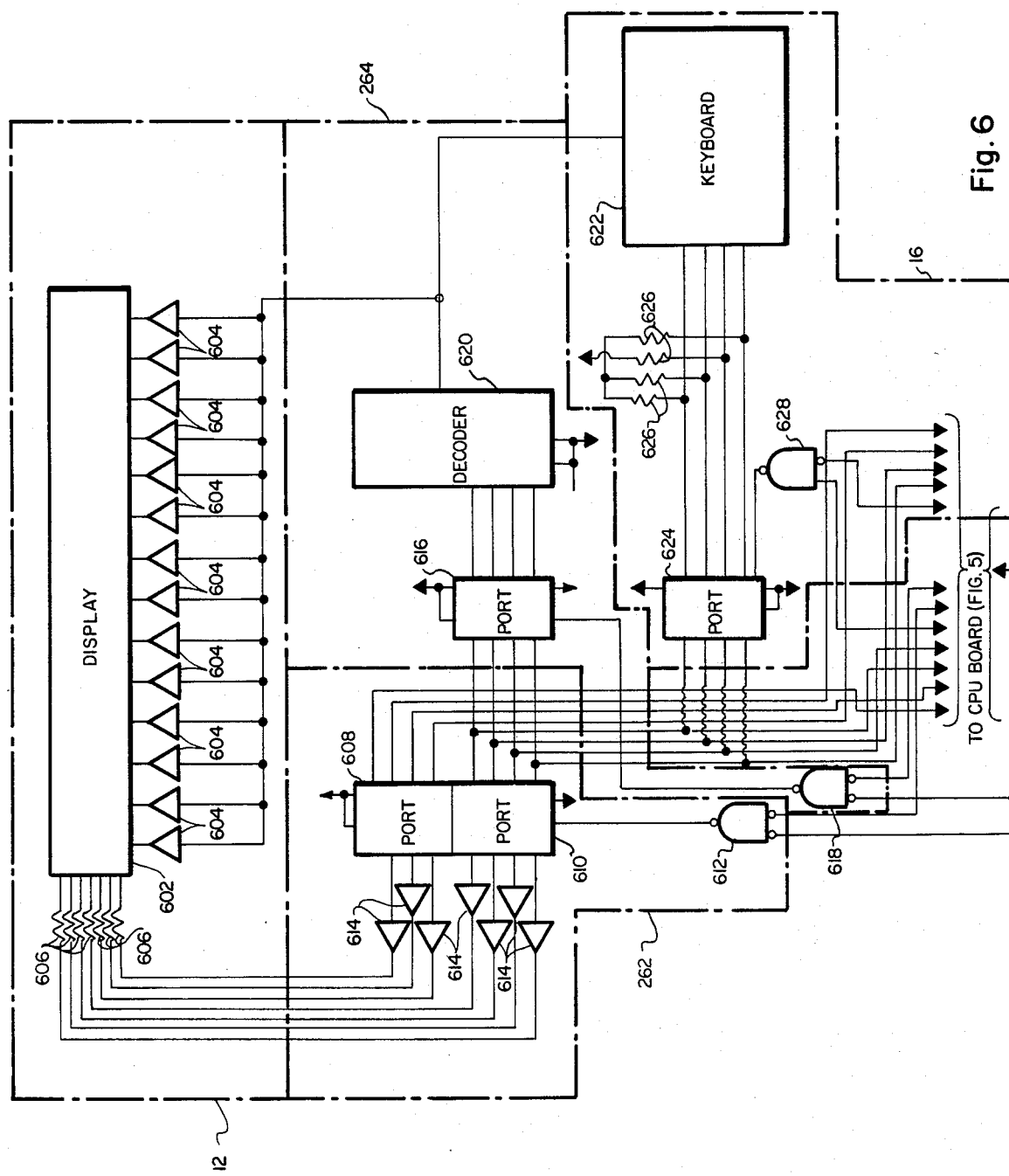
FIG. 6 is a schematic diagram illustrating the display and keyboard of the present invention, along with control devices associated therewith.

By reference to FIG. 6, the display board circuitry, generally designated 261 in FIG. 2, is more fully described.

Display 12 of FIG. 2 is illustrated in FIG. 6 as comprising a common calculator type seven segment display 602 wherein the segments are common to all digits, with the individual digits selected for illumination by digit select lines 604, which are controlled through digit select logic 264. Display 602 may be comprised of any calculator type display, such as a National Semiconductor NSA5140. Current limiting resistors 606 are placed on the display segment lines to protect the display from excessive current, which is transmitted from the device segment logic, block 262.

The display segments of display 602 are accessed through CPU ports 608 and 610, which are themselves selected by CPU 242 through port select inverted AND gate 612. The outputs from ports 608 and 610 are transmitted through buffers 614 and through current limiting resistors 606 to the segment lines of display 602.

Digit select logic 264 identifies and displays particularly specified characters of display 602 in response to signals from CPU 242. Digit select logic 264 includes microprocessor output port 616 through which the signal is transmitted from CPU 242 through port select inverted AND gate 618. The outputs from ports 616 are transmitted to decoder 620, where they are converted from binary to "one of sixteen" form. The display digit control signals from decoder 620 are transmitted through buffers 604 to display 602. Four lines from decoder 620 which are connected to the left-most characters of display 602, are also connected to the columns of keyboard 622 and are utilized in identifying which individual keys of keyboard 622 have been depressed.

Keyboard 16 of FIG. 2 is comprised of a conventional matrix type keyboard 622, the columns of which are connected to decoder 620. Outputs defining individual rows of keyboard 622 are connected to port 624, which is an input port of CPU 242. Pull up resistors 626 are connected to the individual lines between keyboard 622 and port 624, so as to cause the particular line to produce a low signal when its selected row (which is identified by a signal from decoder 620) includes a depressed key. Signals are transmitted through port 624 only when permitted by port select gate 628, in response to a signal from CPU 242.

The microprocessor 241 of this system may be programmed in accordance with the foregoing description in any suitable manner that is adapted for the particular type of microprocessor 241 used. However, in order to fully disclose one presently preferred embodiment of the apparatus and method of the present invention, the computer program listing submitted as Appendix I is incorporated herein by reference. The listing is in Z80 assembly language, and includes programming for monitoring the device status, for setting alarm times, delay times, check-in times, and the likes, for generating and/or responding to signals activating or deactivating the calling sequence, for accessing specified telephone numbers in response to those signals, and for transmitting pre-recorded messages thereto. It should of course be recognized that the invention relies in the apparatus and method defined by the claims, and is not intended to be limited by the representative program listing as set forth in Appendix I.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

---

IN THE UNITED STATES PATENT AND TRADEMARK OFFICE

In re application of                                    )

LON H. KENNARD AND DUANE O. HALL         )

For:      TELEPHONE ALARM SYSTEM                )

---

APPENDIX I

```
0000  31 30 24      1            LD    SP,2430H
0003  ED 56         2  L0003     IM    1
0005  CD 9E 0A      3  L0005     CALL  0A9EH
0008  3E FF         4            LD    A,0FFH
```

```
000A 32 00 60        5         LD    (6000H),A
000D 3A 49 24        6         LD    A,(2449H)
0010 FE 53           7         CP    53H
0012 20 55           8         JR    NZ,L0069
0014 3A 4A 24        9         LD    A,(244AH)
0017 FE 53          10         CP    53H
0019 CA BE 00       11         JP    Z,L00BE
     ASCII >>10$ V  > 2  :I$ S U:J$ S   K<<
001C 18 4B          12         JR    L0069
001E 00             13         NOP
001F 00             14         NOP
0020 00             15         NOP
0021 00             16         NOP
0022 00             17         NOP
0023 00             18         NOP
0024 00             19         NOP
0025 00             20         NOP
0026 00             21         NOP
0027 00             22         NOP
0028 00             23         NOP
0029 00             24         NOP
002A 00             25         NOP
002B 00             26         NOP
002C 00             27         NOP
002D 00             28         NOP
002E 00             29         NOP
002F 00             30         NOP
0030 00             31         NOP
0031 00             32         NOP
0032 00             33         NOP
0033 00             34         NOP
0034 00             35         NOP
0035 00             36         NOP
0036 00             37         NOP
0037 00             38         NOP
0038 C3 A4 00       39         JP    L00A4
     ASCII >>                           <<
003B 00             40         NOP
003C 00             41         NOP
003D 00             42         NOP
003E 00             43         NOP
003F 00             44         NOP
0040 00             45         NOP
0041 00             46         NOP
0042 00             47         NOP
0043 00             48         NOP
0044 00             49         NOP
0045 00             50         NOP
0046 00             51         NOP
0047 00             52         NOP
0048 00             53         NOP
0049 00             54         NOP
004A 00             55         NOP
004B 00             56         NOP
004C 00             57         NOP
004D 00             58         NOP
004E 00             59         NOP
```

```
004F 00              60            NOP
0050 00              61            NOP
0051 00              62            NOP
0052 00              63            NOP
0053 00              64            NOP
0054 00              65            NOP
0055 00              66            NOP
0056 00              67 L0056     NOP
0057 00              68            NOP
0058 00              69            NOP
     ASCII >>                                              <<
0059 00              70            NOP
005A 00              71            NOP
005B 00              72            NOP
005C 00              73            NOP
005D 00              74            NOP
005E 00              75            NOP
005F 00              76            NOP
0060 00              77            NOP
0061 00              78            NOP
0062 00              79            NOP
0063 00              80            NOP
0064 00              81            NOP
0065 00              82            NOP
0066 C3 B5 00        83            JP       L00B5
0069 21 49 24        84 L0069     LD       HL,2449H
006C 3E 53           85            LD       A,53H
006E 77              86            LD       (HL),A
006F 23              87            INC      HL
0070 77              88            LD       (HL),A
0071 AF              89            XOR      A
0072 32 00 A0        90            LD       (0A000H),A
0075 32 4C 24        91            LD       (244CH),A
     ASCII >>              !I$>S #    2   2L$2W<<
0078 32 57 24        92            LD       (2457H),A
007B 32 00 60        93            LD       (6000H),A
007E 32 30 24        94            LD       (2430H),A
0081 06 14           95            LD       B,14H
0083 21 31 24        96            LD       HL,2431H
0086 77              97 L0086     LD       (HL),A
0087 23              98            INC      HL
0088 10 FC           99            DJNZ     L0086
008A 3D              100           DEC      A
008B 32 00 60        101           LD       (6000H),A
008E 3E 06           102           LD       A,6
0090 32 4B 24        103           LD       (244BH),A
0093 21 62 24        104           LD       HL,2462H
     ASCII >>$2    20$  !1$  #    =2  >  2K$!  $> <<
0096 3E 01           105           LD       A,1
0098 77              106           LD       (HL),A
0099 3C              107           INC      A
009A 23              108           INC      HL
009B 77              109           LD       (HL),A
009C AF              110           XOR      A
009D 23              111           INC      HL
009E 77              112           LD       (HL),A
009F 23              113           INC      HL
```

```
00A0 77              114           LD    (HL),A
00A1 C3 5D 06        115           JP    L065D
00A4 E5              116  L00A4    PUSH  HL
00A5 D5              117           PUSH  DE
00A6 C5              118           PUSH  BC
00A7 F5              119           PUSH  AF
00A8 21 4D 24        120           LD    HL,244DH
00AB 34              121           INC   (HL)
00AC CD 51 02        122           CALL  L0251
00AF F1              123           POP   AF
00B0 C1              124           POP   BC
00B1 D1              125           POP   DE
00B2 E1              126           POP   HL
00B3 FB              127           EI
     ASCII >> <#   # #   ]      !M$4 Q         !<<
00B4 C9              128           RET
00B5 21 57 24        129  L00B5    LD    HL,2457H
00B8 CB DE           130           SET   3,(HL)
00BA FB              131           EI
00BB C3 33 08        132           JP    L0833
00BE FB              133  L00BE    EI
00BF CD CA 01        134           CALL  L01CA
00C2 CD CD 02        135           CALL  L02CD
00C5 CD FB 02        136           CALL  L02FB
00C8 CD EB 00        137           CALL  L00EB
00CB CD 58 03        138           CALL  L0358
00CE CD 93 03        139           CALL  L0393
00D1 CA 16 0B        140           JP    Z,0B16H
     ASCII >>W$      3              X             <<
00D4 FE 89           141           CP    89H
00D6 CC 0B 04        142           CALL  Z,L040B
00D9 FE 8A           143           CP    8AH
00DB CA 1F 04        144           JP    Z,L041F
00DE FE 8B           145           CP    8BH
00E0 CC D5 01        146           CALL  Z,L01D5
00E3 FE 0A           147           CP    0AH
00E5 CA A3 01        148           JP    Z,L01A3
00E8 C3 BE 00        149           JP    L00BE
00EB 3A 30 24        150  L00EB    LD    A,(2430H)
00EE CB 47           151           BIT   0,A
00F0 CA 67 01        152           JP    Z,L0167
     ASCII >>                    :O$ G          <<
00F3 11 82 24        153           LD    DE,2482H
00F6 21 80 0F        154           LD    HL,0F80H
00F9 01 05 00        155           LD    BC,L0005
00FC ED B0           156           LDIR
00FE 3A 57 24        157           LD    A,(2457H)
0101 CB 87           158  L0101    RES   0,A
0103 32 57 24        159           LD    (2457H),A
0106 CB 7F           160           BIT   7,A
0108 20 76           161           JR    NZ,L0180
010A 3E 0F           162           LD    A,0FH
010C 32 00 60        163           LD    (6000H),A
010F 21 30 24        164           LD    HL,2430H
     ASCII >>$!    :W$    2W$   > 2  !O$ N<<
0112 CB 4E           165           BIT   1,(HL)
0114 C0              166           RET   NZ
```

```
0115 0E 00           167        LD    C,0
0117 21 31 24        168        LD    HL,2431H
011A 22 5B 24        169        LD    (245BH),HL
011D 06 04           170 L011D  LD    B,4
011F 11 62 24        171        LD    DE,2462H
0122 1A              172 L0122  LD    A,(DE)
0123 BE              173        CP    (HL)
0124 20 46           174        JR    NZ,L016C
0126 23              175        INC   HL
0127 13              176        INC   DE
0128 10 F8           177        DJNZ  L0122
012A 21 57 24        178        LD    HL,2457H
012D CB FE           179        SET   7,(HL)
012F 21 30 24        180        LD    HL,2430H

ASCII  >>    !1$"[$     $    F#    !W$   !0$  <<
0132 CB CE           181        SET   1,(HL)
0134 11 6A 24        182        LD    DE,246AH
0137 21 66 24        183        LD    HL,2466H
013A 01 04 00        184        LD    BC,L0004
013D ED B0           185        LDIR
013F 11 66 24        186        LD    DE,2466H
0142 2A 5B 24        187        LD    HL,(245BH)
0145 01 04 00        188        LD    BC,L0004
0148 ED B0           189        LDIR
014A 21 01 00        190        LD    HL,L0001
014D CD DE 01        191        CALL  L01DE
     ASCII  >>    $!   $      $*[$    !         E<<
0150 11 45 24        192        LD    DE,2445H
0153 21 66 24        193        LD    HL,2466H
0156 01 04 00        194        LD    BC,L0004
0159 ED B0           195        LDIR
015B 11 66 24        196        LD    DE,2466H
015E 21 6A 24        197        LD    HL,246AH
0161 01 04 00        198        LD    BC,L0004
0164 ED B0           199        LDIR
0166 C9              200        RET
0167 AF              201 L0167  XOR   A
0168 32 80 24        202        LD    (2480H),A
016B C9              203        RET
016C 0C              204 L016C  INC   C
016D 3E 05           205        LD    A,5
     ASCII  >>$!  $       $!  $      2 $    >    <<
016F B9              206        CP    C
0170 D8              207        RET   C
0171 79              208        LD    A,C
0172 CB 07           209        RLC   A
0174 CB 07           210        RLC   A
0176 21 31 24        211        LD    HL,2431H
0179 85              212        ADD   A,L
017A 6F              213        LD    L,A
017B 22 5B 24        214        LD    (245BH),HL
017E 18 9D           215        JR    L011D
0180 3E 0E           216 L0180  LD    A,0EH
0182 32 00 60        217        LD    (6000H),A
0185 11 62 24        218        LD    DE,2462H
0188 21 45 24        219        LD    HL,2445H
```

```
018B 06 04         220           LD    B,4
     ASCII >>       !1$   "[$  > 2    $!E$      <<
018D 1A            221 L018D     LD    A,(DE)
018E BE            222           CP    (HL)
018F C0            223           RET   NZ
0190 23            224           INC   HL
0191 13            225           INC   DE
0192 10 F9         226           DJNZ  L018D
0194 21 57 24      227           LD    HL,2457H
0197 CB DE         228           SET   3,(HL)
0199 CB BE         229           RES   7,(HL)
019B 3E 0F         230           LD    A,0FH
019D 32 00 60      231           LD    (6000H),A
01A0 C3 33 08      232           JP    L0833
01A3 3A 57 24      233 L01A3     LD    A,(2457H)
01A6 CB 7F         234           BIT   7,A
01A8 20 18         235           JR    NZ,L01C2
01AA 3A 30 24      236           LD    A,(2430H)
     ASCII >>  #     !W$   > 2   3 :W$   :O$   <<
01AD EE 01         237           XOR   1
01AF 32 30 24      238           LD    (2430H),A
01B2 CB 47         239           BIT   0,A
01B4 CA BE 00      240           JP    Z,L00BE
01B7 3A 57 24      241           LD    A,(2457H)
01BA CB 87         242           RES   0,A
01BC 32 57 24      243           LD    (2457H),A
01BF C3 BE 00      244           JP    L00BE
01C2 CB BF         245 L01C2     RES   7,A
01C4 32 57 24      246           LD    (2457H),A
01C7 C3 BE 00      247           JP    L00BE
01CA AF            248 L01CA     XOR   A
     ASCII >>20$ G    :W$    2W$     2W$     ! <<
01CB 21 79 24      249           LD    HL,2479H
01CE 06 0F         250           LD    B,0FH
01D0 77            251 L01D0     LD    (HL),A
01D1 23            252           INC   HL
01D2 10 FC         253           DJNZ  L01D0
01D4 C9            254           RET
01D5 3A 57 24      255 L01D5     LD    A,(2457H)
01D8 CB 47         256           BIT   0,A
01DA C8            257           RET   Z
01DB 2A 4B 24      258           LD    HL,(244BH)
01DE 3A 69 24      259 L01DE     LD    A,(2469H)
01E1 84            260           ADD   A,H
01E2 CD ED 01      261           CALL  L01ED
01E5 3A 68 24      262           LD    A,(2468H)
01E8 85            263           ADD   A,L
     ASCII >>$     #    :W$ G *K$: $    : $    <<
01E9 CD 04 02      264           CALL  L0204
01EC C9            265           RET
01ED 32 69 24      266 L01ED     LD    (2469H),A
01F0 CB 7F         267           BIT   7,A
01F2 28 04         268           JR    Z,L01F8
01F4 FE 8A         269           CP    8AH
01F6 18 02         270           JR    L01FA
01F8 FE 0A         271 L01F8     CP    0AH
01FA D8            272 L01FA     RET   C
```

```
01FB DE 0A           273           SBC    A,0AH
01FD 32 69 24        274           LD     (2469H),A
0200 3A 68 24        275           LD     A,(2468H)
0203 3C              276           INC    A
0204 32 68 24        277 L0204    LD     (2468H),A
    ASCII >>   2 $  (        2 $: $<2 $   <<
0207 FE 06           278           CP     6
0209 D8              279           RET    C
020A DE 06           280           SBC    A,6
020C 32 68 24        281           LD     (2468H),A
020F 3A 67 24        282           LD     A,(2467H)
0212 3C              283           INC    A
0213 32 67 24        284           LD     (2467H),A
0216 FE 02           285           CP     2
0218 28 1B           286           JR     Z,L0235
021A FE 03           287           CP     3
021C D8              288           RET    C
021D 3A 66 24        289           LD     A,(2466H)
0220 FE 01           290           CP     1
0222 30 20           291           JR     NC,L0244
0224 3A 67 24        292           LD     A,(2467H)
    ASCII >>   2 $: $<2 $  (   : $ O : $  <<
0227 FE 0A           293           CP     0AH
0229 D8              294           RET    C
022A DE 0A           295           SBC    A,0AH
022C 32 67 24        296           LD     (2467H),A
022F 3E 01           297           LD     A,1
0231 32 66 24        298           LD     (2466H),A
0234 C9              299           RET
0235 3A 66 24        300 L0235    LD     A,(2466H)
0238 FE 01           301           CP     1
023A C0              302           RET    NZ
023B 3A 69 24        303           LD     A,(2469H)
023E EE 80           304           XOR    80H
0240 32 69 24        305           LD     (2469H),A
0243 C9              306           RET
0244 3A 67 24        307 L0244    LD     A,(2467H)
    ASCII >>   2 $> 2 $ : $   : $ 2 $ : $  <<
0247 DE 02           308           SBC    A,2
0249 32 67 24        309           LD     (2467H),A
024C AF              310           XOR    A
024D 32 66 24        311           LD     (2466H),A
0250 C9              312           RET
0251 3A 4D 24        313 L0251    LD     A,(244DH)
0254 FE 7D           314           CP     7DH
0256 D8              315           RET    C
0257 D6 7D           316           SUB    7DH
0259 32 4D 24        317           LD     (244DH),A
025C 3A 4E 24        318           LD     A,(244EH)
025F 3C              319           INC    A
0260 32 4E 24        320           LD     (244EH),A
0263 FE 06           321           CP     6
    ASCII >>2 $ 2 $ :M$    2M$:N$<2N$   <<
0265 D8              322           RET    C
0266 AF              323           XOR    A
0267 32 4E 24        324           LD     (244EH),A
026A 21 30 24        325           LD     HL,2430H
```

```
026D CB 8E       326          RES   1,(HL)
026F 3A 65 24    327          LD    A,(2465H)
0272 3C          328          INC   A
0273 32 65 24    329          LD    (2465H),A
0276 4F          330          LD    C,A
0277 E6 OF       331          AND   OFH
0279 FE 0A       332          CP    0AH
027B 79          333          LD    A,C
027C D8          334          RET   C
027D CB 7F       335          BIT   7,A
027F 28 04       336          JR    Z,L0285
0281 3E 80       337          LD    A,80H
    ASCII >>2N$!O$   :  $<2  $0          (  >   <<
0283 18 01       338          JR    L0286
0285 AF          339 L0285    XOR   A
0286 32 65 24    340 L0286    LD    (2465H),A
0289 3A 64 24    341          LD    A,(2464H)
028C 3C          342          INC   A
028D 32 64 24    343          LD    (2464H),A
0290 FE 06       344          CP    6
0292 D8          345          RET   C
0293 AF          346          XOR   A
0294 32 64 24    347          LD    (2464H),A
0297 3A 63 24    348          LD    A,(2463H)
029A 3C          349          INC   A
029B 32 63 24    350          LD    (2463H),A
029E FE 0A       351          CP    0AH
02A0 38 09       352          JR    C,L02AB
    ASCII >>  2  $:  $<2  $    2  $:  $<2  $   8   2<<
02A2 AF          353          XOR   A
02A3 32 63 24    354          LD    (2463H),A
02A6 3C          355          INC   A
02A7 32 62 24    356          LD    (2462H),A
02AA C9          357          RET
02AB 3A 62 24    358 L02AB    LD    A,(2462H)
02AE FE 01       359          CP    1
02B0 C0          360          RET   NZ
02B1 3A 63 24    361          LD    A,(2463H)
02B4 FE 02       362          CP    2
02B6 20 09       363          JR    NZ,L02C1
02B8 3A 65 24    364          LD    A,(2465H)
02BB EE 80       365          XOR   80H
02BD 32 65 24    366          LD    (2465H),A
    ASCII >>  $<2  $  :  $   :  $   :  $   2  $  <<
02C0 C9          367          RET
02C1 FE 03       368 L02C1    CP    3
02C3 C0          369          RET   NZ
02C4 AF          370          XOR   A
02C5 32 62 24    371          LD    (2462H),A
02C8 3C          372          INC   A
02C9 32 63 24    373          LD    (2463H),A
02CC C9          374          RET
02CD 11 79 24    375 L02CD    LD    DE,2479H
02D0 21 62 24    376          LD    HL,2462H
02D3 06 04       377          LD    B,4
02D5 7E          378 L02D5    LD    A,(HL)
02D6 CB BF       379          RES   7,A
```

```
02D8 4F              380            LD     C,A
02D9 3E 04           381            LD     A,4
02DB B8              382            CP     B
02DC 20 07           383            JR     NZ,L02E5
   ASCII >>    2 $<2 $    $! $       O>        <<
02DE 79              384            LD     A,C
02DF FE 00           385            CP     0
02E1 20 03           386            JR     NZ,L02E6
02E3 18 04           387            JR     L02E9
02E5 79              388 L02E5      LD     A,C
02E6 CD 45 06        389 L02E6      CALL   L0645
02E9 12              390 L02E9      LD     (DE),A
02EA 13              391            INC    DE
02EB 23              392            INC    HL
02EC 10 E7           393            DJNZ   L02D5
02EE 2B              394            DEC    HL
02EF CB 7E           395            BIT    7,(HL)
02F1 28 04           396            JR     Z,L02F7
02F3 3E 67           397            LD     A,67H
02F5 12              398 L02F5      LD     (DE),A
02F6 C9              399            RET
02F7 3E 77           400 L02F7      LD     A,77H
02F9 18 FA           401            JR     L02F5
02FB 3A 57 24        402 L02FB      LD     A,(2457H)
   ASCII >>      E     #    + ( )    >     :W$ G<<
02FE CB 47           403            BIT    0,A
0300 C8              404            RET    Z
0301 C5              405            PUSH   BC
0302 D5              406 L0302      PUSH   DE
0303 E5              407            PUSH   HL
0304 21 30 24        408            LD     HL,2430H
0307 CB 86           409            RES    0,(HL)
0309 06 04           410            LD     B,4
030B 21 66 24        411            LD     HL,2466H
030E 11 82 24        412            LD     DE,2482H
0311 7E              413 L0311      LD     A,(HL)
0312 4F              414            LD     C,A
0313 3E 04           415            LD     A,4
0315 B8              416            CP     B
0316 20 04           417            JR     NZ,L031C
0318 AF              418            XOR    A
0319 B9              419            CP     C
031A 28 06           420            JR     Z,L0322
   ASCII >>       !O$    ! $   $ O>      (    <<
031C 79              421 L031C     LD     A,C
031D CB BF           422            RES    7,A
031F CD 45 06        423            CALL   L0645
0322 12              424 L0322      LD     (DE),A
0323 13              425            INC    DE
0324 23              426            INC    HL
0325 10 EA           427            DJNZ   L0311
0327 2B              428            DEC    HL
0328 CB 7E           429            BIT    7,(HL)
032A 28 13           430            JR     Z,L033F
032C 3E 67           431            LD     A,67H
032E 11 86 24        432 L032E      LD     DE,2486H
0331 12              433            LD     (DE),A
```

```
0332 3A 66 24        434          LD      A,(2466H)
0335 21 62 24        435          LD      HL,2462H
0338 BE              436          CP      (HL)
0339 28 08           437          JR      Z,L0343
     ASCII >>  E  #   + ( > $ : $! $ (    <<
033B E1              438 L033B    POP     HL
033C D1              439          POP     DE
033D C1              440          POP     BC
033E C9              441          RET
033F 3E 77           442 L033F    LD      A,77H
0341 18 EB           443          JR      L032E
0343 06 03           444 L0343    LD      B,3
0345 11 66 24        445          LD      DE,2466H
0348 13              446 L0348    INC     DE
0349 23              447          INC     HL
034A 1A              448          LD      A,(DE)
034B BE              449          CP      (HL)
034C 20 ED           450          JR      NZ,L033B
034E 10 F8           451          DJNZ    L0348
0350 21 57 24        452          LD      HL,2457H
0353 CB 9E           453          RES     3,(HL)
0355 C3 33 08        454          JP      L0833
0358 C5              455 L0358    PUSH    BC
     ASCII >>   >    $ #      !W$    3    <<
0359 D5              456          PUSH    DE
035A E5              457          PUSH    HL
035B 00              458          NOP
035C 00              459          NOP
035D 06 0F           460          LD      B,0FH
035F 0E 01           461          LD      C,1
0361 21 79 24        462          LD      HL,2479H
0364 AF              463 L0364    XOR     A
0365 32 00 C0        464          LD      (0C000H),A
0368 7E              465          LD      A,(HL)
0369 32 00 A0        466          LD      (0A000H),A
036C 79              467          LD      A,C
036D 32 00 C0        468          LD      (0C000H),A
0370 11 56 00        469          LD      DE,L0056
0373 AF              470          XOR     A
0374 1B              471 L0374    DEC     DE
0375 BA              472          CP      D
0376 20 FC           473          JR      NZ,L0374
     ASCII >>     ! $ 2   2   2  V     <<
0378 BB              474          CP      E
0379 20 F9           475          JR      NZ,L0374
037B 23              476          INC     HL
037C 0C              477          INC     C
037D 10 E5           478          DJNZ    L0364
037F AF              479          XOR     A
0380 32 00 A0        480          LD      (0A000H),A
0383 18 B6           481          JR      L033B
0385 11 79 24        482 L0385    LD      DE,2479H
0388 AF              483          XOR     A
0389 12              484          LD      (DE),A
038A 13              485          INC     DE
038B 12              486          LD      (DE),A
038C 13              487          INC     DE
```

```
038D 01 0C 00        488         LD      BC,L000C
0390 ED B0           489         LDIR
0392 C9              490         RET
0393 C5              491 L0393   PUSH    BC
0394 D5              492         PUSH    DE
0395 E5              493         PUSH    HL
     ASCII >> #     2       $             :Y<<
0396 3A 59 24        494         LD      A,(2459H)
0399 FE 00           495         CP      0
039B 20 32           496         JR      NZ,L03CF
039D 06 04           497         LD      B,4
039F 78              498 L039F   LD      A,B
03A0 32 00 C0        499         LD      (0C000H),A
03A3 3A 00 80        500         LD      A,(8000H)
03A6 E6 0F           501         AND     0FH
03A8 FE 0F           502         CP      0FH
03AA 20 04           503         JR      NZ,L03B0
03AC 10 F1           504         DJNZ    L039F
03AE 18 1C           505         JR      L03CC
03B0 21 58 24        506 L03B0   LD      HL,2458H
03B3 77              507         LD      (HL),A
     ASCII >>$      2   2    :      !X$     <<
03B4 16 FF           508         LD      D,0FFH
03B6 3A 00 80        509 L03B6   LD      A,(8000H)
03B9 E6 0F           510         AND     0FH
03BB BE              511         CP      (HL)
03BC 20 0E           512         JR      NZ,L03CC
03BE 15              513         DEC     D
03BF 20 F5           514         JR      NZ,L03B6
03C1 4F              515         LD      C,A
03C2 78              516         LD      A,B
03C3 32 59 24        517         LD      (2459H),A
03C6 79              518         LD      A,C
03C7 CD E8 03        519         CALL    L03E8
03CA 18 18           520         JR      L03E4
03CC AF              521 L03CC   XOR     A
03CD 18 15           522         JR      L03E4
03CF 16 FF           523 L03CF   LD      D,0FFH
03D1 32 00 C0        524         LD      (0C000H),A
     ASCII >>:      0 2Y$            2 : <<
03D4 3A 00 80        525 L03D4   LD      A,(8000H)
03D7 E6 0F           526         AND     0FH
03D9 FE 0F           527         CP      0FH
03DB 20 EF           528         JR      NZ,L03CC
03DD 15              529         DEC     D
03DE 20 F4           530         JR      NZ,L03D4
03E0 AF              531         XOR     A
03E1 32 59 24        532         LD      (2459H),A
03E4 E1              533 L03E4   POP     HL
03E5 D1              534         POP     DE
03E6 C1              535         POP     BC
03E7 C9              536         RET
03E8 2F              537 L03E8   CPL
03E9 E6 0F           538         AND     0FH
03EB CD F9 03        539         CALL    L03F9
03EE 07              540         RLCA
03EF 07              541         RLCA
```

```
03F0 05              542          DEC    B
03F1 B0              543          OR     B
     ASCII >>        2Y$     /             ! <<
03F2 21 00 0F        544          LD     HL,0F00H
03F5 85              545          ADD    A,L
03F6 6F              546          LD     L,A
03F7 7E              547          LD     A,(HL)
03F8 C9              548          RET
03F9 4F              549 L03F9    LD     C,A
03FA E6 03           550          AND    3
03FC 28 02           551          JR     Z,L0400
03FE 3D              552          DEC    A
03FF C9              553          RET
     ASCII >>     0    ( =  <<
0400 79              555 L0400    LD     A,C
0401 CB 57           556          BIT    2,A
0403 20 03           557          JR     NZ,L0408
0405 3E 03           558          LD     A,3
0407 C9              559          RET
0408 3E 02           560 L0408    LD     A,2
040A C9              561          RET
040B 3A 57 24        562 L040B    LD     A,(2457H)
040E EE 01           563          XOR    1
0410 32 57 24        564          LD     (2457H),A
0413 CB 47           565          BIT    0,A
0415 CA BE 00        566          JP     Z,L00BE
0418 AF              567          XOR    A
0419 32 30 24        568          LD     (2430H),A
041C C3 BE 00        569          JP     L00BE
     ASCII >>   W  >  >   :W$   2W$  G     20$    <<
041F AF              570 L041F    XOR    A
0420 32 5A 24        571          LD     (245AH),A
0423 21 44 0F        572          LD     HL,0F44H
0426 CD 85 03        573          CALL   L0385
0429 CD 58 03        574 L0429    CALL   L0358
042C CD 93 03        575          CALL   L0393
042F FE 89           576          CP     89H
0431 CA 6D 06        577          JP     Z,L066D
0434 FE 8A           578          CP     8AH
0436 CA EE 04        579          JP     Z,L04EE
0439 FE 8C           580          CP     8CH
043B CA 5D 06        581          JP     Z,L065D
     ASCII >>  2Z$!D    X              ] <<
043E FE 8B           582          CP     8BH
0440 28 07           583          JR     Z,L0449
0442 FE 0A           584          CP     0AH
0444 CA 54 06        585          JP     Z,L0654
0447 20 E0           586          JR     NZ,L0429
0449 21 74 0F        587 L0449    LD     HL,0F74H
044C CD 85 03        588          CALL   L0385
044F 3A 4B 24        589          LD     A,(244BH)
0452 CD 45 06        590          CALL   L0645
0455 32 79 24        591          LD     (2479H),A
0458 3A 4C 24        592          LD     A,(244CH)
045B CD 45 06        593          CALL   L0645
     ASCII >>   (   T   !    :K$ E 2 $:L$ E <<
045E 32 7A 24        594          LD     (247AH),A
```

```
0461 AF              595         XOR   A
0462 32 5A 24        596         LD    (245AH),A
0465 32 85 24        597         LD    (2485H),A
0468 32 86 24        598         LD    (2486H),A
046B 3E FE           599         LD    A,0FEH
046D 32 6A 24        600         LD    (246AH),A
0470 32 6B 24        601         LD    (246BH),A
0473 CD 58 03        602 L0473   CALL  L0358
0476 CD 93 03        603         CALL  L0393
0479 FE 00           604         CP    0
047B 28 F6           605         JR    Z,L0473
     ASCII >>2 $ 2Z$2 $2 $> 2 $2 $ X    ( <<
047D FE 8D           606         CP    8DH
047F 28 4D           607         JR    Z,L04CE
0481 FE 88           608         CP    88H
0483 28 29           609         JR    Z,L04AE
0485 CB 7F           610         BIT   7,A
0487 20 EA           611         JR    NZ,L0473
0489 FE 0A           612         CP    0AH
048B 20 01           613         JR    NZ,L048E
048D AF              614         XOR   A
048E F5              615 L048E   PUSH  AF
048F 3A 6B 24        616         LD    A,(246BH)
0492 32 6A 24        617         LD    (246AH),A
0495 CD 45 06        618         CALL  L0645
0498 32 85 24        619         LD    (2485H),A
     ASCII >>  (M  ()              : $2 $ E 2 $<<
049B F1              620         POP   AF
049C 32 6B 24        621         LD    (246BH),A
049F CD 45 06        622         CALL  L0645
04A2 32 86 24        623         LD    (2486H),A
04A5 3A 5A 24        624         LD    A,(245AH)
04A8 3C              625         INC   A
04A9 32 5A 24        626         LD    (245AH),A
04AC 18 C5           627         JR    L0473
04AE 3A 6A 24        628 L04AE   LD    A,(246AH)
04B1 32 6B 24        629         LD    (246BH),A
04B4 CD 45 06        630         CALL  L0645
04B7 32 86 24        631         LD    (2486H),A
     ASCII >> 2 $ E 2 $:Z$<2Z$   : $2 $ E 2 $<<
04BA 3E FE           632         LD    A,0FEH
04BC 32 6A 24        633         LD    (246AH),A
04BF CD 45 06        634         CALL  L0645
04C2 32 85 24        635         LD    (2485H),A
04C5 3A 5A 24        636         LD    A,(245AH)
04C8 3D              637         DEC   A
04C9 32 5A 24        638         LD    (245AH),A
04CC 18 A5           639         JR    L0473
04CE 3A 5A 24        640 L04CE   LD    A,(245AH)
04D1 A7              641         AND   A
04D2 CA BE 00        642         JP    Z,L00BE
04D5 3A 6A 24        643         LD    A,(246AH)
     ASCII >>> 2 $ E 2 $:Z$=2Z$  :Z$   : $<<
04D8 FE 0B           644         CP    0BH
04DA 38 01           645         JR    C,L04DD
04DC AF              646         XOR   A
04DD FE 07           647 L04DD   CP    7
```

```
04DF D2 1D 08        648            JP     NC,L081D
04E2 32 4B 24        649            LD     (244BH),A
04E5 3A 6B 24        650            LD     A,(246BH)
04E8 32 4C 24        651            LD     (244CH),A
04EB C3 BE 00        652            JP     L00BE
04EE 21 2C 0F        653 L04EE      LD     HL,0F2CH
04F1 CD 85 03        654            CALL   L0385
04F4 21 57 24        655            LD     HL,2457H
     ASCII >>   8       2K$:   $2L$    !,    !W$<<
04F7 CB CE           656            SET    1,(HL)
04F9 CD 58 03        657 L04F9      CALL   L0358
04FC CD 93 03        658            CALL   L0393
04FF FE 00           659            CP     0
0501 28 F6           660            JR     Z,L04F9
0503 FE 8D           661            CP     8DH
0505 CA 0C 06        662            JP     Z,L060C
0508 FE 0B           663            CP     0BH
050A 30 ED           664            JR     NC,L04F9
050C FE 0A           665            CP     0AH
050E 20 01           666            JR     NZ,L0511
0510 AF              667            XOR    A
0511 32 5D 24        668 L0511      LD     (245DH),A
0514 07              669            RLCA
     ASCII >>   X      (       0       2]$'<<
0515 07              670            RLCA
0516 47              671            LD     B,A
0517 07              672            RLCA
0518 80              673            ADD    A,B
0519 16 00           674            LD     D,0
051B 5F              675            LD     E,A
051C 21 88 24        676            LD     HL,2488H
051F 19              677            ADD    HL,DE
0520 22 5B 24        678            LD     (245BH),HL
0523 CD CA 01        679 L0523      CALL   L01CA
0526 3A 5D 24        680            LD     A,(245DH)
0529 CD 45 06        681            CALL   L0645
052C 32 79 24        682            LD     (2479H),A
052F 2A 5B 24        683            LD     HL,(245BH)
0532 06 0C           684            LD     B,0CH
     ASCII >>  G   ! $ "[$    :]$ E 2 $*[$    <<
0534 11 7B 24        685            LD     DE,247BH
0537 7E              686 L0537      LD     A,(HL)
0538 E6 0F           687            AND    0FH
053A 28 11           688            JR     Z,L054D
053C FE 0F           689            CP     0FH
053E 28 0A           690            JR     Z,L054A
0540 FE 0B           691            CP     0BH
0542 38 06           692            JR     C,L054A
0544 3E 01           693            LD     A,1
0546 18 05           694            JR     L054D
0548 18 08           695            JR     L0552
054A CD 45 06        696 L054A      CALL   L0645
054D 12              697 L054D      LD     (DE),A
054E 23              698            INC    HL
054F 13              699            INC    DE
0550 10 E5           700            DJNZ   L0537
     ASCII >>   $    (     (    8 >     E  #   <<
```

```
0552 CD 58 03      701 L0552   CALL  L0358
0555 CD 93 03      702         CALL  L0393
0558 FE 00         703         CP    0
055A 28 F6         704         JR    Z,L0552
055C FE 8D         705         CP    8DH
055E CA 0C 06      706         JP    Z,L060C
0561 FE 8A         707         CP    8AH
0563 28 89         708         JR    Z,L04EE
0565 FE 8C         709         CP    8CH
0567 20 0C         710         JR    NZ,L0575
0569 2A 5B 24      711         LD    HL,(245BH)
056C AF            712         XOR   A
056D 06 0C         713         LD    B,0CH
056F 77            714 L056F   LD    (HL),A
     ASCII  >> X      (          (     *[$     <<
0570 23            715         INC   HL
0571 10 FC         716         DJNZ  L056F
0573 18 AE         717         JR    L0523
0575 CB 7F         718 L0575   BIT   7,A
0577 20 D9         719         JR    NZ,L0552
0579 4F            720         LD    C,A
057A CD CA 01      721         CALL  L01CA
057D 06 0C         722         LD    B,0CH
057F 21 6A 24      723         LD    HL,246AH
0582 3E 0C         724         LD    A,0CH
0584 77            725 L0584   LD    (HL),A
0585 23            726         INC   HL
0586 10 FC         727         DJNZ  L0584
0588 AF            728         XOR   A
0589 32 5A 24      729         LD    (245AH),A
058C 21 57 24      730         LD    HL,2457H
     ASCII  >>#        0    ! $>    #    2Z$!W$<<
058F CB AE         731         RES   5,(HL)
0591 3A 5D 24      732         LD    A,(245DH)
0594 CD 45 06      733         CALL  L0645
0597 32 79 24      734         LD    (2479H),A
059A 79            735         LD    A,C
059B 18 38         736         JR    L05D5
059D CD 58 03      737 L059D   CALL  L0358
05A0 CD 93 03      738         CALL  L0393
05A3 FE 00         739         CP    0
05A5 28 F6         740         JR    Z,L059D
05A7 FE 8D         741         CP    8DH
05A9 28 61         742         JR    Z,L060C
05AB FE 8B         743         CP    8BH
     ASCII  >>    :]$ E 2 $  8 X     (   (    <<
05AD 28 59         744         JR    Z,L0608
05AF FE 88         745         CP    88H
05B1 20 22         746         JR    NZ,L05D5
05B3 11 78 24      747         LD    DE,2478H
05B6 21 77 24      748         LD    HL,2477H
05B9 01 0E 00      749         LD    BC,L000E
05BC ED B8         750         LDDR
05BE 3E 0C         751         LD    A,0CH
05C0 12            752         LD    (DE),A
05C1 21 5A 24      753         LD    HL,245AH
05C4 35            754         DEC   (HL)
```

```
05C5 3A 57 24           755         LD      A,(2457H)
05C8 CB EF              756         SET     5,A
05CA 32 57 24           757         LD      (2457H),A
     ASCII >>(Y    "    $! $      >    !Z$5:W$    2W$<<
05CD 3E FF              758         LD      A,0FFH
05CF BE                 759         CP      (HL)
05D0 20 13              760         JR      NZ,L05E5
05D2 34                 761         INC     (HL)
05D3 18 10              762         JR      L05E5
05D5 CB 7F              763 L05D5   BIT     7,A
05D7 20 C4              764         JR      NZ,L059D
05D9 11 6A 24           765         LD      DE,246AH
05DC 21 6B 24           766         LD      HL,246BH
05DF 01 0B 00           767         LD      BC,L000B
05E2 ED B0              768         LDIR
05E4 12                 769         LD      (DE),A
05E5 11 7B 24           770 L05E5   LD      DE,247BH
05E8 06 0C              771         LD      B,0CH
05EA 21 6A 24           772         LD      HL,246AH
     ASCII >>>      4       $! $           $ ! $<<
05ED 7E                 773 L05ED   LD      A,(HL)
05EE CD 45 06           774         CALL    L0645
05F1 12                 775         LD      (DE),A
05F2 23                 776         INC     HL
05F3 13                 777         INC     DE
05F4 10 F7              778         DJNZ    L05ED
05F6 3A 57 24           779         LD      A,(2457H)
05F9 CB 6F              780         BIT     5,A
05FB CB AF              781         RES     5,A
05FD 32 57 24           782         LD      (2457H),A
0600 20 9B              783         JR      NZ,L059D
0602 21 5A 24           784         LD      HL,245AH
0605 34                 785         INC     (HL)
0606 18 95              786         JR      L059D
0608 3E 0F              787 L0608   LD      A,0FH
060A 18 C9              788         JR      L05D5
     ASCII >>  E    #   :W$    2W$    !Z$4   >    <<
060C 3A 5A 24           789 L060C   LD      A,(245AH)
060F FE 00              790         CP      0
0611 CA BE 00           791         JP      Z,L00BE
0614 FE 04              792         CP      4
0616 DA 1D 08           793         JP      C,L081D
0619 ED 5B 5B 24        794         LD      DE,(245BH)
061D 06 0C              795         LD      B,0CH
061F AF                 796         XOR     A
0620 12                 797 L0620   LD      (DE),A
0621 13                 798         INC     DE
0622 10 FC              799         DJNZ    L0620
0624 21 6A 24           800         LD      HL,246AH
0627 ED 5B 5B 24        801         LD      DE,(245BH)
     ASCII >>:Z$            [[$         ! $ [[$<<
062B 3A 5A 24           802         LD      A,(245AH)
062E FE 0D              803         CP      0DH
0630 38 02              804         JR      C,L0634
0632 3E 0C              805         LD      A,0CH
0634 47                 806 L0634   LD      B,A
0635 7E                 807 L0635   LD      A,(HL)
```

```
0636 FE 0C         808           CP    0CH
0638 20 03         809           JR    NZ,L063D
063A 23            810           INC   HL
063B 18 F8         811           JR    L0635
063D 12            812 L063D     LD    (DE),A
063E 13            813           INC   DE
063F 23            814           INC   HL
0640 10 F3         815           DJNZ  L0635
0642 C3 BE 00      816           JP    L00BE
0645 CB 7F         817 L0645     BIT   7,A
0647 28 02         818           JR    Z,L064B
     ASCII >>:Z$  8 > G      #      #        ( <<
0649 AF            819           XOR   A
064A C9            820           RET
064B E5            821 L064B     PUSH  HL
064C 21 10 0F      822           LD    HL,0F10H
064F 85            823           ADD   A,L
0650 6F            824           LD    L,A
0651 7E            825           LD    A,(HL)
0652 E1            826           POP   HL
0653 C9            827           RET
0654 21 57 24      828 L0654     LD    HL,2457H
0657 CB 8E         829           RES   1,(HL)
0659 CB F6         830           SET   6,(HL)
065B 18 17         831           JR    L0674
065D 21 57 24      832 L065D     LD    HL,2457H
0660 CB CE         833           SET   1,(HL)
0662 CB B6         834           RES   6,(HL)
0664 AF            835           XOR   A
0665 32 4D 24      836           LD    (244DH),A
     ASCII >>      !       !W$         !W$       2M$<<
0668 32 4E 24      837           LD    (244EH),A
066B 18 07         838           JR    L0674
066D 21 57 24      839 L066D     LD    HL,2457H
0670 CB 8E         840           RES   1,(HL)
0672 CB B6         841           RES   6,(HL)
0674 AF            842 L0674     XOR   A
0675 32 5A 24      843           LD    (245AH),A
0678 3E FE         844           LD    A,0FEH
067A 21 6A 24      845           LD    HL,246AH
067D 06 04         846           LD    B,4
067F 77            847 L067F     LD    (HL),A
0680 23            848           INC   HL
0681 10 FC         849           DJNZ  L067F
0683 3A 57 24      850           LD    A,(2457H)
     ASCII >>2N$  !W$      2Z$> !  $    #    :W$<<
0686 CB 4F         851           BIT   1,A
0688 20 32         852           JR    NZ,L06BC
068A CB 77         853           BIT   6,A
068C 20 02         854           JR    NZ,L0690
068E 18 37         855           JR    L06C7
0690 21 2C 0F      856 L0690     LD    HL,0F2CH
0693 CD 85 03      857           CALL  L0385
0696 CD 58 03      858 L0696     CALL  L0358
0699 CD 93 03      859           CALL  L0393
069C FE 00         860           CP    0
069E 28 F6         861           JR    Z,L0696
```

```
06A0 FE 06        862           CP    6
06A2 30 F2        863           JR    NC,L0696
    ASCII >> 0 2      7!,    X      (    0 <<
06A4 21 31 24     864           LD    HL,2431H
06A7 4F           865           LD    C,A
06A8 3D           866           DEC   A
06A9 CB 07        867           RLC   A
06AB CB 07        868           RLC   A
06AD 85           869           ADD   A,L
06AE 6F           870           LD    L,A
06AF 22 5B 24     871           LD    (245BH),HL
06B2 79           872           LD    A,C
06B3 CD 45 06     873           CALL  L0645
06B6 32 82 24     874           LD    (2482H),A
06B9 C3 D0 06     875           JP    L06D0
06BC 21 68 0F     876 L06BC     LD    HL,0F68H
06BF CD 85 03     877           CALL  L0385
    ASCII >>!1$0=    "[$   E 2 $      !      <<
06C2 21 62 24     878           LD    HL,2462H
06C5 18 09        879           JR    L06D0
06C7 21 50 0F     880 L06C7     LD    HL,0F50H
06CA CD 85 03     881           CALL  L0385
06CD 21 66 24     882           LD    HL,2466H
06D0 11 79 24     883 L06D0     LD    DE,2479H
06D3 06 04        884           LD    B,4
06D5 7E           885 L06D5     LD    A,(HL)
06D6 4F           886           LD    C,A
06D7 3E 04        887           LD    A,4
06D9 B8           888           CP    B
06DA 20 04        889           JR    NZ,L06E0
06DC AF           890           XOR   A
06DD B9           891           CP    C
06DE 28 06        892           JR    Z,L06E6
    ASCII >>! $    !P    ! $   $   0>    ( <<
06E0 79           893 L06E0     LD    A,C
06E1 CB BF        894           RES   7,A
06E3 CD 45 06     895           CALL  L0645
06E6 12           896 L06E6     LD    (DE),A
06E7 23           897           INC   HL
06E8 13           898           INC   DE
06E9 10 EA        899           DJNZ  L06D5
06EB 2B           900           DEC   HL
06EC CB 7E        901           BIT   7,(HL)
06EE 28 05        902           JR    Z,L06F5
06F0 3E 67        903           LD    A,67H
06F2 12           904 L06F2     LD    (DE),A
06F3 18 14        905           JR    L0709
06F5 3E 77        906 L06F5     LD    A,77H
06F7 18 F9        907           JR    L06F2
06F9 AF           908 L06F9     XOR   A
06FA 2A 5B 24     909           LD    HL,(245BH)
06FD 06 04        910           LD    B,4
    ASCII >>    E  #    + ( >    >    *[$ <<
06FF 77           911 L06FF     LD    (HL),A
0700 23           912           INC   HL
0701 10 FC        913           DJNZ  L06FF
0703 2A 5B 24     914           LD    HL,(245BH)
```

```
0706 C3 D0 06         915            JP     L06D0
0709 CD 58 03         916 L0709      CALL   L0358
070C CD 93 03         917            CALL   L0393
070F FE 00            918            CP     0
0711 28 F6            919            JR     Z,L0709
0713 FE 8D            920            CP     8DH
0715 28 6D            921            JR     Z,L0784
0717 FE 88            922            CP     88H
0719 28 1D            923            JR     Z,L0738
071B FE 8C            924            CP     8CH
     ASCII >>  #   *[$         X           (       (     (    <<
071D CA F9 06         925            JP     Z,L06F9
0720 FE 0A            926            CP     0AH
0722 20 30            927            JR     NZ,L0754
0724 4F               928            LD     C,A
0725 3A 57 24         929            LD     A,(2457H)
0728 CB 77            930            BIT    6,A
072A 79               931            LD     A,C
072B 28 27            932            JR     Z,L0754
072D 3A 5A 24         933            LD     A,(245AH)
0730 FE 00            934            CP     0
0732 79               935            LD     A,C
0733 20 1F            936            JR     NZ,L0754
0735 C3 54 06         937            JP     L0654
0738 11 6D 24         938 L0738      LD     DE,246DH
     ASCII >>            00:W$      ( :Z$         T      $<<
073B 21 6C 24         939            LD     HL,246CH
073E 01 03 00         940            LD     BC,L0003
0741 ED B8            941            LDDR
0743 3E FE            942            LD     A,0FEH
0745 32 6A 24         943            LD     (246AH),A
0748 21 5A 24         944            LD     HL,245AH
074B 35               945            DEC    (HL)
074C 3E FF            946            LD     A,0FFH
074E BE               947            CP     (HL)
074F 20 1E            948            JR     NZ,L076F
0751 34               949            INC    (HL)
0752 18 1B            950            JR     L076F
0754 CB 7F            951 L0754      BIT    7,A
0756 20 B1            952            JR     NZ,L0709
0758 21 5A 24         953            LD     HL,245AH
     ASCII >>! $       >  2 $!Z$5>        4       !Z$<<
075B 34               954            INC    (HL)
075C F5               955            PUSH   AF
075D 21 6B 24         956            LD     HL,246BH
0760 11 6A 24         957            LD     DE,246AH
0763 01 03 00         958            LD     BC,L0003
0766 ED B0            959            LDIR
0768 F1               960            POP    AF
0769 FE 0A            961            CP     0AH
076B 20 01            962            JR     NZ,L076E
076D AF               963            XOR    A
076E 12               964 L076E      LD     (DE),A
076F 21 6A 24         965 L076F      LD     HL,246AH
0772 11 83 24         966            LD     DE,2483H
0775 06 04            967            LD     B,4
0777 7E               968 L0777      LD     A,(HL)
```

```
0778 E6 0F         969           AND    0FH
     ASCII >>4 ! $   $              !  $   $        <<
077A CD 45 06      970           CALL   L0645
077D 12            971           LD     (DE),A
077E 23            972           INC    HL
077F 13            973           INC    DE
0780 10 F5         974           DJNZ   L0777
0782 18 85         975           JR     L0709
0784 3A 5A 24      976 L0784    LD     A,(245AH)
0787 FE 00         977           CP     0
0789 CA BE 00      978           JP     Z,L00BE
078C 21 6A 24      979           LD     HL,246AH
078F FE 04         980           CP     4
0791 20 0E         981           JR     NZ,L07A1
0793 7E            982           LD     A,(HL)
0794 FE 01         983           CP     1
0796 C2 1D 08      984           JP     NZ,L081D
     ASCII >> E  #    :Z$   ! $              <<
0799 23            985           INC    HL
079A 7E            986           LD     A,(HL)
079B FE 03         987           CP     3
079D 30 7E         988           JR     NC,L081D
079F 18 0A         989           JR     L07AB
07A1 23            990 L07A1    INC    HL
07A2 FE 03         991           CP     3
07A4 20 77         992           JR     NZ,L081D
07A6 7E            993           LD     A,(HL)
07A7 FE 00         994           CP     0
07A9 28 72         995           JR     Z,L081D
07AB 23            996 L07AB    INC    HL
07AC 3E 05         997           LD     A,5
07AE BE            998           CP     (HL)
07AF 38 6C         999           JR     C,L081D
07B1 01 04 00      1000          LD     BC,L0004
07B4 3A 57 24      1001          LD     A,(2457H)
     ASCII >># O  #       ( #>  8   :W$<<
07B7 CB 4F         1002          BIT    1,A
07B9 20 06         1003          JR     NZ,L07C1
07BB CB 77         1004          BIT    6,A
07BD 20 07         1005          JR     NZ,L07C6
07BF 18 0B         1006          JR     L07CC
07C1 11 62 24      1007 L07C1   LD     DE,2462H
07C4 18 09         1008          JR     L07CF
07C6 ED 5B 5B 24   1009 L07C6   LD     DE,(245BH)
07CA 18 03         1010          JR     L07CF
07CC 11 66 24      1011 L07CC   LD     DE,2466H
07CF 3A 5A 24      1012 L07CF   LD     A,(245AH)
07D2 FE 04         1013          CP     4
07D4 21 6A 24      1014          LD     HL,246AH
     ASCII >> 0       $   [[$   $:Z$  ! $<<
07D7 28 05         1015          JR     Z,L07DE
07D9 AF            1016          XOR    A
07DA 12            1017          LD     (DE),A
07DB 13            1018          INC    DE
07DC 23            1019          INC    HL
07DD 0B            1020          DEC    BC
07DE ED B0         1021 L07DE   LDIR
```

```
07E0 21 5C 0F        1022              LD      HL,0F5CH
07E3 CD 85 03        1023              CALL    L0385
07E6 3A 57 24        1024              LD      A,(2457H)
07E9 CB 77           1025              BIT     6,A
07EB 28 08           1026              JR      Z,L07F5
07ED 2A 5B 24        1027              LD      HL,(245BH)
07F0 23              1028              INC     HL
07F1 23              1029              INC     HL
07F2 23              1030              INC     HL
07F3 18 0C           1031              JR      L0801
     ASCII >>(     #      !\      :W$   (   *[$###    <<
07F5 CB 4F           1032  L07F5       BIT     1,A
07F7 28 05           1033              JR      Z,L07FE
07F9 21 65 24        1034              LD      HL,2465H
07FC 18 03           1035              JR      L0801
07FE 21 69 24        1036  L07FE       LD      HL,2469H
     ASCII >> O(  !  $  !  $<<
0801 CD 58 03        1038  L0801       CALL    L0358
0804 CD 93 03        1039              CALL    L0393
0807 FE 00           1040              CP      0
0809 28 F6           1041              JR      Z,L0801
080B FE 0A           1042              CP      0AH
080D 28 09           1043              JR      Z,L0818
080F FE 01           1044              CP      1
0811 20 EE           1045              JR      NZ,L0801
0813 CB BE           1046              RES     7,(HL)
0815 C3 BE 00        1047              JP      L00BE
0818 CB FE           1048  L0818       SET     7,(HL)
081A C3 BE 00        1049              JP      L00BE
081D 31 30 24        1050  L081D       LD      SP,2430H
     ASCII >> X       (    (              10$<<
0820 21 20 0F        1051              LD      HL,0F20H
0823 CD 85 03        1052              CALL    L0385
0826 CD 58 03        1053  L0826       CALL    L0358
0829 CD 93 03        1054              CALL    L0393
082C FE 00           1055              CP      0
082E 28 F6           1056              JR      Z,L0826
0830 C3 BE 00        1057              JP      L00BE
0833 AF              1058  L0833       XOR     A
0834 32 5E 24        1059              LD      (245EH),A
0837 31 30 24        1060              LD      SP,2430H
083A 3E 0B           1061              LD      A,0BH
083C 32 00 60        1062              LD      (6000H),A
     ASCII >>!       X      (      2^$10$> 2  <<
083F CD CA 01        1063              CALL    L01CA
0842 3E 0A           1064              LD      A,0AH
0844 CD BF 08        1065              CALL    L08BF
0847 3A 00 40        1066              LD      A,(4000H)
084A E6 04           1067              AND     4
084C 32 4F 24        1068              LD      (244FH),A
084F 21 88 24        1069              LD      HL,2488H
0852 7E              1070  L0852       LD      A,(HL)
0853 E6 0F           1071              AND     0FH
0855 77              1072              LD      (HL),A
0856 23              1073              INC     HL
0857 AF              1074              XOR     A
0858 BD              1075              CP      L
```

```
0859 20 F7              1076            JR      NZ,L0852
085B 21 88 24           1077            LD      HL,2488H
  ASCII >>    >      :  @  20$! $       #       ! $<<
085E 0E 00              1078            LD      C,0
0860 7E                 1079 L0860      LD      A,(HL)
0861 A7                 1080            AND     A
0862 CA 78 0A           1081            JP      Z,0A78H
0865 3E 1E              1082            LD      A,1EH
0867 CD BF 08           1083            CALL    L08BF
086A E5                 1084            PUSH    HL
086B 06 0B              1085            LD      B,0BH
086D 11 7B 24           1086            LD      DE,247BH
0870 7E                 1087 L0870      LD      A,(HL)
0871 E6 0F              1088            AND     0FH
0873 28 11              1089            JR      Z,L0886
0875 FE 0F              1090            CP      0FH
0877 28 0A              1091            JR      Z,L0883
0879 FE 0B              1092            CP      0BH
087B 30 02              1093            JR      NC,L087F
  ASCII >>    >              $  (    (    0 <<
087D 18 04              1094            JR      L0883
087F 3E 01              1095 L087F      LD      A,1
0881 18 03              1096            JR      L0886
0883 CD 45 06           1097 L0883      CALL    L0645
0886 12                 1098 L0886      LD      (DE),A
0887 23                 1099            INC     HL
0888 13                 1100            INC     DE
0889 10 E5              1101            DJNZ    L0870
088B E1                 1102            POP     HL
088C 79                 1103            LD      A,C
088D CD 45 06           1104            CALL    L0645
0890 32 79 24           1105            LD      (2479H),A
0893 AF                 1106            XOR     A
0894 32 7A 24           1107            LD      (247AH),A
0897 3E 0B              1108            LD      A,0BH
0899 32 00 60           1109            LD      (6000H),A
  ASCII >>   >    E  #       E 2 $ 2 $> 2 <<
089C 3E 1E              1110            LD      A,1EH
089E CD BF 08           1111            CALL    L08BF
08A1 3A 00 40           1112            LD      A,(4000H)
08A4 CB 4F              1113            BIT     1,A
08A6 20 72              1114            JR      NZ,91AH
08A8 3E FF              1115            LD      A,0FFH
08AA 32 00 60           1116            LD      (6000H),A
08AD 3E 1E              1117            LD      A,1EH
08AF CD BF 08           1118            CALL    L08BF
08B2 7E                 1119            LD      A,(HL)
08B3 C6 10              1120            ADD     A,10H
08B5 77                 1121            LD      (HL),A
08B6 E6 F0              1122            AND     0F0H
08B8 FE 50              1123            CP      50H
  ASCII >>>       : @ 0  > 2  >          P<<
08BA 30 17              1124            JR      NC,L08D3
08BC C3 78 0A           1125            JP      0A78H
08BF 11 D9 01           1126 L08BF      LD      DE,L01D9
08C2 F5                 1127            PUSH    AF
08C3 AF                 1128            XOR     A
```

```
08C4 1B            1129 L08C4   DEC    DE
08C5 BB            1130         CP     E
08C6 20 FC         1131         JR     NZ,L08C4
08C8 CD 58 03      1132         CALL   L0358
08CB BA            1133         CP     D
08CC 20 F6         1134         JR     NZ,L08C4
08CE F1            1135         POP    AF
08CF 3D            1136         DEC    A
08D0 20 ED         1137         JR     NZ,L08BF
08D2 C9            1138         RET
08D3 21 57 24      1139 L08D3   LD     HL,2457H
08D6 CB 96         1140         RES    2,(HL)
     ASCII >>0            X  =    !W$    <<
08D8 0C            1141         INC    C
08D9 79            1142         LD     A,C
08DA FE 0A         1143         CP     0AH
08DC 38 14         1144         JR     C,L08F2
08DE 0E 00         1145         LD     C,0
08E0 3A 5E 24      1146         LD     A,(245EH)
08E3 FE 0A         1147         CP     0AH
08E5 DA EE 08      1148         JP     C,L08EE
08E8 31 30 24      1149         LD     SP,2430H
08EB C3 BE 00      1150         JP     L00BE
08EE AF            1151 L08EE   XOR    A
08EF 32 5E 24      1152         LD     (245EH),A
08F2 CD 09 09      1153 L08F2   CALL   909H
08F5 3E FF         1154         LD     A,0FFH
     ASCII >>    8   :^$    10$    2^$  > <<
08F7 32 00 60      1155         LD     (6000H),A
08FA 2A 5B 24      1156         LD     HL,(245BH)
08FD CB 7E         1157         BIT    7,(HL)
08FF CA 60 08      1158         JP     Z,L0860
0902 21 5E 24      1159         LD     HL,245EH
0905 34            1160         INC    (HL)
0906 C3 D3 08      1161         JP     L08D3
0909 D5            1162         PUSH   DE
090A 41            1163         LD     B,C
090B 04            1164         INC    B
090C 21 7C 24      1165         LD     HL,247CH
090F 11 0C 00      1166         LD     DE,L000C
0912 19            1167         ADD    HL,DE
0913 10 FD         1168         DJNZ   912H
     ASCII >>2   *[$    !^$4    A ! $     <<
0915 D1            1169         POP    DE
0916 22 5B 24      1170         LD     (245BH),HL
0919 C9            1171         RET
091A AF            1172         XOR    A
091B 32 5F 24      1173         LD     (245FH),A
091E 7E            1174         LD     A,(HL)
091F E6 0F         1175         AND    0FH
0921 FE 0F         1176         CP     0FH
0923 20 10         1177         JR     NZ,935H
0925 E5            1178         PUSH   HL
0926 CD 0B 0B      1179         CALL   0B0BH
0929 CD 6D 09      1180         CALL   96DH
092C E1            1181         POP    HL
092D 3E 28         1182         LD     A,28H
```

```
092F CD BF 08      1183      CALL   L08BF
0932 23            1184      INC    HL
     ASCII >>  "[$   2 $                >(       #<<
0933 18 E9         1185      JR     91EH
0935 FE 0B         1186      CP     0BH
0937 D2 78 0A      1187      JP     NC,0A78H
093A FE 00         1188      CP     0
093C 28 11         1189      JR     Z,94FH
093E CD 3A 0A      1190      CALL   0A3AH
0941 E5            1191      PUSH   HL
0942 21 5F 24      1192      LD     HL,245FH
0945 34            1193      INC    (HL)
0946 3E 0A         1194      LD     A,0AH
0948 BE            1195      CP     (HL)
0949 38 04         1196      JR     C,94FH
094B E1            1197      POP    HL
094C 23            1198      INC    HL
094D 18 CF         1199      JR     91EH
094F 3A 5F 24      1200      LD     A,(245FH)
     ASCII >>        ( :   ! $4>   8  #   : $<<
0952 FE 04         1201      CP     4
0954 DA 78 0A      1202      JP     C,0A78H
0957 3A 57 24      1203      LD     A,(2457H)
095A CB 57         1204      BIT    2,A
095C C2 5E 0A      1205      JP     NZ,0A5EH
095F 3E 04         1206      LD     A,4
0961 CD BF 08      1207      CALL   L08BF
0964 CD 0B 0B      1208      CALL   0B0BH
0967 CD 6D 09      1209      CALL   96DH
096A C3 5E 0A      1210      JP     0A5EH
096D 3A 00 40      1211      LD     A,(4000H)
     ASCII >>      :W$ W ^ >         ^ : @<<
0970 E6 04         1212      AND    4
0972 21 4F 24      1213      LD     HL,244FH
0975 AE            1214      XOR    (HL)
0976 28 0C         1215      JR     Z,984H
0978 3E 02         1216      LD     A,2
097A CD BF 08      1217      CALL   L08BF
097D 3A 00 40      1218      LD     A,(4000H)
0980 E6 04         1219      AND    4
0982 AE            1220      XOR    (HL)
0983 C0            1221      RET    NZ
0984 2A 51 24      1222      LD     HL,(2451H)
0987 23            1223      INC    HL
0988 22 51 24      1224      LD     (2451H),HL
098B 7C            1225      LD     A,H
098C FE 07         1226      CP     7
     ASCII >>    !0$ ( >    : @   *Q$#"Q$    <<
098E D2 2F 0A      1227      JP     NC,0A2FH
0991 3A 00 40      1228      LD     A,(4000H)
0994 CB 4F         1229      BIT    1,A
0996 28 3F         1230      JR     Z,9D7H
0998 3A 57 24      1231      LD     A,(2457H)
099B CB 67         1232      BIT    4,A
099D 28 1C         1233      JR     Z,9BBH
099F 3A 55 24      1234      LD     A,(2455H)
09A2 A7            1235      AND    A
```

| | | | | |
|---|---|---|---|---|
| 09A3 28 16 | 1236 | JR | Z,9BBH |
| 09A5 FE 3C | 1237 | CP | 3CH |
| 09A7 30 12 | 1238 | JR | NC,9BBH |
| 09A9 FE 08 | 1239 | CP | 8 |
| 09AB 30 04 | 1240 | JR | NC,9B1H |

ASCII >> / : @ O(?:W$ ( :U$ ( <O O <<

| | | | | |
|---|---|---|---|---|
| 09AD FE 04 | 1241 | CP | 4 |
| 09AF 30 0A | 1242 | JR | NC,9BBH |
| 09B1 3A 50 24 | 1243 | LD | A,(2450H) |
| 09B4 3C | 1244 | INC | A |
| 09B5 32 50 24 | 1245 | LD | (2450H),A |
| 09B8 FE 06 | 1246 | CP | 6 |
| 09BA D0 | 1247 | RET | NC |
| 09BB AF | 1248 | XOR | A |
| 09BC 32 55 24 | 1249 | LD | (2455H),A |
| 09BF 3A 56 24 | 1250 | LD | A,(2456H) |
| 09C2 3C | 1251 | INC | A |
| 09C3 32 56 24 | 1252 | LD | (2456H),A |
| 09C6 FE 64 | 1253 | CP | 64H |
| 09C8 30 65 | 1254 | JR | NC,0A2FH |
| 09CA 18 04 | 1255 | JR | 9D0H |

ASCII >> O :P$<2P$    2U$:V$<2V$  O  <<

| | | | | |
|---|---|---|---|---|
| 09CC AF | 1256 | XOR | A |
| 09CD 32 56 24 | 1257 | LD | (2456H),A |
| 09D0 3E 01 | 1258 | LD | A,1 |
| 09D2 CD BF 08 | 1259 | CALL | L08BF |
| 09D5 18 96 | 1260 | JR | 96DH |
| 09D7 3A 56 24 | 1261 | LD | A,(2456H) |
| 09DA A7 | 1262 | AND | A |
| 09DB 28 26 | 1263 | JR | Z,0A03H |
| 09DD 3A 57 24 | 1264 | LD | A,(2457H) |
| 09E0 CB 67 | 1265 | BIT | 4,A |
| 09E2 20 07 | 1266 | JR | NZ,9EBH |
| 09E4 CB E7 | 1267 | SET | 4,A |
| 09E6 32 57 24 | 1268 | LD | (2457H),A |
| 09E9 18 E1 | 1269 | JR | 9CCH |

ASCII >> 2V$>    :V$ (&:W$    2W$  <<

| | | | | |
|---|---|---|---|---|
| 09EB 3A 56 24 | 1270 | LD | A,(2456H) |
| 09EE FE 0A | 1271 | CP | 0AH |
| 09F0 38 BF | 1272 | JR | C,9B1H |
| 09F2 FE 14 | 1273 | CP | 14H |
| 09F4 38 2C | 1274 | JR | C,0A22H |
| 09F6 3A 53 24 | 1275 | LD | A,(2453H) |
| 09F9 3C | 1276 | INC | A |
| 09FA 32 53 24 | 1277 | LD | (2453H),A |
| 09FD FE 08 | 1278 | CP | 8 |
| 09FF 30 2E | 1279 | JR | NC,0A2FH |
| 0A01 18 C9 | 1280 | JR | 9CCH |
| 0A03 3A 55 24 | 1281 | LD | A,(2455H) |
| 0A06 3C | 1282 | INC | A |
| 0A07 32 55 24 | 1283 | LD | (2455H),A |

ASCII >>:V$  8  8,:S$<2S$  0. :U$<2U$<<

| | | | | |
|---|---|---|---|---|
| 0A0A 3A 57 24 | 1284 | LD | A,(2457H) |
| 0A0D CB 67 | 1285 | BIT | 4,A |
| 0A0F 28 08 | 1286 | JR | Z,0A19H |
| 0A11 3A 55 24 | 1287 | LD | A,(2455H) |
| 0A14 FE 64 | 1288 | CP | 64H |

```
0A16 38 B8        1289        JR      C,9D0H
0A18 C9           1290        RET
0A19 3A 55 24     1291        LD      A,(2455H)
0A1C FE FF        1292        CP      0FFH
0A1E 20 B0        1293        JR      NZ,9D0H
0A20 18 0D        1294        JR      0A2FH
0A22 3A 54 24     1295        LD      A,(2454H)
0A25 3C           1296        INC     A
0A26 32 54 24     1297        LD      (2454H),A
    ASCII  >>:W$  ( :U$   8  :U$    :T$<2T$<<
0A29 FE 03        1298        CP      3
0A2B 30 02        1299        JR      NC,0A2FH
0A2D 18 9D        1300        JR      9CCH
0A2F 2A 5B 24     1301        LD      HL,(245BH)
0A32 7E           1302        LD      A,(HL)
0A33 C6 10        1303        ADD     A,10H
0A35 77           1304        LD      (HL),A
0A36 F1           1305        POP     AF
0A37 C3 D3 08     1306        JP      L08D3
0A3A E5           1307        PUSH    HL
0A3B 67           1308        LD      H,A
0A3C 3E 0F        1309        LD      A,0FH
0A3E 32 00 60     1310        LD      (6000H),A
0A41 3E 01        1311        LD      A,1
0A43 CD BF 08     1312        CALL    L08BF
0A46 3E 0B        1313        LD      A,0BH
    ASCII  >>   0  *[$        > 2 >     > <<
0A48 32 00 60     1314        LD      (6000H),A
0A4B 3E 01        1315        LD      A,1
0A4D CD BF 08     1316        CALL    L08BF
0A50 7C           1317        LD      A,H
0A51 3D           1318        DEC     A
0A52 67           1319        LD      H,A
0A53 FE 00        1320        CP      0
0A55 20 E5        1321        JR      NZ,0A3CH
0A57 E1           1322        POP     HL
0A58 3E 10        1323        LD      A,10H
0A5A CD BF 08     1324        CALL    L08BF
0A5D C9           1325        RET
0A5E 3E 09        1326        LD      A,9
0A60 32 00 60     1327        LD      (6000H),A
0A63 3A 57 24     1328        LD      A,(2457H)
    ASCII  >>2  >     =       >     > 2  :W$<<
0A66 CB 5F        1329        BIT     3,A
0A68 20 1A        1330        JR      NZ,0A84H
0A6A AF           1331        XOR     A
0A6B CD BF 08     1332        CALL    L08BF
0A6E 3E FF        1333        LD      A,0FFH
0A70 32 00 60     1334        LD      (6000H),A
0A73 3E 3C        1335        LD      A,3CH
0A75 CD BF 08     1336        CALL    L08BF
0A78 2A 5B 24     1337        LD      HL,(245BH)
0A7B CB FE        1338        SET     7,(HL)
0A7D 21 5E 24     1339        LD      HL,245EH
0A80 34           1340        INC     (HL)
0A81 C3 D3 08     1341        JP      L08D3
    ASCII  >>          > 2 ><  *[$  !^$4    <<
```

```
0A84 06 14        1342        LD    B,14H
0A86 3E 01        1343        LD    A,1
0A88 32 00 60     1344        LD    (6000H),A
0A8B 3E 05        1345        LD    A,5
0A8D CD BF 08     1346        CALL  L08BF
0A90 3E 09        1347        LD    A,9
0A92 32 00 60     1348        LD    (6000H),A
0A95 3E 10        1349        LD    A,10H
0A97 CD BF 08     1350        CALL  L08BF
0A9A 10 EA        1351        DJNZ  0A86H
0A9C 18 DA        1352        JR    0A78H
0A9E 0E 00        1353        LD    C,0
0AA0 CD 09 09     1354        CALL  909H
     ASCII  >>  > 2  >      > 2  >             <<
0AA3 AF           1355        XOR   A
0AA4 32 56 24     1356        LD    (2456H),A
0AA7 32 55 24     1357        LD    (2455H),A
0AAA 06 0C        1358        LD    B,0CH
0AAC 7E           1359        LD    A,(HL)
0AAD E6 0F        1360        AND   0FH
0AAF 28 33        1361        JR    Z,0AE4H
0AB1 FE 0F        1362        CP    0FH
0AB3 28 06        1363        JR    Z,0ABBH
0AB5 FE 0B        1364        CP    0BH
0AB7 30 1F        1365        JR    NC,0AD8H
0AB9 18 0B        1366        JR    0AC6H
0ABB 3A 56 24     1367        LD    A,(2456H)
0ABE 3C           1368        INC   A
0ABF FE 02        1369        CP    2
     ASCII  >>  2V$2U$     (3    (    0   :V$<   <<
0AC1 30 15        1370        JR    NC,0AD8H
0AC3 32 56 24     1371        LD    (2456H),A
0AC6 23           1372        INC   HL
0AC7 3A 55 24     1373        LD    A,(2455H)
0ACA FE 01        1374        CP    1
0ACC 30 0A        1375        JR    NC,0AD8H
0ACE 10 DC        1376        DJNZ  0AACH
0AD0 0C           1377        INC   C
0AD1 3E 09        1378        LD    A,9
0AD3 B9           1379        CP    C
0AD4 30 CA        1380        JR    NC,0AA0H
0AD6 18 18        1381        JR    0AF0H
0AD8 2A 5B 24     1382        LD    HL,(245BH)
0ADB 06 0C        1383        LD    B,0CH
0ADD AF           1384        XOR   A
0ADE 77           1385        LD    (HL),A
     ASCII  >>0  2V$#:U$  0   >   0   *[$   <<
0ADF 23           1386        INC   HL
0AE0 10 FC        1387        DJNZ  0ADEH
0AE2 18 EC        1388        JR    0AD0H
0AE4 3A 55 24     1389        LD    A,(2455H)
0AE7 3C           1390        INC   A
0AE8 32 55 24     1391        LD    (2455H),A
0AEB 23           1392        INC   HL
0AEC 10 BE        1393        DJNZ  0AACH
0AEE 18 E0        1394        JR    0AD0H
0AF0 06 04        1395        LD    B,4
```

```
0AF2 21 66 24        1396        LD    HL,2466H
0AF5 7E              1397        LD    A,(HL)
0AF6 E6 7F           1398        AND   7FH
0AF8 FE 0B           1399        CP    0BH
0AFA 30 04           1400        JR    NC,0B00H
0AFC 23              1401        INC   HL
     ASCII  >>#       :U$<2U$#     ! $       0  #<<
0AFD 10 F6           1402        DJNZ  0AF5H
0AFF C9              1403        RET
0B00 21 66 24        1404        LD    HL,2466H
0B03 AF              1405        XOR   A
0B04 06 04           1406        LD    B,4
0B06 77              1407        LD    (HL),A
0B07 23              1408        INC   HL
0B08 10 FC           1409        DJNZ  0B06H
0B0A C9              1410        RET
0B0B AF              1411        XOR   A
0B0C 21 50 24        1412        LD    HL,2450H
0B0F 06 07           1413        LD    B,7
0B11 77              1414        LD    (HL),A
0B12 23              1415        INC   HL
0B13 10 FC           1416        DJNZ  0B11H
0B15 C9              1417        RET
0B16 21 BE 00        1418        LD    HL,L00BE
0B19 E5              1419        PUSH  HL
0B1A 3A 57 24        1420        LD    A,(2457H)
     ASCII  >>   ! $       #        !P$    #    !  :W$<<
0B1D CB 47           1421        BIT   0,A
0B1F C8              1422        RET   Z
0B20 3A 00 40        1423        LD    A,(4000H)
0B23 CB 4F           1424        BIT   1,A
0B25 C8              1425        RET   Z
0B26 06 14           1426        LD    B,14H
0B28 3A 00 40        1427        LD    A,(4000H)
0B2B CB 4F           1428        BIT   1,A
0B2D C8              1429        RET   Z
0B2E 3E 01           1430        LD    A,1
0B30 CD BF 08        1431        CALL  L08BF
0B33 10 F3           1432        DJNZ  0B28H
0B35 3E 20           1433        LD    A,20H
0B37 CD BF 08        1434        CALL  L08BF
0B3A 3E 03           1435        LD    A,3
     ASCII  >> G : @ 0    : @ 0 >     >      > <<
0B3C 32 00 60        1436        LD    (6000H),A
0B3F 3E 10           1437        LD    A,10H
0B41 CD BF 08        1438        CALL  L08BF
0B44 3E 0B           1439        LD    A,0BH
0B46 32 00 60        1440        LD    (6000H),A
0B49 AF              1441        XOR   A
0B4A 32 55 24        1442        LD    (2455H),A
0B4D 32 56 24        1443        LD    (2456H),A
0B50 3A 00 40        1444        LD    A,(4000H)
0B53 E6 04           1445        AND   4
0B55 32 4F 24        1446        LD    (244FH),A
0B58 C3 CF 0C        1447        JP    0CCFH
     ASCII  >>2  >     > 2   2U$2V$: @  20$      <<
0B5B CD 0B 0B        1448        CALL  0B0BH
```

| | | | |
|---|---|---|---|
| 0B5E 3E 01 | 1449 | LD | A,1 |
| 0B60 CD BF 08 | 1450 | CALL | L08BF |
| 0B63 3A 00 40 | 1451 | LD | A,(4000H) |
| 0B66 CB 4F | 1452 | BIT | 1,A |
| 0B68 28 11 | 1453 | JR | Z,0B7BH |
| 0B6A AF | 1454 | XOR | A |
| 0B6B 32 55 24 | 1455 | LD | (2455H),A |
| 0B6E 3A 56 24 | 1456 | LD | A,(2456H) |
| 0B71 3C | 1457 | INC | A |
| 0B72 32 56 24 | 1458 | LD | (2456H),A |
| 0B75 FE FF | 1459 | CP | 0FFH |
| 0B77 30 33 | 1460 | JR | NC,0BACH |

ASCII >>    >    :  @ 0(    2U$:V$<2V$    03<<

| | | | |
|---|---|---|---|
| 0B79 18 0F | 1461 | JR | 0B8AH |
| 0B7B AF | 1462 | XOR | A |
| 0B7C 32 56 24 | 1463 | LD | (2456H),A |
| 0B7F 3A 55 24 | 1464 | LD | A,(2455H) |
| 0B82 3C | 1465 | INC | A |
| 0B83 32 55 24 | 1466 | LD | (2455H),A |
| 0B86 FE FF | 1467 | CP | 0FFH |
| 0B88 30 22 | 1468 | JR | NC,0BACH |
| 0B8A 3A 00 40 | 1469 | LD | A,(4000H) |
| 0B8D 21 4F 24 | 1470 | LD | HL,244FH |
| 0B90 E6 04 | 1471 | AND | 4 |
| 0B92 AE | 1472 | XOR | (HL) |
| 0B93 20 17 | 1473 | JR | NZ,0BACH |
| 0B95 3A 00 40 | 1474 | LD | A,(4000H) |

ASCII >>    2V$:U$<2U$    0":  @!0$    :  @<<

| | | | |
|---|---|---|---|
| 0B98 CB 5F | 1475 | BIT | 3,A |
| 0B9A 28 C2 | 1476 | JR | Z,0B5EH |
| 0B9C 32 6F 24 | 1477 | LD | (246FH),A |
| 0B9F 3E 01 | 1478 | LD | A,1 |
| 0BA1 CD BF 08 | 1479 | CALL | L08BF |
| 0BA4 3A 00 40 | 1480 | LD | A,(4000H) |
| 0BA7 CB 5F | 1481 | BIT | 3,A |
| 0BA9 20 F4 | 1482 | JR | NZ,0B9FH |
| 0BAB C9 | 1483 | RET | |
| 0BAC 06 0A | 1484 | LD | B,0AH |
| 0BAE 3E 03 | 1485 | LD | A,3 |
| 0BB0 32 00 60 | 1486 | LD | (6000H),A |
| 0BB3 3E 02 | 1487 | LD | A,2 |
| 0BB5 CD BF 08 | 1488 | CALL | L08BF |

ASCII >>   ( 2 $>    : @    > 2 >    <<

| | | | |
|---|---|---|---|
| 0BB8 3E 0B | 1489 | LD | A,0BH |
| 0BBA 32 00 60 | 1490 | LD | (6000H),A |
| 0BBD 3E 02 | 1491 | LD | A,2 |
| 0BBF CD BF 08 | 1492 | CALL | L08BF |
| 0BC2 10 EA | 1493 | DJNZ | 0BAEH |
| 0BC4 3E 0F | 1494 | LD | A,0FH |
| 0BC6 32 00 60 | 1495 | LD | (6000H),A |
| 0BC9 3E 04 | 1496 | LD | A,4 |
| 0BCB CD BF 08 | 1497 | CALL | L08BF |
| 0BCE 31 30 24 | 1498 | LD | SP,2430H |
| 0BD1 C3 BE 00 | 1499 | JP | L00BE |
| 0BD4 CD 5B 0B | 1500 | CALL | 0B5BH |

ASCII >>>  2    >       > 2  >    10$    [ <<

| | | | |
|---|---|---|---|
| 0BD7 E6 F0 | 1501 | AND | 0F0H |

```
0BD9 FE 40         1502        CP      40H
0BDB 20 48         1503        JR      NZ,0C25H
0BDD CD D5 01      1504        CALL    L01D5
0BE0 18 25         1505        JR      0C07H
0BE2 FE 03         1506        CP      3
0BE4 20 21         1507        JR      NZ,0C07H
0BE6 3A 66 24      1508        LD      A,(2466H)
0BE9 FE 01         1509        CP      1
0BEB 20 0C         1510        JR      NZ,0BF9H
0BED 3E 80         1511        LD      A,80H
0BEF 32 66 24      1512        LD      (2466H),A
0BF2 3E 01         1513        LD      A,1
0BF4 32 67 24      1514        LD      (2467H),A
     ASCII >>    @ H    %    !:  $    > 2 $> 2 $<<
0BF7 18 0E         1515        JR      0C07H
0BF9 FE 81         1516        CP      81H
0BFB 20 0A         1517        JR      NZ,0C07H
0BFD 3E 01         1518        LD      A,1
0BFF 32 66 24      1519        LD      (2466H),A
     ASCII >>         > 2 $<<
0C02 3E 02         1521        LD      A,2
0C04 32 67 24      1522        LD      (2467H),A
0C07 21 66 24      1523        LD      HL,2466H
0C0A 06 04         1524        LD      B,4
0C0C 7E            1525        LD      A,(HL)
0C0D E6 0F         1526        AND     0FH
0C0F 28 0D         1527        JR      Z,0C1EH
0C11 CD 27 0D      1528        CALL    0D27H
0C14 23            1529        INC     HL
0C15 3E 0A         1530        LD      A,0AH
0C17 CD BF 08      1531        CALL    L08BF
0C1A 10 F0         1532        DJNZ    0C0CH
0C1C 18 B6         1533        JR      0BD4H
0C1E 3E 0A         1534        LD      A,0AH
     ASCII >>> 2 $! $     (   ´ #>       > <<
0C20 CD 27 0D      1535        CALL    0D27H
0C23 18 EF         1536        JR      0C14H
0C25 FE 10         1537        CP      10H
0C27 20 19         1538        JR      NZ,0C42H
0C29 3A 57 24      1539        LD      A,(2457H)
0C2C CB 87         1540        RES     0,A
0C2E 32 57 24      1541        LD      (2457H),A
0C31 3E 03         1542        LD      A,3
0C33 32 00 60      1543        LD      (6000H),A
0C36 3E 20         1544        LD      A,20H
0C38 CD BF 08      1545        CALL    L08BF
0C3B 3E 0B         1546        LD      A,0BH
0C3D 32 00 60      1547        LD      (6000H),A
     ASCII >> ´     :W$   2W$> 2   >     > 2 <<
0C40 18 92         1548        JR      0BD4H
0C42 FE 70         1549        CP      70H
0C44 28 C1         1550        JR      Z,0C07H
0C46 FE 30         1551        CP      30H
0C48 CA 5B 0C      1552        JP      Z,0C5BH
0C4B FE 90         1553        CP      90H
0C4D C2 D4 0B      1554        JP      NZ,0BD4H
0C50 3A 57 24      1555        LD      A,(2457H)
```

```
0C53 CB C7              1556        SET     0,A
0C55 32 57 24           1557        LD      (2457H),A
0C58 C3 D4 0B           1558        JP      0BD4H
0C5B 21 6A 24           1559        LD      HL,246AH
     ASCII >>    ( O [      :W$   2W$   ! $<<
0C5E AF                 1560        XOR     A
0C5F 06 04              1561        LD      B,4
0C61 77                 1562        LD      (HL),A
0C62 23                 1563        INC     HL
0C63 10 FC              1564        DJNZ    0C61H
0C65 CD 5B 0B           1565        CALL    0B5BH
0C68 3A 6F 24           1566        LD      A,(246FH)
0C6B E6 F0              1567        AND     0F0H
0C6D FE B0              1568        CP      0B0H
0C6F 28 20              1569        JR      Z,0C91H
0C71 FE C0              1570        CP      0C0H
0C73 20 0A              1571        JR      NZ,0C7FH
0C75 3A 6D 24           1572        LD      A,(246DH)
0C78 CB FF              1573        SET     7,A
0C7A 32 6D 24           1574        LD      (246DH),A
     ASCII >>     #   [ : $    (    : $  2 $<<
0C7D 18 12              1575        JR      0C91H
0C7F 0F                 1576        RRCA
0C80 0F                 1577        RRCA
0C81 0F                 1578        RRCA
0C82 0F                 1579        RRCA
0C83 21 6B 24           1580        LD      HL,246BH
0C86 11 6A 24           1581        LD      DE,246AH
0C89 01 03 00           1582        LD      BC,L0003
0C8C ED B0              1583        LDIR
0C8E 12                 1584        LD      (DE),A
0C8F 18 D4              1585        JR      0C65H
0C91 3A 6A 24           1586        LD      A,(246AH)
0C94 FE 02              1587        CP      2
0C96 D2 0D 0D           1588        JP      NC,0D0DH
0C99 FE 00              1589        CP      0
     ASCII >>       ! $   $      : $       <<
0C9B 28 0A              1590        JR      Z,0CA7H
0C9D 3A 6B 24           1591        LD      A,(246BH)
0CA0 FE 03              1592        CP      3
0CA2 D2 0D 0D           1593        JP      NC,0D0DH
0CA5 18 08              1594        JR      0CAFH
0CA7 3A 6B 24           1595        LD      A,(246BH)
0CAA FE 0B              1596        CP      0BH
0CAC D2 0D 0D           1597        JP      NC,0D0DH
0CAF 3A 6C 24           1598        LD      A,(246CH)
0CB2 FE 06              1599        CP      6
0CB4 D2 0D 0D           1600        JP      NC,0D0DH
0CB7 3A 6D 24           1601        LD      A,(246DH)
     ASCII >>( : $      : $    : $     : $<<
0CBA E6 0F              1602        AND     0FH
0CBC FE 0B              1603        CP      0BH
0CBE D2 0D 0D           1604        JP      NC,0D0DH
0CC1 21 6A 24           1605        LD      HL,246AH
0CC4 11 66 24           1606        LD      DE,2466H
0CC7 01 04 00           1607        LD      BC,L0004
0CCA ED B0              1608        LDIR
```

```
0CCC C3 07 0C        1609        JP      0C07H
0CCF CD 5B 0B        1610        CALL    0B5BH
0CD2 E6 F0           1611        AND     0F0H
0CD4 FE A0           1612        CP      0A0H
0CD6 20 1E           1613        JR      NZ,0CF6H
     ASCII >>     !  $    $          [        <<
0CD8 3E 09           1614        LD      A,9
0CDA 32 00 60        1615        LD      (6000H),A
0CDD 3E FF           1616        LD      A,0FFH
0CDF CD BF 08        1617        CALL    L08BF
0CE2 CD BF 08        1618        CALL    L08BF
0CE5 3E 03           1619        LD      A,3
0CE7 32 00 60        1620        LD      (6000H),A
0CEA 3E 05           1621        LD      A,5
0CEC CD BF 08        1622        CALL    L08BF
0CEF 3E 0B           1623        LD      A,0BH
0CF1 32 00 60        1624        LD      (6000H),A
0CF4 18 D9           1625        JR      0CCFH
     ASCII >>> 2  >         > 2  >      > 2    <<
0CF6 FE 70           1626        CP      70H
0CF8 20 13           1627        JR      NZ,0D0DH
0CFA CD 5B 0B        1628        CALL    0B5BH
0CFD E6 F0           1629        AND     0F0H
0CFF FE 60           1630        CP      60H
0D01 20 0A           1631        JR      NZ,0D0DH
0D03 CD 5B 0B        1632        CALL    0B5BH
0D06 E6 F0           1633        AND     0F0H
0D08 FE 70           1634        CP      70H
0D0A CA D4 0B        1635        JP      Z,0BD4H
0D0D 06 0A           1636        LD      B,0AH
0D0F 3E 03           1637        LD      A,3
0D11 32 00 60        1638        LD      (6000H),A
     ASCII >>       [         [         > 2   <<
0D14 3E 01           1639        LD      A,1
0D16 CD BF 08        1640        CALL    L08BF
0D19 3E 0B           1641        LD      A,0BH
0D1B 32 00 60        1642        LD      (6000H),A
0D1E 3E 01           1643        LD      A,1
0D20 CD BF 08        1644        CALL    L08BF
0D23 10 EA           1645        DJNZ    0D0FH
0D25 18 A8           1646        JR      0CCFH
0D27 C5              1647        PUSH    BC
0D28 47              1648        LD      B,A
0D29 3E 03           1649        LD      A,3
0D2B 32 00 60        1650        LD      (6000H),A
0D2E 3E 05           1651        LD      A,5
0D30 CD BF 08        1652        CALL    L08BF
     ASCII >>>    > 2  >         G> 2  >    <<
0D33 3E 0B           1653        LD      A,0BH
0D35 32 00 60        1654        LD      (6000H),A
0D38 3E 05           1655        LD      A,5
0D3A CD BF 08        1656        CALL    L08BF
0D3D 10 EA           1657        DJNZ    0D29H
0D3F C1              1658        POP     BC
0D40 C9              1659        RET
0D41 00              1660        NOP
0D42 00              1661        NOP
```

| | | |
|---|---|---|
| 0D43 00 | 1662 | NOP |
| 0D44 00 | 1663 | NOP |
| 0D45 00 | 1664 | NOP |
| 0D46 00 | 1665 | NOP |
| 0D47 00 | 1666 | NOP |
| 0D48 00 | 1667 | NOP |
| 0D49 00 | 1668 | NOP |
| 0D4A 00 | 1669 | NOP |
| 0D4B 00 | 1670 | NOP |
| 0D4C 00 | 1671 | NOP |
| 0D4D 00 | 1672 | NOP |
| 0D4E 00 | 1673 | NOP |
| 0D4F 00 | 1674 | NOP |
| 0D50 00 | 1675 | NOP |

ASCII >>> 2 > <<

| | | |
|---|---|---|
| 0D51 00 | 1676 | NOP |
| 0D52 00 | 1677 | NOP |
| 0D53 00 | 1678 | NOP |
| 0D54 00 | 1679 | NOP |
| 0D55 00 | 1680 | NOP |
| 0D56 00 | 1681 | NOP |
| 0D57 00 | 1682 | NOP |
| 0D58 00 | 1683 | NOP |
| 0D59 00 | 1684 | NOP |
| 0D5A 00 | 1685 | NOP |
| 0D5B 00 | 1686 | NOP |
| 0D5C 00 | 1687 | NOP |
| 0D5D 00 | 1688 | NOP |
| 0D5E 00 | 1689 | NOP |
| 0D5F 00 | 1690 | NOP |
| 0D60 00 | 1691 | NOP |
| 0D61 00 | 1692 | NOP |
| 0D62 00 | 1693 | NOP |
| 0D63 00 | 1694 | NOP |
| 0D64 00 | 1695 | NOP |
| 0D65 00 | 1696 | NOP |
| 0D66 00 | 1697 | NOP |
| 0D67 00 | 1698 | NOP |
| 0D68 00 | 1699 | NOP |
| 0D69 00 | 1700 | NOP |
| 0D6A 00 | 1701 | NOP |
| 0D6B 00 | 1702 | NOP |
| 0D6C 00 | 1703 | NOP |
| 0D6D 00 | 1704 | NOP |
| 0D6E 00 | 1705 | NOP |

ASCII >> <<

| | | |
|---|---|---|
| 0D6F 00 | 1706 | NOP |
| 0D70 00 | 1707 | NOP |
| 0D71 00 | 1708 | NOP |
| 0D72 00 | 1709 | NOP |
| 0D73 00 | 1710 | NOP |
| 0D74 00 | 1711 | NOP |
| 0D75 00 | 1712 | NOP |
| 0D76 00 | 1713 | NOP |
| 0D77 00 | 1714 | NOP |
| 0D78 00 | 1715 | NOP |
| 0D79 00 | 1716 | NOP |

| | | |
|---|---|---|
| 0D7A 00 | 1717 | NOP |
| 0D7B 00 | 1718 | NOP |
| 0D7C 00 | 1719 | NOP |
| 0D7D 00 | 1720 | NOP |
| 0D7E 00 | 1721 | NOP |
| 0D7F 00 | 1722 | NOP |
| 0D80 00 | 1723 | NOP |
| 0D81 00 | 1724 | NOP |
| 0D82 00 | 1725 | NOP |
| 0D83 00 | 1726 | NOP |
| 0D84 00 | 1727 | NOP |
| 0D85 00 | 1728 | NOP |
| 0D86 00 | 1729 | NOP |
| 0D87 00 | 1730 | NOP |
| 0D88 00 | 1731 | NOP |
| 0D89 00 | 1732 | NOP |
| 0D8A 00 | 1733 | NOP |
| 0D8B 00 | 1734 | NOP |
| 0D8C 00 | 1735 | NOP |

ASCII >> <<

| | | |
|---|---|---|
| 0D8D 00 | 1736 | NOP |
| 0D8E 00 | 1737 | NOP |
| 0D8F 00 | 1738 | NOP |
| 0D90 00 | 1739 | NOP |
| 0D91 00 | 1740 | NOP |
| 0D92 00 | 1741 | NOP |
| 0D93 00 | 1742 | NOP |
| 0D94 00 | 1743 | NOP |
| 0D95 00 | 1744 | NOP |
| 0D96 00 | 1745 | NOP |
| 0D97 00 | 1746 | NOP |
| 0D98 00 | 1747 | NOP |
| 0D99 00 | 1748 | NOP |
| 0D9A 00 | 1749 | NOP |
| 0D9B 00 | 1750 | NOP |
| 0D9C 00 | 1751 | NOP |
| 0D9D 00 | 1752 | NOP |
| 0D9E 00 | 1753 | NOP |
| 0D9F 00 | 1754 | NOP |
| 0DA0 00 | 1755 | NOP |
| 0DA1 00 | 1756 | NOP |
| 0DA2 00 | 1757 | NOP |
| 0DA3 00 | 1758 | NOP |
| 0DA4 00 | 1759 | NOP |
| 0DA5 00 | 1760 | NOP |
| 0DA6 00 | 1761 | NOP |
| 0DA7 00 | 1762 | NOP |
| 0DA8 00 | 1763 | NOP |
| 0DA9 00 | 1764 | NOP |
| 0DAA 00 | 1765 | NOP |

ASCII >> <<

| | | |
|---|---|---|
| 0DAB 00 | 1766 | NOP |
| 0DAC 00 | 1767 | NOP |
| 0DAD 00 | 1768 | NOP |
| 0DAE 00 | 1769 | NOP |
| 0DAF 00 | 1770 | NOP |
| 0DB0 00 | 1771 | NOP |

| | | |
|---|---|---|
| 0DB1 00 | 1772 | NOP |
| 0DB2 00 | 1773 | NOP |
| 0DB3 00 | 1774 | NOP |
| 0DB4 00 | 1775 | NOP |
| 0DB5 00 | 1776 | NOP |
| 0DB6 00 | 1777 | NOP |
| 0DB7 00 | 1778 | NOP |
| 0DB8 00 | 1779 | NOP |
| 0DB9 00 | 1780 | NOP |
| 0DBA 00 | 1781 | NOP |
| 0DBB 00 | 1782 | NOP |
| 0DBC 00 | 1783 | NOP |
| 0DBD 00 | 1784 | NOP |
| 0DBE 00 | 1785 | NOP |
| 0DBF 00 | 1786 | NOP |
| 0DC0 00 | 1787 | NOP |
| 0DC1 00 | 1788 | NOP |
| 0DC2 00 | 1789 | NOP |
| 0DC3 00 | 1790 | NOP |
| 0DC4 00 | 1791 | NOP |
| 0DC5 00 | 1792 | NOP |
| 0DC6 00 | 1793 | NOP |
| 0DC7 00 | 1794 | NOP |
| 0DC8 00 | 1795 | NOP |
| ASCII >> | | << |
| 0DC9 00 | 1796 | NOP |
| 0DCA 00 | 1797 | NOP |
| 0DCB 00 | 1798 | NOP |
| 0DCC 00 | 1799 | NOP |
| 0DCD 00 | 1800 | NOP |
| 0DCE 00 | 1801 | NOP |
| 0DCF 00 | 1802 | NOP |
| 0DD0 00 | 1803 | NOP |
| 0DD1 00 | 1804 | NOP |
| 0DD2 00 | 1805 | NOP |
| 0DD3 00 | 1806 | NOP |
| 0DD4 00 | 1807 | NOP |
| 0DD5 00 | 1808 | NOP |
| 0DD6 00 | 1809 | NOP |
| 0DD7 00 | 1810 | NOP |
| 0DD8 00 | 1811 | NOP |
| 0DD9 00 | 1812 | NOP |
| 0DDA 00 | 1813 | NOP |
| 0DDB 00 | 1814 | NOP |
| 0DDC 00 | 1815 | NOP |
| 0DDD 00 | 1816 | NOP |
| 0DDE 00 | 1817 | NOP |
| 0DDF 00 | 1818 | NOP |
| 0DE0 00 | 1819 | NOP |
| 0DE1 00 | 1820 | NOP |
| 0DE2 00 | 1821 | NOP |
| 0DE3 00 | 1822 | NOP |
| 0DE4 00 | 1823 | NOP |
| 0DE5 00 | 1824 | NOP |
| 0DE6 00 | 1825 | NOP |
| ASCII >> | | << |
| 0DE7 00 | 1826 | NOP |

| | | |
|---|---|---|
| 0DE8 00 | 1827 | NOP |
| 0DE9 00 | 1828 | NOP |
| 0DEA 00 | 1829 | NOP |
| 0DEB 00 | 1830 | NOP |
| 0DEC 00 | 1831 | NOP |
| 0DED 00 | 1832 | NOP |
| 0DEE 00 | 1833 | NOP |
| 0DEF 00 | 1834 | NOP |
| 0DF0 00 | 1835 | NOP |
| 0DF1 00 | 1836 | NOP |
| 0DF2 00 | 1837 | NOP |
| 0DF3 00 | 1838 | NOP |
| 0DF4 00 | 1839 | NOP |
| 0DF5 00 | 1840 | NOP |
| 0DF6 00 | 1841 | NOP |
| 0DF7 00 | 1842 | NOP |
| 0DF8 00 | 1843 | NOP |
| 0DF9 00 | 1844 | NOP |
| 0DFA 00 | 1845 | NOP |
| 0DFB 00 | 1846 | NOP |
| 0DFC 00 | 1847 | NOP |
| 0DFD 00 | 1848 | NOP |
| 0DFE 00 | 1849 | NOP |
| 0DFF 00 | 1850 | NOP |
| 0E00 00 | 1851 | NOP |
| 0E01 00 | 1852 | NOP |
| 0E02 00 | 1853 | NOP |
| 0E03 00 | 1854 | NOP |
| 0E04 00 | 1855 | NOP |
| ASCII >> | | << |
| 0E05 00 | 1856 | NOP |
| 0E06 00 | 1857 | NOP |
| 0E07 00 | 1858 | NOP |
| 0E08 00 | 1859 | NOP |
| 0E09 00 | 1860 | NOP |
| 0E0A 00 | 1861 | NOP |
| 0E0B 00 | 1862 | NOP |
| 0E0C 00 | 1863 | NOP |
| 0E0D 00 | 1864 | NOP |
| 0E0E 00 | 1865 | NOP |
| 0E0F 00 | 1866 | NOP |
| 0E10 00 | 1867 | NOP |
| 0E11 00 | 1868 | NOP |
| 0E12 00 | 1869 | NOP |
| 0E13 00 | 1870 | NOP |
| 0E14 00 | 1871 | NOP |
| 0E15 00 | 1872 | NOP |
| 0E16 00 | 1873 | NOP |
| 0E17 00 | 1874 | NOP |
| 0E18 00 | 1875 | NOP |
| 0E19 00 | 1876 | NOP |
| 0E1A 00 | 1877 | NOP |
| 0E1B 00 | 1878 | NOP |
| 0E1C 00 | 1879 | NOP |
| 0E1D 00 | 1880 | NOP |
| 0E1E 00 | 1881 | NOP |
| 0E1F 00 | 1882 | NOP |

```
0E20  00           1883        NOP
0E21  00           1884        NOP
0E22  00           1885        NOP                    <<
    ASCII >>
0E23  00           1886        NOP
0E24  00           1887        NOP
0E25  00           1888        NOP
0E26  00           1889        NOP
0E27  00           1890        NOP
0E28  00           1891        NOP
0E29  00           1892        NOP
0E2A  00           1893        NOP
0E2B  00           1894        NOP
0E2C  00           1895        NOP
0E2D  00           1896        NOP
0E2E  00           1897        NOP
0E2F  00           1898        NOP
0E30  00           1899        NOP
0E31  00           1900        NOP
0E32  00           1901        NOP
0E33  00           1902        NOP
0E34  00           1903        NOP
0E35  00           1904        NOP
0E36  00           1905        NOP
0E37  00           1906        NOP
0E38  00           1907        NOP
0E39  00           1908        NOP
0E3A  00           1909        NOP
0E3B  00           1910        NOP
0E3C  00           1911        NOP
0E3D  00           1912        NOP
0E3E  00           1913        NOP
0E3F  00           1914        NOP
0E40  00           1915        NOP                    <<
    ASCII >>
0E41  00           1916        NOP
0E42  00           1917        NOP
0E43  00           1918        NOP
0E44  00           1919        NOP
0E45  00           1920        NOP
0E46  00           1921        NOP
0E47  00           1922        NOP
0E48  00           1923        NOP
0E49  00           1924        NOP
0E4A  00           1925        NOP
0E4B  00           1926        NOP
0E4C  00           1927        NOP
0E4D  00           1928        NOP
0E4E  00           1929        NOP
0E4F  00           1930        NOP
0E50  00           1931        NOP
0E51  00           1932        NOP
0E52  00           1933        NOP
0E53  00           1934        NOP
0E54  00           1935        NOP
0E55  00           1936        NOP
0E56  00           1937        NOP
```

| | | | |
|---|---|---|---|
| 0E57 | 00 | 1938 | NOP |
| 0E58 | 00 | 1939 | NOP |
| 0E59 | 00 | 1940 | NOP |
| 0E5A | 00 | 1941 | NOP |
| 0E5B | 00 | 1942 | NOP |
| 0E5C | 00 | 1943 | NOP |
| 0E5D | 00 | 1944 | NOP |
| 0E5E | 00 | 1945 | NOP |

ASCII >> <<

| | | | |
|---|---|---|---|
| 0E5F | 00 | 1946 | NOP |
| 0E60 | 00 | 1947 | NOP |
| 0E61 | 00 | 1948 | NOP |
| 0E62 | 00 | 1949 | NOP |
| 0E63 | 00 | 1950 | NOP |
| 0E64 | 00 | 1951 | NOP |
| 0E65 | 00 | 1952 | NOP |
| 0E66 | 00 | 1953 | NOP |
| 0E67 | 00 | 1954 | NOP |
| 0E68 | 00 | 1955 | NOP |
| 0E69 | 00 | 1956 | NOP |
| 0E6A | 00 | 1957 | NOP |
| 0E6B | 00 | 1958 | NOP |
| 0E6C | 00 | 1959 | NOP |
| 0E6D | 00 | 1960 | NOP |
| 0E6E | 00 | 1961 | NOP |
| 0E6F | 00 | 1962 | NOP |
| 0E70 | 00 | 1963 | NOP |
| 0E71 | 00 | 1964 | NOP |
| 0E72 | 00 | 1965 | NOP |
| 0E73 | 00 | 1966 | NOP |
| 0E74 | 00 | 1967 | NOP |
| 0E75 | 00 | 1968 | NOP |
| 0E76 | 00 | 1969 | NOP |
| 0E77 | 00 | 1970 | NOP |
| 0E78 | 00 | 1971 | NOP |
| 0E79 | 00 | 1972 | NOP |
| 0E7A | 00 | 1973 | NOP |
| 0E7B | 00 | 1974 | NOP |
| 0E7C | 00 | 1975 | NOP |

ASCII >> <<

| | | | |
|---|---|---|---|
| 0E7D | 00 | 1976 | NOP |
| 0E7E | 00 | 1977 | NOP |
| 0E7F | 00 | 1978 | NOP |
| 0E80 | 00 | 1979 | NOP |
| 0E81 | 00 | 1980 | NOP |
| 0E82 | 00 | 1981 | NOP |
| 0E83 | 00 | 1982 | NOP |
| 0E84 | 00 | 1983 | NOP |
| 0E85 | 00 | 1984 | NOP |
| 0E86 | 00 | 1985 | NOP |
| 0E87 | 00 | 1986 | NOP |
| 0E88 | 00 | 1987 | NOP |
| 0E89 | 00 | 1988 | NOP |
| 0E8A | 00 | 1989 | NOP |
| 0E8B | 00 | 1990 | NOP |
| 0E8C | 00 | 1991 | NOP |
| 0E8D | 00 | 1992 | NOP |

| | | | |
|---|---|---|---|
| 0E8E | 00 | 1993 | NOP |
| 0E8F | 00 | 1994 | NOP |
| 0E90 | 00 | 1995 | NOP |
| 0E91 | 00 | 1996 | NOP |
| 0E92 | 00 | 1997 | NOP |
| 0E93 | 00 | 1998 | NOP |
| 0E94 | 00 | 1999 | NOP |
| 0E95 | 00 | 2000 | NOP |
| 0E96 | 00 | 2001 | NOP |
| 0E97 | 00 | 2002 | NOP |
| 0E98 | 00 | 2003 | NOP |
| 0E99 | 00 | 2004 | NOP |
| 0E9A | 00 | 2005 | NOP |

ASCII >>                                            <<

| | | | |
|---|---|---|---|
| 0E9B | 00 | 2006 | NOP |
| 0E9C | 00 | 2007 | NOP |
| 0E9D | 00 | 2008 | NOP |
| 0E9E | 00 | 2009 | NOP |
| 0E9F | 00 | 2010 | NOP |
| 0EA0 | 00 | 2011 | NOP |
| 0EA1 | 00 | 2012 | NOP |
| 0EA2 | 00 | 2013 | NOP |
| 0EA3 | 00 | 2014 | NOP |
| 0EA4 | 00 | 2015 | NOP |
| 0EA5 | 00 | 2016 | NOP |
| 0EA6 | 00 | 2017 | NOP |
| 0EA7 | 00 | 2018 | NOP |
| 0EA8 | 00 | 2019 | NOP |
| 0EA9 | 00 | 2020 | NOP |
| 0EAA | 00 | 2021 | NOP |
| 0EAB | 00 | 2022 | NOP |
| 0EAC | 00 | 2023 | NOP |
| 0EAD | 00 | 2024 | NOP |
| 0EAE | 00 | 2025 | NOP |
| 0EAF | 00 | 2026 | NOP |
| 0EB0 | 00 | 2027 | NOP |
| 0EB1 | 00 | 2028 | NOP |
| 0EB2 | 00 | 2029 | NOP |
| 0EB3 | 00 | 2030 | NOP |
| 0EB4 | 00 | 2031 | NOP |
| 0EB5 | 00 | 2032 | NOP |
| 0EB6 | 00 | 2033 | NOP |
| 0EB7 | 00 | 2034 | NOP |
| 0EB8 | 00 | 2035 | NOP |

ASCII >>                                            <<

| | | | |
|---|---|---|---|
| 0EB9 | 00 | 2036 | NOP |
| 0EBA | 00 | 2037 | NOP |
| 0EBB | 00 | 2038 | NOP |
| 0EBC | 00 | 2039 | NOP |
| 0EBD | 00 | 2040 | NOP |
| 0EBE | 00 | 2041 | NOP |
| 0EBF | 00 | 2042 | NOP |
| 0EC0 | 00 | 2043 | NOP |
| 0EC1 | 00 | 2044 | NOP |
| 0EC2 | 00 | 2045 | NOP |
| 0EC3 | 00 | 2046 | NOP |
| 0EC4 | 00 | 2047 | NOP |

| | | |
|---|---|---|
| 0EC5 00 | 2048 | NOP |
| 0EC6 00 | 2049 | NOP |
| 0EC7 00 | 2050 | NOP |
| 0EC8 00 | 2051 | NOP |
| 0EC9 00 | 2052 | NOP |
| 0ECA 00 | 2053 | NOP |
| 0ECB 00 | 2054 | NOP |
| 0ECC 00 | 2055 | NOP |
| 0ECD 00 | 2056 | NOP |
| 0ECE 00 | 2057 | NOP |
| 0ECF 00 | 2058 | NOP |
| 0ED0 00 | 2059 | NOP |
| 0ED1 00 | 2060 | NOP |
| 0ED2 00 | 2061 | NOP |
| 0ED3 00 | 2062 | NOP |
| 0ED4 00 | 2063 | NOP |
| 0ED5 00 | 2064 | NOP |
| 0ED6 00 | 2065 | NOP |
| ASCII >> | | << |
| 0ED7 00 | 2066 | NOP |
| 0ED8 00 | 2067 | NOP |
| 0ED9 00 | 2068 | NOP |
| 0EDA 00 | 2069 | NOP |
| 0EDB 00 | 2070 | NOP |
| 0EDC 00 | 2071 | NOP |
| 0EDD 00 | 2072 | NOP |
| 0EDE 00 | 2073 | NOP |
| 0EDF 00 | 2074 | NOP |
| 0EE0 00 | 2075 | NOP |
| 0EE1 00 | 2076 | NOP |
| 0EE2 00 | 2077 | NOP |
| 0EE3 00 | 2078 | NOP |
| 0EE4 00 | 2079 | NOP |
| 0EE5 00 | 2080 | NOP |
| 0EE6 00 | 2081 | NOP |
| 0EE7 00 | 2082 | NOP |
| 0EE8 00 | 2083 | NOP |
| 0EE9 00 | 2084 | NOP |
| 0EEA 00 | 2085 | NOP |
| 0EEB 00 | 2086 | NOP |
| 0EEC 00 | 2087 | NOP |
| 0EED 00 | 2088 | NOP |
| 0EEE 00 | 2089 | NOP |
| 0EEF 00 | 2090 | NOP |
| 0EF0 00 | 2091 | NOP |
| 0EF1 00 | 2092 | NOP |
| 0EF2 00 | 2093 | NOP |
| 0EF3 00 | 2094 | NOP |
| 0EF4 00 | 2095 | NOP |
| ASCII >> | | << |
| 0EF5 00 | 2096 | NOP |
| 0EF6 00 | 2097 | NOP |
| 0EF7 00 | 2098 | NOP |
| 0EF8 00 | 2099 | NOP |
| 0EF9 00 | 2100 | NOP |
| 0EFA 00 | 2101 | NOP |
| 0EFB 00 | 2102 | NOP |

```
OEFC 00            2103         NOP
OEFD 00            2104         NOP
OEFE 00            2105         NOP
OEFF 00            2106         NOP
OF00 01 02 03      2107         LD      BC,L0302
OF03 8A            2108         ADC     A,D
OF04 04            2109         INC     B
OF05 05            2110         DEC     B
OF06 06 8B         2111         LD      B,8BH
OF08 07            2112         RLCA
OF09 08            2113         EX      AF,AF'
OF0A 09            2114         ADD     HL,BC
OF0B 8C            2115         ADC     A,H
OF0C 8D            2116         ADC     A,L
OF0D 0A            2117         LD      A,(BC)
OF0E 88            2118         ADC     A,B
OF0F 89            2119         ADC     A,C
OF10 7E            2120         LD      A,(HL)
OF11 30 6D         2121         JR      NC,0F80H
     ASCII  >>                          0 <<
OF13 79            2122         LD      A,C
OF14 33            2123         INC     SP
OF15 5B            2124         LD      E,E
OF16 5F            2125         LD      E,A
OF17 70            2126         LD      (HL),B
OF18 7F            2127         LD      A,A
OF19 73            2128         LD      (HL),E
OF1A 7E            2129         LD      A,(HL)
OF1B 00            2130         NOP
OF1C 00            2131         NOP
OF1D 00            2132         NOP
OF1E 00            2133         NOP
OF1F 5E            2134         LD      E,(HL)
OF20 00            2135         NOP
OF21 01 01 4F      2136         LD      BC,4F01H
OF24 05            2137         DEC     B
OF25 05            2138         DEC     B
OF26 1D            2139         DEC     E
OF27 05            2140         DEC     B
OF28 01 01 00      2141         LD      BC,L0001
OF2B 00            2142         NOP
OF2C 00            2143         NOP
OF2D 01 01 15      2144         LD      BC,1501H
OF30 1F            2145         RRA
     ASCII  >> 3C         ^     0              <<
OF31 05            2146         DEC     B
OF32 00            2147         NOP
OF33 65            2148         LD      H,L
OF34 00            2149         NOP
OF35 00            2150         NOP
OF36 00            2151         NOP
OF37 00            2152         NOP
OF38 10 15         2153         DJNZ    0F4FH
OF3A 1F            2154         RRA
OF3B 1D            2155         DEC     E
OF3C 1C            2156         INC     E
OF3D 15            2157         DEC     D
OF3E 3D            2158         DEC     A
```

| | | | | |
|---|---|---|---|---|
| 0F3F | 00 | 2159 | NOP | |
| 0F40 | 4E | 2160 | LD | C,(HL) |
| 0F41 | 77 | 2161 | LD | (HL),A |
| 0F42 | 0E 0E | 2162 | LD | C,0EH |
| 0F44 | 15 | 2163 | DEC | D |
| 0F45 | 1F | 2164 | RRA | |
| 0F46 | 05 | 2165 | DEC | B |
| 0F47 | 00 | 2166 | NOP | |
| 0F48 | 1D | 2167 | DEC | E |
| 0F49 | 05 | 2168 | DEC | B |
| 0F4A | 00 | 2169 | NOP | |
| 0F4B | 77 | 2170 | LD | (HL),A |
| 0F4C | 0E 77 | 2171 | LD | C,77H |
| 0F4E | 00 | 2172 | NOP | |
| ASCII >> | | = N | | << |
| 0F4F | 65 | 2173 | LD | H,L |
| 0F50 | 00 | 2174 | NOP | |
| 0F51 | 00 | 2175 | NOP | |
| 0F52 | 00 | 2176 | NOP | |
| 0F53 | 00 | 2177 | NOP | |
| 0F54 | 00 | 2178 | NOP | |
| 0F55 | 77 | 2179 | LD | (HL),A |
| 0F56 | 0E 77 | 2180 | LD | C,77H |
| 0F58 | 00 | 2181 | NOP | |
| 0F59 | 65 | 2182 | LD | H,L |
| 0F5A | 01 01 77 | 2183 | LD | BC,7701H |
| 0F5D | 09 | 2184 | ADD | HL,BC |
| 0F5E | 30 00 | 2185 | JR | NC,0F60H |
| 0F60 | 1D | 2186 | DEC | E |
| 0F61 | 05 | 2187 | DEC | B |
| 0F62 | 00 | 2188 | NOP | |
| 0F63 | 67 | 2189 | LD | H,A |
| 0F64 | 09 | 2190 | ADD | HL,BC |
| 0F65 | 7E | 2191 | LD | A,(HL) |
| 0F66 | 00 | 2192 | NOP | |
| 0F67 | 00 | 2193 | NOP | |
| 0F68 | 01 01 01 | 2194 | LD | BC,L0101 |
| 0F6B | 01 01 01 | 2195 | LD | BC,L0101 |
| ASCII >> | | O | | << |
| 0F6E | 01 01 01 | 2196 | LD | BC,L0101 |
| 0F71 | 01 01 01 | 2197 | LD | BC,L0101 |
| 0F74 | 00 | 2198 | NOP | |
| 0F75 | 00 | 2199 | NOP | |
| 0F76 | 00 | 2200 | NOP | |
| 0F77 | 10 15 | 2201 | DJNZ | 0F8EH |
| 0F79 | 0D | 2202 | DEC | C |
| 0F7A | 05 | 2203 | DEC | B |
| 0F7B | 00 | 2204 | NOP | |
| 0F7C | 65 | 2205 | LD | H,L |
| 0F7D | 00 | 2206 | NOP | |
| 0F7E | 00 | 2207 | NOP | |
| 0F7F | 00 | 2208 | NOP | |
| 0F80 | 4E | 2209 | LD | C,(HL) |
| 0F81 | 17 | 2210 | RLA | |
| 0F82 | 01 10 15 | 2211 | LD | BC,1510H |
| 0F85 | 00 | 2212 | NOP | |
| 0F86 | FE FF | 2213 | CP | 0FFH |
| 0F88 | 30 22 | 2214 | JR | NC,0FACH |

| Address | Bytes | Line | Instruction | Operand |
|---|---|---|---|---|
| 0F8A | 3A 00 40 | 2215 | LD | A,(4000H) |
| 0F8D | 21 4F 24 | 2216 | LD | HL,244FH |
| 0F90 | E6 04 | 2217 | AND | 4 |
| 0F92 | AE | 2218 | XOR | (HL) |
| 0F93 | 20 17 | 2219 | JR | NZ,0FACH |
| 0F95 | 3A 00 40 | 2220 | LD | A,(4000H) |
| 0F98 | CB 5F | 2221 | BIT | 3,A |
| 0F9A | 28 C2 | 2222 | JR | Z,0F5EH |
| 0F9C | 32 6F 24 | 2223 | LD | (246FH),A |
| 0F9F | 3E 01 | 2224 | LD | A,1 |
| 0FA1 | CD BF 08 | 2225 | CALL | L08BF |
| 0FA4 | 3A 00 40 | 2226 | LD | A,(4000H) |
| 0FA7 | CB 5F | 2227 | BIT | 3,A |
| 0FA9 | 20 F4 | 2228 | JR | NZ,0F9FH |
| 0FAB | C9 | 2229 | RET | |
| 0FAC | 06 0A | 2230 | LD | B,0AH |
| 0FAE | 3E 03 | 2231 | LD | A,3 |
| 0FB0 | 32 00 60 | 2232 | LD | (6000H),A |
| 0FB3 | 3E 02 | 2233 | LD | A,2 |
| 0FB5 | CD BF 08 | 2234 | CALL | L08BF |
| 0FB8 | 3E 0B | 2235 | LD | A,0BH |
| 0FBA | 32 00 60 | 2236 | LD | (6000H),A |
| 0FBD | 3E 02 | 2237 | LD | A,2 |
| 0FBF | CD BF 08 | 2238 | CALL | L08BF |
| 0FC2 | 10 EA | 2239 | DJNZ | 0FAEH |
| 0FC4 | 3E 0F | 2240 | LD | A,0FH |
| 0FC6 | 32 00 60 | 2241 | LD | (6000H),A |
| 0FC9 | 3E 04 | 2242 | LD | A,4 |
| 0FCB | CD BF 08 | 2243 | CALL | L08BF |
| 0FCE | 31 30 24 | 2244 | LD | SP,2430H |
| 0FD1 | C3 BE 00 | 2245 | JP | L00BE |
| 0FD4 | CD 5B 0B | 2246 | CALL | 0B5BH |
| 0FD7 | E6 F0 | 2247 | AND | 0F0H |
| 0FD9 | FE 40 | 2248 | CP | 40H |
| 0FDB | 20 48 | 2249 | JR | NZ,1025H |
| 0FDD | CD D5 01 | 2250 | CALL | L01D5 |
| 0FE0 | 18 25 | 2251 | JR | 1007H |
| 0FE2 | FE 03 | 2252 | CP | 3 |
| 0FE4 | 20 21 | 2253 | JR | NZ,1007H |
| 0FE6 | 3A 66 24 | 2254 | LD | A,(2466H) |
| 0FE9 | FE 01 | 2255 | CP | 1 |
| 0FEB | 20 0C | 2256 | JR | NZ,0FF9H |
| 0FED | 3E 30 | 2257 | LD | A,80H |
| 0FEF | 32 66 24 | 2258 | LD | (2466H),A |
| 0FF2 | 3E 01 | 2259 | LD | A,1 |
| 0FF4 | 32 67 24 | 2260 | LD | (2467H),A |
| 0FF7 | 18 0E | 2261 | JR | 1007H |
| 0FF9 | FE 81 | 2262 | CP | 81H |
| 0FFB | 20 0A | 2263 | JR | NZ,1007H |
| 0FFD | 3E 01 | 2264 | LD | A,1 |
| 0FFF | 32 66 24 | 2265 | LD | (2466H),A |

END OF DISASSEMBLY.

We claim:

1. A telephone alarm device for automatically transmitting messages over telephone communication systems, comprising:
   means for storing at least one telephone number;
   means for activating device operation;
   means connectable to a telephone communication system for electrically connecting the telephone alarm device to said telephone communication system;
   means connectable to the storing means for transmitting signals corresponding to selected telephone numbers onto the telephone communication system so as to call corresponding telephones;
   means connectable to the telephone communication system for detecting if a telephone corresponding to a selected telephone number is answered, said answer detecting means indicating that said telephone is answered both upon detecting reversal of voltage polarity on the telephone communication system and, if no such voltage polarity reversal is detected, upon detecting a predetermined number of odd count signls on the telephone communication system;
   means connectable to the telephone communication system for detecting incoming telephone calls; and
   means, responsive to the answer detecting means, for transmitting signals corresponding to a message onto the telephone communication system after the answer detecting means indicates that a telephone corresponding to a selected telephone number is answered.

2. A telephone alarm device as defined in claim 1 further comprising means for storing at least one message.

3. A telephone alarm device as defined in claim 1 wherein message storing means comprises a recorder.

4. A telephone alarm device as defined in claim 1 wherein the activating means comprises a manually operated remote transmitter which transmits a control signal which causes device activation.

5. A telephone alarm device as defined in claim 1 wherein the activating means comprises a timer means which transmits an activation signal at a predetermined time.

6. A telephone alarm device as defined in claim 1 further comprising:
   means responsive to the incoming call detecting means for connecting the alarm device to the telephone communication system;
   means connectable to the telephone communication system for detecting control signals received over said communication system from a remote location; and
   means responsive to signals from said control signal detecting means for controlling device activation and the timing thereof.

7. A telephone alarm device as defined in claim 6 wherein the controlling means comprises means for modifying device activation time.

8. A telephone alarm device as defined in claim 1 further comprising:
   means connectable to the telephone communication system for determining the status of the telephone communication system and of the called telephone; and
   means responsive to said status determining means for disconnecting the alarm device from the telephone communication system both when said status determining means indicates communication is finished and when said status determining means indicates calling of said corresponding telephones cannot be completed.

9. A telephone alarm device as defined in claim 8 further comprising:
   means responsive to the answer detecting means and to the status determining means for storing both information on the number of unsuccessful attempts to call each selected telphone number and whether each called telephone was answered; and
   means responsive to the information storing means for prohibiting the transmission of signals corresponding to telephone numbers of telephones which have been answered and prohibiting the transmission of signals corresponding to telephone numbers of telephones which have been unsuccessfully called a specified number of times.

10. A telephone alarm device as defined in claim 1 wherein the means for detecting incoming telephone calls comprises means for detecting an audio ring signal on the telephone communication system.

11. A telephone alarm device as defined in claim 6 wherein said control signal detecting means comprises means for detecting and decoding audible tones generated by a tone producing telephone located at said remote location.

12. A telephone alarm device for communicating messages over telephone communication systems, comprising:
   first means for storing at least one audible message;
   second means for storing at least one telephone number;
   timer means for generating activation signals at predetermined times;
   activating means for transmitting activation signals from a remote location;
   alarm means responsive both to the timer means and to the signals transmitted by the activating means for initiating the calling of telephones corresponding to selected telephone numbers stored in said second storing means;
   relay means connectable to a telephone communication system for electrically connecting the alarm device to the telephone communication system;
   dialing control means connected to the relay means for calling telephones corresponding to said selected telephone numbers by transmitting dial signals onto the telephone communication system, said signals corresponding to the selected telephone numbers;
   means connectable to the telephone communication system for detecting if the called telephone has been answered;
   means connectable to the first storing means for transmitting signals corresponding to the stored message onto the telephone communication system;
   means connected to the relay means and responsive to signals on the telephone communication system for determining status of a telephone line and of a called telephone when said relay means is closed, said status determining means further being capable of detecting incoming telephone calls when said relay means is open; and
   means connected to the relay means for disconnecting the alarm device from the telephone communication system both when the status determining means indicates communication is finished and when said status determining means indicates calling of said corresponding telephones cannot be completed.

13. A telephone alarm device as defined in claim 12 wherein the first storing means comprises a recorder which permits the modification or replacement of recorded messages.

14. A telephone alarm device as defined in claim 12 wherein the second storing means comprises an electronic memory element.

15. A telephone alarm device as defined in claim 12 further comprising a data entry device which is connected to the alarm device so as to permit entry and modification of all user-supplied data in said alarm device.

16. A telephone alarm device as defined in claim 12 further comprising a switch which is electrically connected to the alarm device so as to permit termination of ongoing telephone calling actions of said alarm device.

17. A telephone alarm device as defined in claim 12 further comprising an audible alarm device connected to the timer means, wherein the timer means is capable of being set to activate said audible alarm device on at least one predetermined time, and wherein said alarm device will initiate calling of the selected telephone numbers if the user does not actuate a switch within a specified timer after activation of said audible alarm.

18. A telephone alarm device as defined in claim 17 further comprising means responsive to the activating means for transmitting an audible signal along with the transmitted message so as to indicate that the alarm device user is in the vicinity of the alarm device.

19. A telephone alarm device as defined in claim 12 wherein the selected telephone numbers are long distance numbers and numbers accessing a dialable extension including a remote paging device.

20. A telephone alarm device as defined in claim 12 wherein at least one of the dialing control means and the answer detecting means comprise a microprocessor circuit.

21. A telephone alarm device as defined in claim 12, further comprising:
memory means responsive to the answer detecting means and the status determining means for storing information on the number of unsuccessful attempts to call each selected telephone number and whether each called telephone was answered; and
means connected to the dialing control means for preventing the dialing of telephone numbers corresponding to telephones which have previously been answered or which have been called a specified maximum number of times.

22. A telephone alarm device as defined in claim 12, further comprising:
answer control means responsive to the status determining means for causing the relay means to connect the alarm device to the telephone communication system when an incoming call is detected;
means connected to the telephone communication system for detecting and decoding control signals received over said telephone communication system from a remote telephone; and
means responsive to signals from said detecting and decoding means for controlling the time for initiating calling of telephone numbers and for preventing such initiation.

23. A telephone alarm device as defined in claim 12 wherein the means for detecting when a telephone has been answered comprises means for detecting reversal of the voltage polarity on the telephone communication system.

24. A telephone alarm device as defined in claim 12 wherein the means for detecting incoming telephone calls comprises means for detecting an audio ring signal on the telephone communication system.

25. A telephone alarm device as defined in claim 22 wherein said control signals comprise audible tones generated by a tone producing telephone located at said remote location.

26. A telephone alarm device for communicating messages over telephone communication systems, comprising:
a recorder capable of both recording and playback, and having electronic interfacing capability;
an electronic memory circuit for storing signals corresponding to selected telephone numbers, and signals comprising alarm activation times;
an electronic clock circuit for producing check signals at predetermined times;
alarm control means connected to said electronic memory circuit, and said electronic clock circuit for comparing the time of the current clock signal with the stored alarm activation times and for producing an activation signal when a match is found;
a line seize relay connected to the alarm control means for connecting the alarm device to a telephone communication system;
a tone generator circuit connectable to the telephone communication system for transmitting audio signals onto said telephone communication system;
dialing control means connected to the line seize relay for identifying selected telephone numbers in said memory and causing said line seize relay to successively open and close so as to create dial signals corresponding to the identified telephone numbers;
a polarity detector circuit connected through said line seize relay for detecting changes in loop polarity on said telephone communication system, indicating that the dialed telephone has been answered;
an audio level detector circuit connectable to said telephone communication system for detecting audio signals on said telephone communication system;
a tone detector circuit connectable to said telephone communication system for detecting and relaying incoming communication signals from a remote telephone;
answer control means connected to the audio level detector circuit for identifying incoming telephone calls, said answer control means thereafter causing the line seize relay to connect the telephone alarm device to the telephone communication system and causing the tone generator circuit to transmit a tone on said telephone communication system indicating that said alarm device is connected thereto;
response control means connected to the tone detector circuit for accessing and modifying the contents of the electronic clock circuit and the memory circuit in response to signals received through said tone detector circuit, said response control means also causing the tone generator circuit to transmit audio signals on said telephone communication system; and line status control means connected to the audio level detector circuit for identifying if a called telephone is ringing, if it is busy, and if other signals are present, and for causing said line seize relay to disconnect said alarm device from said telephone communication system if no appropriate response is detected before the elapsing of a predetermined time period.

27. A telephone alarm device as defined in claim 26 additionally comprising:
a remote transmitter for transmitting a signal which causes the telephone alarm device to call the selected telephone numbers and transmit a message stored in the recorder to parties answering called telephones; and
a remote alarm receiver connected to the alarm control means for causing said alarm control means to transmit an activation signal in response to a signal from the remote transmitter, thereby causing the tone generator circuit to transmit one or more tones concurrently with the stored message so as to indicate that the user is in the vicinity of the telephone alarm device.

28. A telephone alarm device as defined in claim 26 further comprising:
an audible alarm device;
an audible alarm control unit connected to the alarm control means for activating the audible alarm device;
a switch connected to the alarm control means for causing said alarm control means to produce a signal terminating operation of the audible alarm device in response to the closing of said switch; and
a time delay circuit connected to the clock circuit for causing said alarm control means to transmit an activation signal if no closure of the switch occurs within a predetermined time after activation of the audible alarm, said time delay circuit also causing the tone generator circuit to transmit at least one tone concurrent with a message stored in the recorder so as to indicate that the user is in the vicinity of the telephone alarm device.

29. A telephone alarm device as defined in claim 26 wherein at least one of the alarm control means, dialing control means, answer control means, response control means and line status control means, comprise a microprocessor circuit.

30. A telephone alarm device as defined in claim 29 wherein the microprocessor circuit is additionally connected to the electronic memory circuit and wherein the telephone alarm device further comprises:
a keyboard connected to the microprocessor circuit for manually accessing and modifying the stored contents of said electronic memory circuit; and
a visual display device connected to the microprocessor circuit for displaying information corresponding to the accessed contents of the electronic memory circuit.

31. A telephone alarm device as defined in claim 26 further comprising:
message control means connected to the polarity detector circuit for producing signals causing the recorder to play a recorded message when said polarity detector identifies a change in loop polarity, and for causing said recorder to terminate the playing of said recorded message at a predetermined time after the initiation of the playing;
a recorder activation relay connected to the recorder for activating or deactivating the operation of said recorder; and
an amplifier and filter combination connected to an audio output of the recorder, for controlling volume and band width of the message from said recorder, and for transmitting said message onto the telephone communication system.

32. In a telephone alarm device which is electrically connectable to a telephone communication system, a method for automatically transmitting and receiving messages over telephone communication systems comprising the steps of:
storing at least one telephone number;
storing at least one message;
detecting an activation signal;
electrically connecting the telephone alarm device to the telephone communication system in response to the activation signal so as to permit signal transmission across the electrical connection;
transmitting signals corresponding to selected, stored telephone numbers on the telephone communication system so as to call corresponding telephones;
detecting if a called telephone is answered both by detecting reversal of voltage polarity on the telephone communication system and, if no such voltage polarity reversal is detected, by detecting a predetermined number of odd count signals on the telephone communication system:
transmitting to an answered, called telephone signals corresponding to the stored message; and
detecting an incoming telephone call on said telephone communication system.

33. A method for automatically transmitting and receiving messages as defined in claim 32, further comprising the step of transmitting signals onto the telephone communication system in response to the incoming telephone call.

34. A method for automatically transmitting and receiving messages as defined in claim 32 wherein, prior to the step of detecting an activation signal, the method further comprises the steps of:
obtaining an electronic clock circuit having a real-time output signal;
storing at least one alarm activation time; and
producing an activation signal on a time responsive alarm circuit when the output signal from the electronic clock circuit corresponds to the stored alarm activation time.

35. A method for automatically transmitting and receiving messages as defined in claim 32 wherein, prior to the step of detecting an activation signal, the method further comprises the steps of:
obtaining a remote transmitter for transmitting an activation signal in response to a switch closure thereon;
obtaining a receiver which is responsive to signals from said remote transmitter; and
closing a switch on the remote transmitter so as to produce an activation signal thereon.

36. A method for automatically transmitting and receiving messages as defined in claim 32 wherein, following the step of transmitting signals corresponding to selected telephone numbers, the method further comprises the steps of:
terminating the step of transmitting signals corresponding to selected telephone numbers at a predetermined time if the called telephone is not answered; and periodically transmitting signals onto the telephone communication system corresponding to selected, stored telephone numbers which correspond to previously unanswered telephones until a preselected number of such periodic transmissions have been unanswered.

37. A method for automatically transmitting and receiving messages as defined in claim 32, further comprising the step of modifying operating instructions and data in response to control signals received from the incoming call.

38. A method for automatically transmitting and receiving messages as defined in claim 32, further comprising the step of transmitting an activation signal prior to the step of detecting said activation signal, wherein said activation signal is transmitted from a location remote from the telephone alarm device so as to permit activation of said device by a remote user.

39. A method for automatically transmitting and receiving messages as defined in claim 32, further comprising the steps of producing an activation signal internally within the telephone alarm device prior to the step of detecting said activation signal.

40. A method for automatically transmitting and receiving messages as defined in claim 32 wherein the step of transmitting signals corresponding to selected telephone numbers comprises the step of selecting said telephone numbers in accordance with the sequence in which said telephone numbers were stored.

41. A method for automatically transmitting and receiving messages as defined in claim 32 wherein the step of detecting an incoming telephone call comprises the step of detecting an audio ring signal on the telephone communication system.

42. A method for automatically transmitting and receiving messages as defined in claim 32 wherein, following the step of detecting an incoming telephone call, the method further comprises the step of electrically connecting the telephone alarm device to the telephone communication system upon detecting the incoming call so as to permit signal transmission across the electrical connection.

43. A method for automatically transmitting and receiving messages as defined in claim 42 wherein, following the step of electrically connecting the telephone alarm device to the telephone communication system, the method further comprises the step of controlling device activation and operation in response to signals received from the incoming call.

44. A method for automatically transmitting and receiving messages as defined in claim 32 further comprising the steps of:
determining status of the telephone communication system and of the called telephone; and
disconnecting the alarm device from the telephone communication system both when the status determining step indicates that communicaton is finished and when the status determining step indicates that calling of the called telephone cannot be completed.

45. A method for automatically transmitting and receiving messages as defined in claim 44 further comprising the steps of:
storing information on the number of unsuccessful attempts to call each selected number and whether each called telephone was answered; and
prohibiting the transmission of signals corresponding to telephone numbers of telephone which have been answered and prohibiting the transmission of signals corresponding to telephone numbers of telephones which have been unsuccessfully called a specified number of times.

46. A method for automatically transmitting and receiving messages as defined in claim 43 wherein said signals received from the incoming call comprise audible tones generated by a tone producing telephone.

47. A method for transmitting messages to a series of telephone numbers, comprising the steps of:
storing at least one telephone number;
storing at least one message;
storing a value representing a maximum number of unsuccessful attempts to call a telephone corresponding to a stored telephone number;
selecting one of the stored telephone numbers;
determining whether a telephone corresponding to the selected telephone number has previousy been answered;
determining if the number of unsuccessful attempts to call a telephone which correspnds to the selected telephone number at least equals said maximum number of unsuccessful attempts;
if a telephone corresponding to the most recently selected number has previously been answered, selecting another of the stored telephone numbers and repeating the steps for determining if a telephone corresponding to the newly selected number has been previously answered and if the maximum number of unsuccessful attempts is at least equalled;
if the number of unsuccessful attempts to call a telephone corresponding to the most recently selected telephone number at least equals said maximum number of unsuccessful attempts, selecting another of the stored telephone numbers and repeating the steps for determining if a telephone corresponding to the newly selected number has been previously answered and if said maximum number of unsuccessful attempts is at least equalled;
transmitting signals corresponding to the selected telephone number on a telephone communication system so as to call corresponding telephones;
detecting if the called telephone is answered;
storing a value indicating the number of unsuccessful attempts which have been made to call a telephone corresponding to the selected telephone number;
selecting another of the stored telephone numbers;
beginning with the step of determining whether a telephone corresponding to the selected telephone number has previously been answered, repeating the above steps; and
terminating telephone calling both in response to a manually generated signal and in response to the occurrence of one of the following with respect to each of the stored telephone numbers: (a) a telephone corresponding to the stored telephone numbers has been answered, and (b) the stored telephone number has been called a number of times equal to said maximum of unsuccessful attempts.

48. A method for transmitting messages as defined in claim 47 wherein the step of detecting if the called telelphone is answered comprises the step of detecting reversal of the voltage polarity on the telephone communication system.

49. A method for transmitting messages as defined in claim 47, further comprising the steps of:
detecting an incoming telephone call on the telephone commuication system;

decoding signals received from the incoming telephone call; and transmitting signals onto the telephone communication system in response to the incoming telephone call.

50. A method for transmitting messages as defined in claim 49 wherein the step of detecting an incoming telephone call comprises the step of detecting an audio ring signal on the telephone communication system.

51. A method for automatically transmitting and receiving messages over telephone communication systems, comprising the steps of:

storing at least one telephone number;

storing at least one message;

storing a value representing the maximum number of unsuccessful attempts to call a telephone number;

detecting an activation signal for initiating the calling of the stored telephone numbers;

selecting a first one of the stored telephone numbers;

determining whether a telephone corresponding to the selected telephone number has previously been answered;

determining if the number of unsuccessful attempts to call a telephone which corresponds to the selected telephone number at least equals said maximum number of unsuccessful attempts;

if a telephone corresponding to the most recently selected number has previously been answered, selecting another of the stored telephone numbers and repeating the steps for determining if a telephone corresponding to the newly selected number has been previously answered and if the maximum number of unsuccessful attempts is at least equalled;

if the number of unsuccessful attempts to call a telephone corresponding to the most recently selected telephone number at least equals said maximum number of unsuccessful attempts, selecting another of the stored telephone numbers and repeating the steps for determining if a telephone corresponding to the newly selected number has been previously answered and if said maximum number of unsuccessful attempts is at least equalled;

transmitting dial signals corresponding to the selected telephone numbers onto a telephone communication system so as to call corresponding telephones;

monitoring the telephone communication system to detect if the called telephone is answered;

if the called telephone is answered, transmitting a selected one of the messages onto the telephone communication sytstem;

storing a value indicating whether a telephone corresponding to the selected telephone number has been answered;

storing a value indicating the number of unsuccessful attempts to call a telephone which corresponds to the selected telephone number;

selecting another of the stored telephone numbers;

beginning with the step of determining whether a telephone corresponding to the selected telephone number has previously been answered, repeating the above steps;

terminating telephone calling both in response to a manually generated signal and in response to the occurrence of one of the following with respect to each of the stored telephone numbers: (a) a telephone corresponding to the stored telephone number has been answered, and (b) the stored telephone number has been called a number of times equal to said maximum number of unsuccessful attempts;

identifying an incoming call on the telephone communication system;

decoding signals from said incoming call;

determining if the incoming call signals comprise valid instructions;

initiating performance in accordance with valid instructions;

transmitting a response signal onto the telephone communication system so as to indicate that the valid instructions have been followed;

determining if incoming call signal transmission is terminated;

transmitting a signal onto the telephone communication system indicating that incoming signal transmission is apparently finished and that local transmission is about to be terminated; and terminating further signal transmission until a new incoming call is identified or an activation signal is detected.

* * * * *

UNITED STATES PATENT AND TRADEMARK OFFICE
CERTIFICATE OF CORRECTION

PATENT NO. : 4,492,820

DATED : January 8, 1985

INVENTOR(S) : Kennard et al.

It is certified that error appears in the above-identified patent and that said Letters Patent is hereby corrected as shown below:

Column 1, line 10, "numbers" should be followed by --.--
Column 1, line 29, "electr" should be --elect--
Column 8, line 42, "sinal" should be --signal--
Column 9, line 8, "60 minutes" should be preceded by --at--
Column 9, line 63, "insure" should be --ensure--
Column 11, line 45, "desired" should be --described--
Column 12, lines 5-6, "been previously been" should be --previously been--
Column 16, line 61, "siezing" should be --seizing--
Column 16, line 66, "sieze" should be --seize--
Column 18, line 27, "characteris" should be --character is--
Column 19, lines 1-2, "tone producing telephone" should be --the tone producing telephone--
Column 21, line 4, "transformer 203" should be --transformer 302--
Column 24, line 26, "likes" should be --like--
Column 109, line 37, "wherein message" should be --wherein the message--
Column 111, line 29, "timer" should be --time--

Signed and Sealed this

Eighteenth Day of June 1985

[SEAL]

Attest:

DONALD J. QUIGG

*Attesting Officer*   *Acting Commissioner of Patents and Trademarks*